United States Patent [19]
Yoshizawa et al.

[11] Patent Number: 5,131,072
[45] Date of Patent: Jul. 14, 1992

[54] NEUROCOMPUTER WITH ANALOG SIGNAL BUS

[75] Inventors: Hideki Yoshizawa; Hiroki Iciki; Hideki Kato; Yoshihide Sugiura, all of Tokyo; Kazuo Asakawa, Kawasaki; Hiroyuki Tsuzuki, Kawasaki; Hideichi Endo, Kawasaki; Takashi Kawasaki, Kawasaki; Toshiharu Matsuda, Kawasaki; Chikara Tsuchiya, Machida; Katsuya Ishikawa, Kawasaki; Hiromu Iwamoto, Yokohama, all of Japan

[73] Assignee: Fujitsu, Ltd., Kawasaki, Japan

[21] Appl. No.: 474,055

[22] PCT Filed: Feb. 23, 1989

[86] PCT No.: PCT/JP89/00192

§ 371 Date: Apr. 30, 1990

§ 102(e) Date: Apr. 30, 1990

[87] PCT Pub. No.: WO90/02381

PCT Pub. Date: Mar. 8, 1990

[30] Foreign Application Priority Data

Aug. 31, 1988 [JP] Japan .................. 63-216865

[51] Int. Cl.$^5$ .............................. G06F 15/18
[52] U.S. Cl. .............................................. 395/24
[58] Field of Search .................. 364/513; 395/24

[56] References Cited

U.S. PATENT DOCUMENTS

| | | | |
|---|---|---|---|
| 4,660,166 | 4/1987 | Hopfield | 364/807 |
| 4,906,865 | 3/1990 | Holler | 307/353 |
| 4,947,482 | 8/1990 | Brown | 364/807 |
| 4,974,169 | 11/1990 | Engel | 364/513 |

OTHER PUBLICATIONS

Holler et al., "An Electrically Trainable Artificial Neural Network (ETANN) with 10240 Floating Gate Synapses", *Proc. Int. Ann. Conf. on Neural Networks*, 1989, pp. II-191-196 (Jun. 18-22 1989).

Eberhardt et al., "Design of Parallel Hardware Neural Network Systems from Custom Analog VLSI 'Building' Chips", *Int. Joint Conf. on Neural Networks*, vol. 2, pp. 183-190 (Jun. 18-22, 1989).

Schwartz, "A Neural Chips Survey", *AI Expert*, Dec. 1990, pp. 34-39.

Lipmann, "An Introduction to Computer With Neural Nets", *IEEE ASSP Magazine*, Apr. 1987, pp. 41-47.

Houslander et al., "Time-Multiplexed Analogue Circuit for Implementing Artificial Neural Networks", *Electronics Letters*, Nov. 10, 1988, pp. 1413-1414, vol. 24, No. 23.

Yasunaga et al., "A Wafer-Scale Integration Neural Network Utilizing Completely Digital Circuits", *Proc. Int. Joint Conf. on Neural Networks*, vol. 2, pp. 213-217, Jun. 18-22, 1989.

Hansen, "A Time-Multiplexed Switched Capacitor Circuit for Neural Network Applications", *IEEE Internat. Symposium on Circuits & Systems, 1989*, vol. 3, pp. 2177-2180 May 8-11, 1989.

*Primary Examiner*—Allen R. MacDonald
*Attorney, Agent, or Firm*—Staas & Halsey

[57] ABSTRACT

An analogue neuron processor (ANP) performs an operation of sum-of-products of a time divisional analog input signal sequentially input from an analog signal bus and weight data and output an analog signal to an analog signal bus through a nonlinear circuit. A layered type or a feedback type neural network is formed of ANPs. The neural network reads necessary control data from a control pattern memory under the control of micro sequencer and reads the necessary weight data from the weight memory thereby realizing a neuron computer. The neuron computer connects a plurality of ANPs by using a single analog bus, thereby greatly decreasing the number of the wires used for the neural network and also decreasing the size of the circuit. A plurality of ANPs in a single layer simultaneously receives analog signal from an analog bus and carries out a parallel operation in the same time period and ANPs in different layers perform a parallel operation in a pipeline manner, thereby increasing a speed of an operation. Accordingly, the prsent invention can provide a neuron computer with a high practicality.

47 Claims, 49 Drawing Sheets

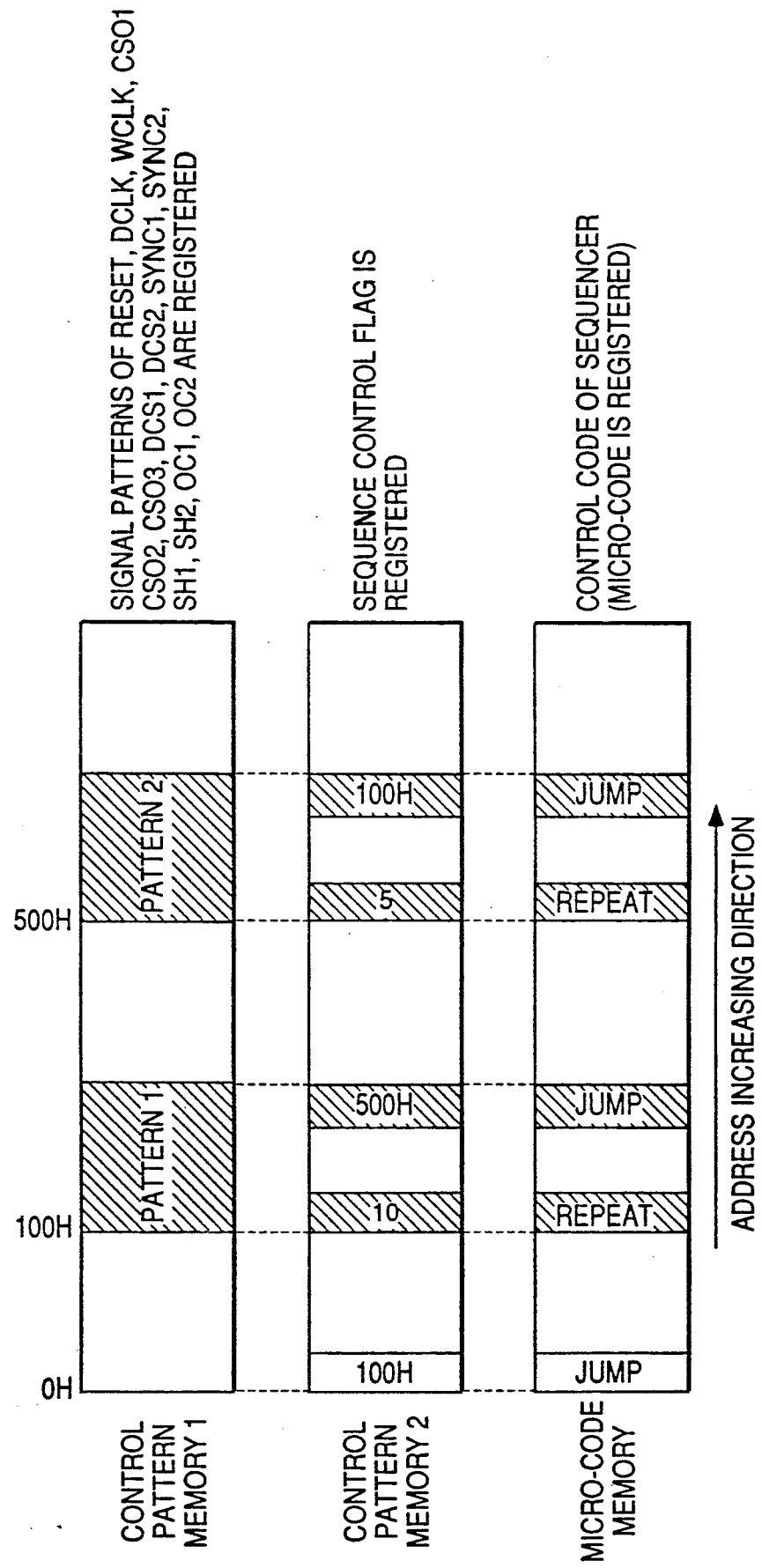

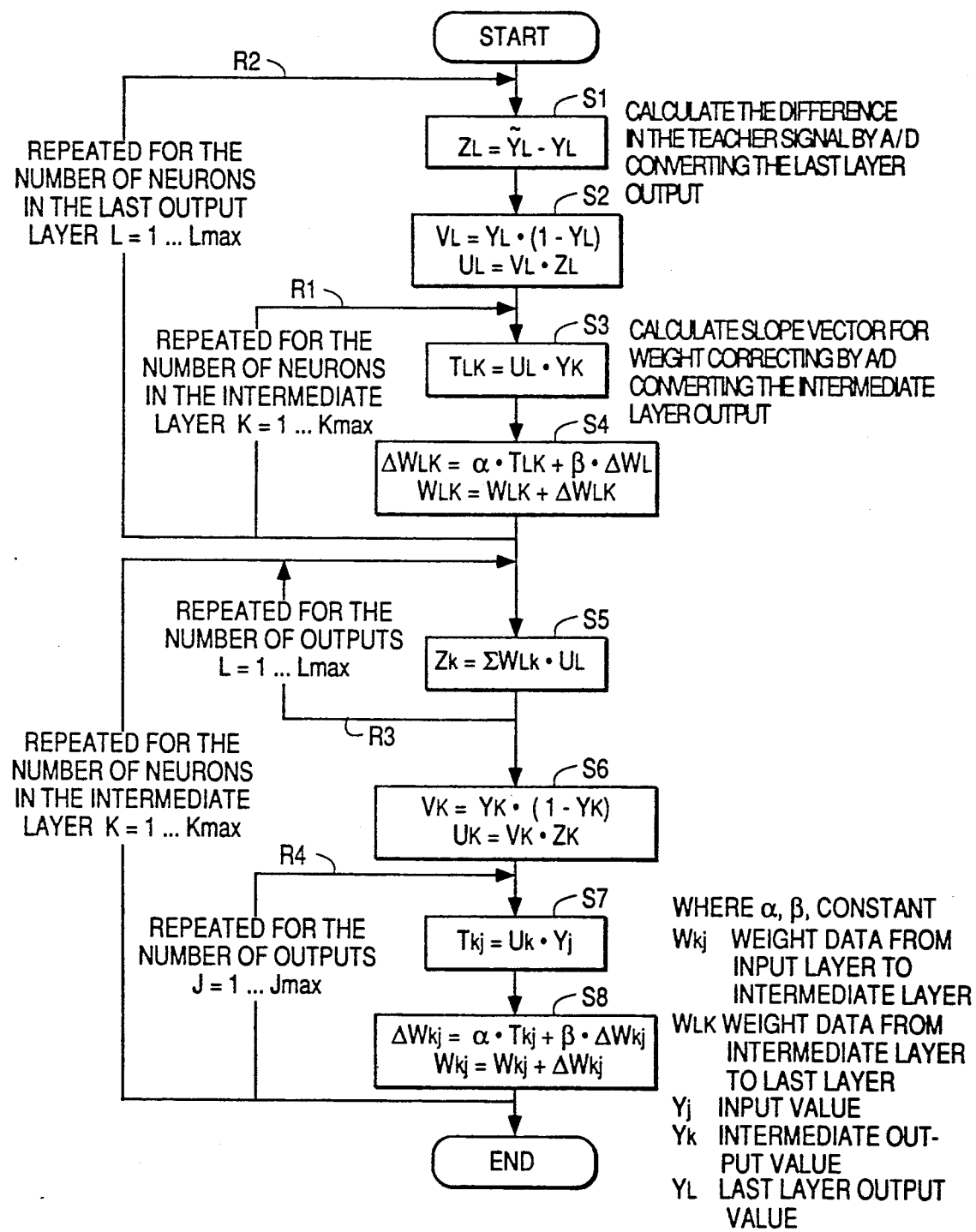

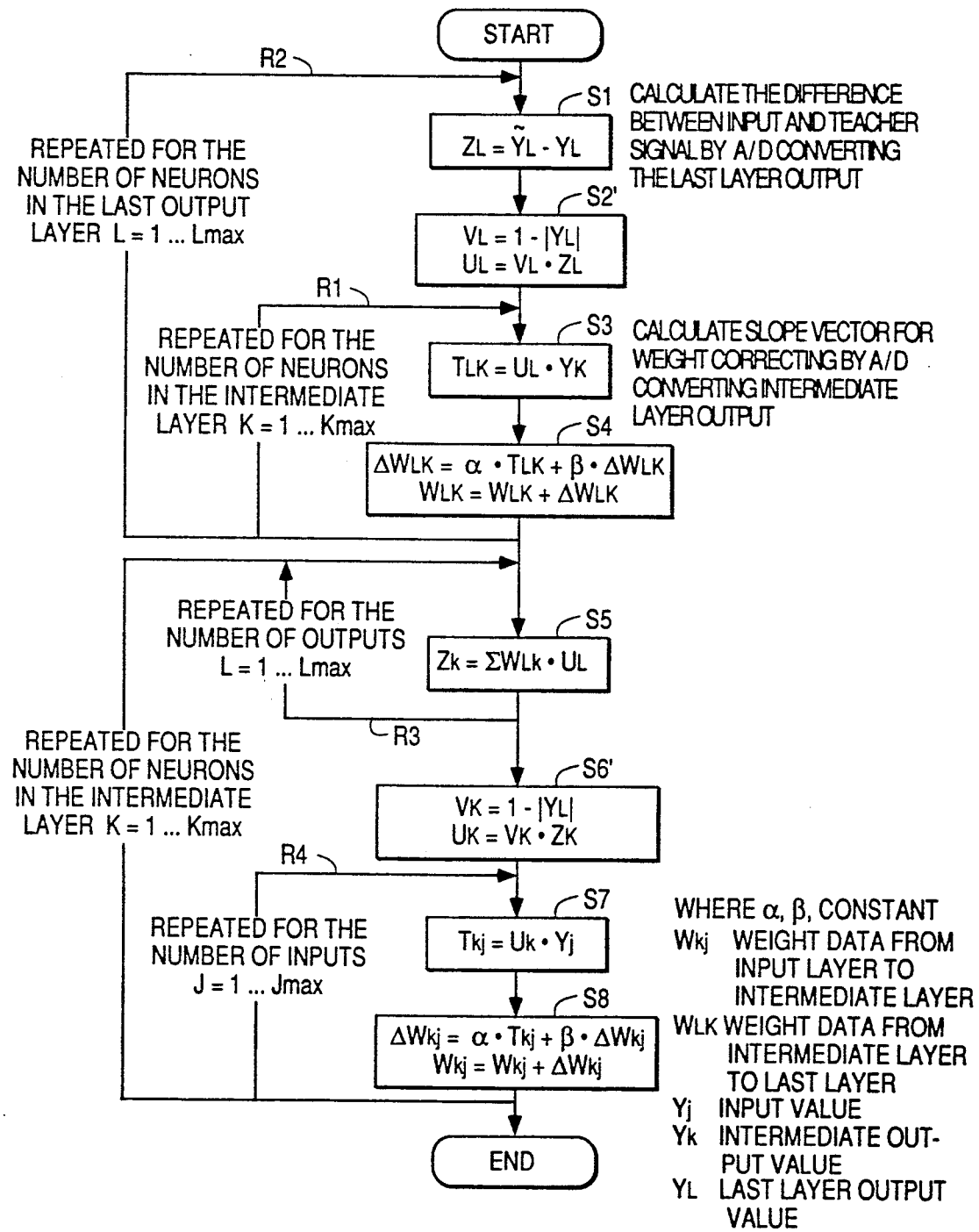

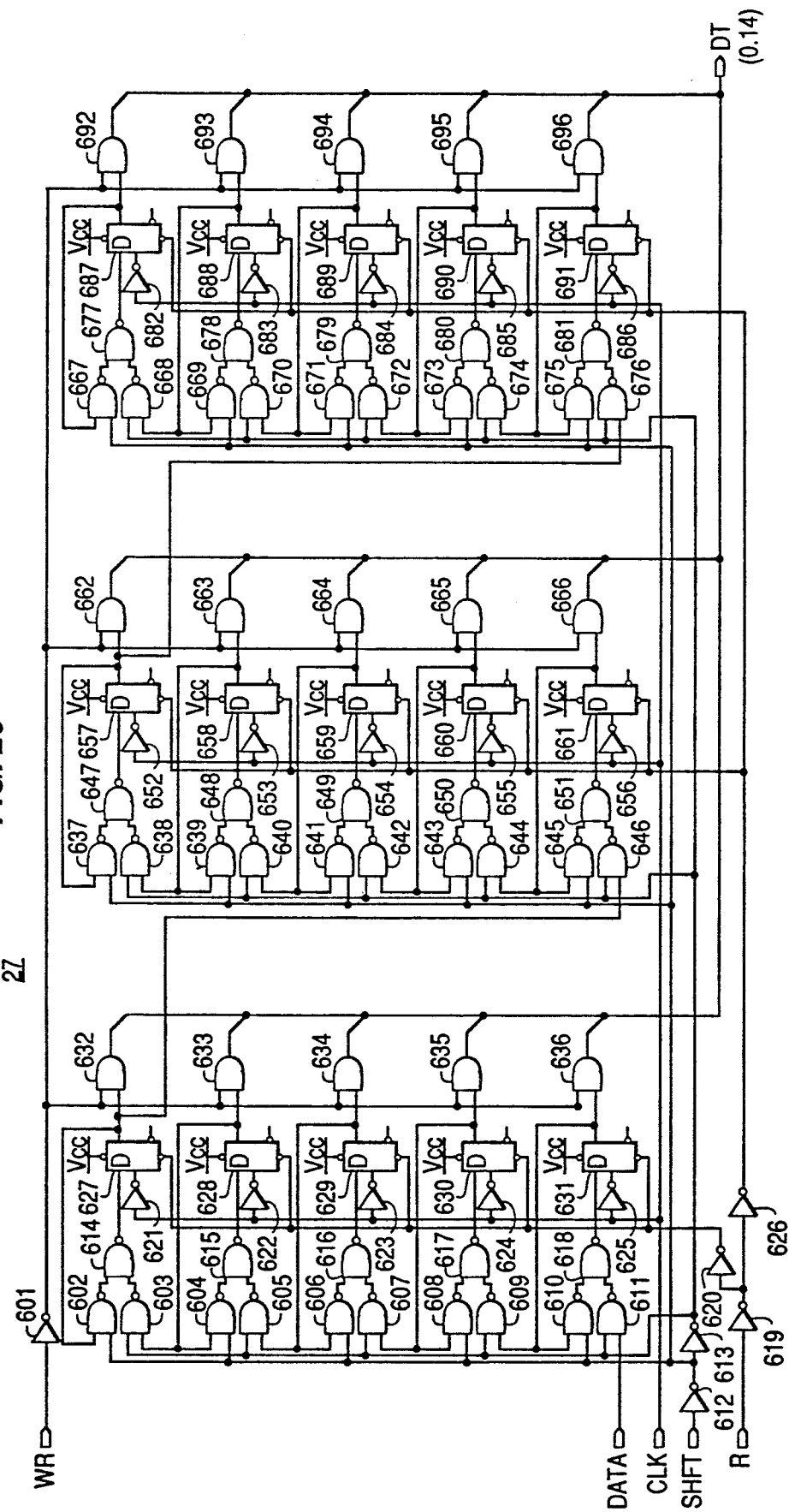

NEUROCOMPUTER WITH ANALOG SIGNAL BUS

BACKGROUND OF THE INVENTION

1. Field of the Invention

The present invention relates to a neuro computer and more particularly to a neuro computer realized by connecting an analog neuron chip through an analog time divisional transmission path.

2. Description of the Related Art

In a conventional sequential processing computer (Von Neumann type) it is difficult to control a data process function in accordance with a variation in the usage method or environment. Therefore, an adaptive data processing method utilizing a parallel distribution system and a layered network is proposed. The back propagation method (D. E. Rumelhart, G. E. Hinton, and R. J. Williams, "Learning Internal Representations by Error Propagation", PARALLEL DISTRIBUTED PROCESSING, Vol. 1, pp. 318-364, The MIT Press, 1986) receives particular attention because of its high practicality.

The back propagation method utilizes a layered structure network comprising a node called a basic unit and internal connection having weights presented. FIG. 1 shows the structure of a basic unit 1. Basic unit 1 carries out a process similar to a continuous neuron model. It comprises a multiple-input single-output system and further comprises a multiplication unit 2 for multiplying a plurality of inputs ($Y_h$) by respective weights ($W_{ih}$) of the internal connections, an accumulating unit 3 for adding all the multiplied results, and a threshold value processing unit 4 for outputting a final output $X_i$ by applying a nonlinear threshold value process to the added values.

FIG. 2 shows a conceptual view of the structure of a layered neural network. Many basic units (1-h, 1-i, 1-j) are connected in layers as shown in FIG. 2 and the output signal patterns corresponding to the input signal patterns are outputted.

Upon learning, the weights ($W_{ih}$) of connections between respective layers are determined in order to minimize the difference between the output patterns and a target teacher pattern. This learning is applied to a plurality of input patterns and then multiplexed. Upon an association operation, even if the input pattern contains information which is slightly incomplete upon the learning and therefore different from the complete information input upon the learning, an output pattern close to the teacher pattern produced during the learning process is generated, thereby enabling a so-called associating process.

To realize a neuron computer with such a structure, transmission and reception of the data between basic units constituting a layered network is conducted by as small a number of wires as possible. This is a problem which needs to be solved when a complex data process is realized by forming multilayers of the network structure and increasing the number of basic units.

However, the data transmission system explained above requires a large number of wires between the two layers, thus preventing it from being made small. Further, its reliability cannot be increased when the layered network is manufactured into a chip. For example, consider a complete connection in which the number of adjacent layers is made the same and all the basic units 1 are connected to each other. In this case, the number of the wires increases in proportion to the second power of the number of basic units, thereby resulting in a rapid increase in the number of wires.

SUMMARY OF THE INVENTION

The present invention is made in consideration of the above problem and an object of the present invention is to provide a neuron computer capable of transmitting and receiving data between basic units forming a layered network with a minimum number of wires and further of performing a forward learning operation by using a set of analog neuron processors.

A neural network according to the present invention receives analog signals from a common first analog bus provided on the input side of respective layers in a time divisional manner, calculates a sum of the products of the input analog signals times digital weight data, and provides the analog signals to the second common analog bus provided to the output side of respective layers, thereby forming a set of analog neuron processors (ANP).

A control pattern memory stores a control signal pattern of the neural network and a weight memory stores weight data. A sequencer produces an address of the control pattern memory and weight memory. Digital control means comprises a general purpose processing unit including an MPU and a main storage. It is connected through the neural network and D/A and A/D converters and further controls the neural network, control pattern memory sequencer and weight memory as a whole. Thus, the present invention forms a neuron computer system.

An analog input signal is input to an analog neuron chip in a time divisional manner and the products of the signal and the weight data are added to provide a sum-of-the-products signal. This signal is then outputted through a nonlinear function circuit and an analog neuron chip is formed. A plurality of analog neuron chips form a layered-type or a feedback type neural network and this neural network receives an output from control pattern memory whose address is provided by sequencer. The weight data obtained from a learning procedure is supplied to the neural network from the weight memory. The neural network control pattern memory, sequencer and weight memory are controlled and managed by a digital signal from digital control means. The MPU in the digital control means executes a learning algorithm and checks an output signal. Therefore, an analog neuron computer system characterized by a time divisional analog input signal and a time divisional analog output signal can be realized.

BRIEF DESCRIPTION OF THE DRAWINGS

FIG. 19B shows a structure of a control pattern memory and micro-code memory, FIGS. 20C and 20D show flowcharts designating a learning algorithm according to the present invention, FIG. 26 shows a detailed circuit diagram of a shift register.

DESCRIPTION OF THE PREFERRED EMBODIMENTS

Figure 4B:
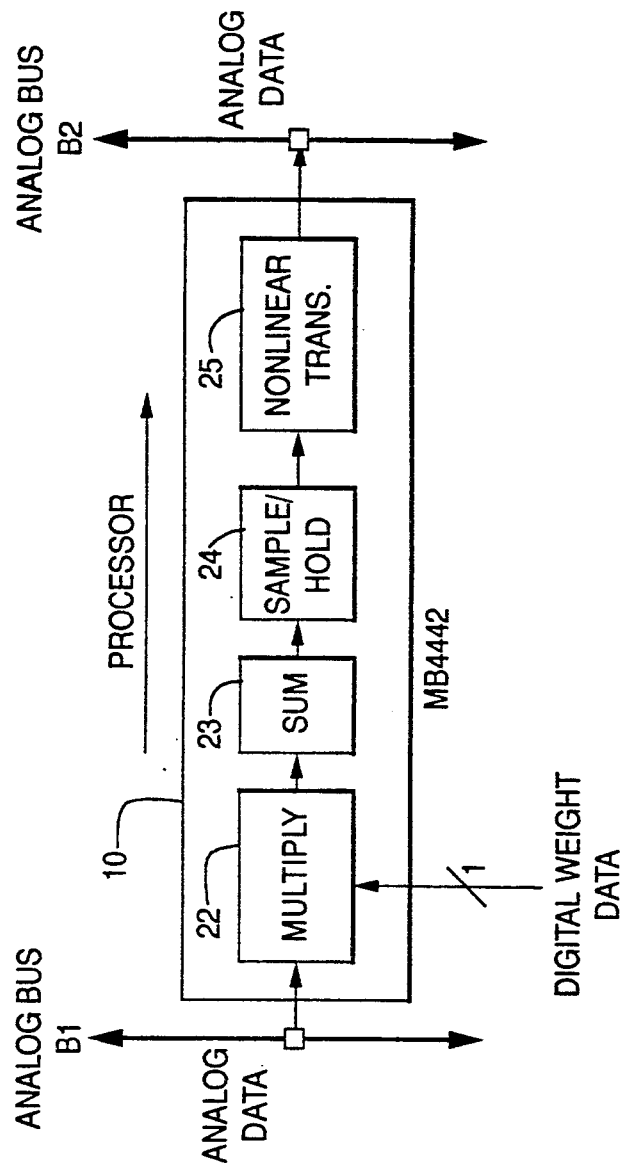
FIG. 4B shows the internal structure of the ANP of the present invention.
Figure 4A:
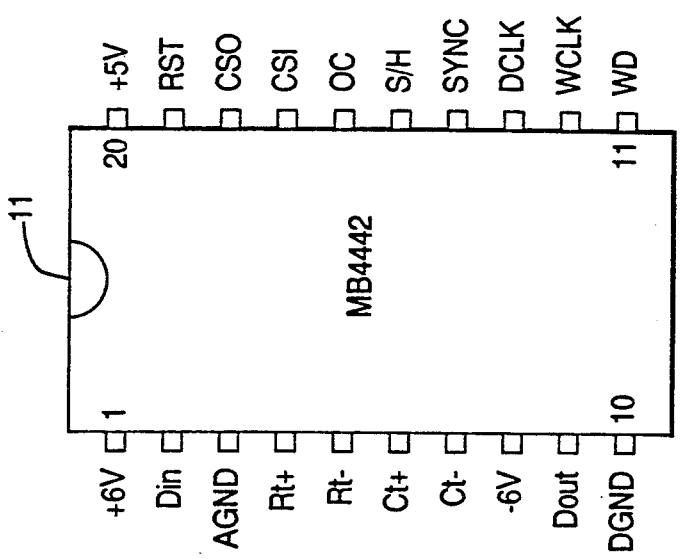
FIG. 4A is a view of a package comprising an analog neuron processor (ANP) chip of the present invention.

FIG. 4A is a schematic view of a dual-inline package of an analog neuron processor (ANP) 11 formed by a neuron chip provided by the present invention. This package, called MB4442, carries out neuron model processes. The internal threshold value processing unit is obtained by performing a sigmoid function. The analog neuron chip comprises an ANP for inputting and outputting analog data. FIG. 4B is an internal structure of an ANP of the present invention. As shown in FIG. 4B, ANP 11 is connected between analog bus B1 and analog bus B2. ANP 11 comprises analog multiplying unit 22 for multiplying an input analog signal with a weight, analog adding unit 23 for obtaining a sum-of-products, sample/hold unit 24 for maintaining the sum and nonlinear function unit 25 for outputting a value of a sigmoid function.

Respective terminals of ANP 11 shown in FIG. 4A are as follows. The internal structure of ANP 11 comprises an analog circuit unit and a digital circuit unit. Plus-6-volt and minus-6-volt terminals are connected to a power source in an operational amplifier of an analog circuit unit. Terminals $D_{in}$ and $D_{out}$ are for respectively inputting and outputting analog signals. Terminal AGND is for the ground of the analog circuit unit. Terminals Rt+ and Rt− are for a resistor R provided externally to form an integral circuit in the analog circuit unit and terminals Ct+ and Ct− are for a capacitor provided externally to form an integral circuit. Terminal DGND is for the ground of a digital circuit unit. The plus-5-volt terminal is for the power source of the digital circuit unit. The RST terminal is for receiving reset signals for resetting the charge of the capacitor in the integral circuit. Terminals CSI and CSO are for respectively inputting and outputting daisy chain control signals. Terminal OC is for receiving offset cancelling control signals. Terminal S/H is for receiving sample/hold control signals. Terminal SYNC is for receiving signals for synchronizing processes of respective layers. Terminal DCLK is for receiving basic clock signals for processing the analog input signal. Terminal WCLK is for a clock for obtaining digital weight data. Terminal WD is for receiving digital weight data for inputting data in bit serial form.

Figure 5:
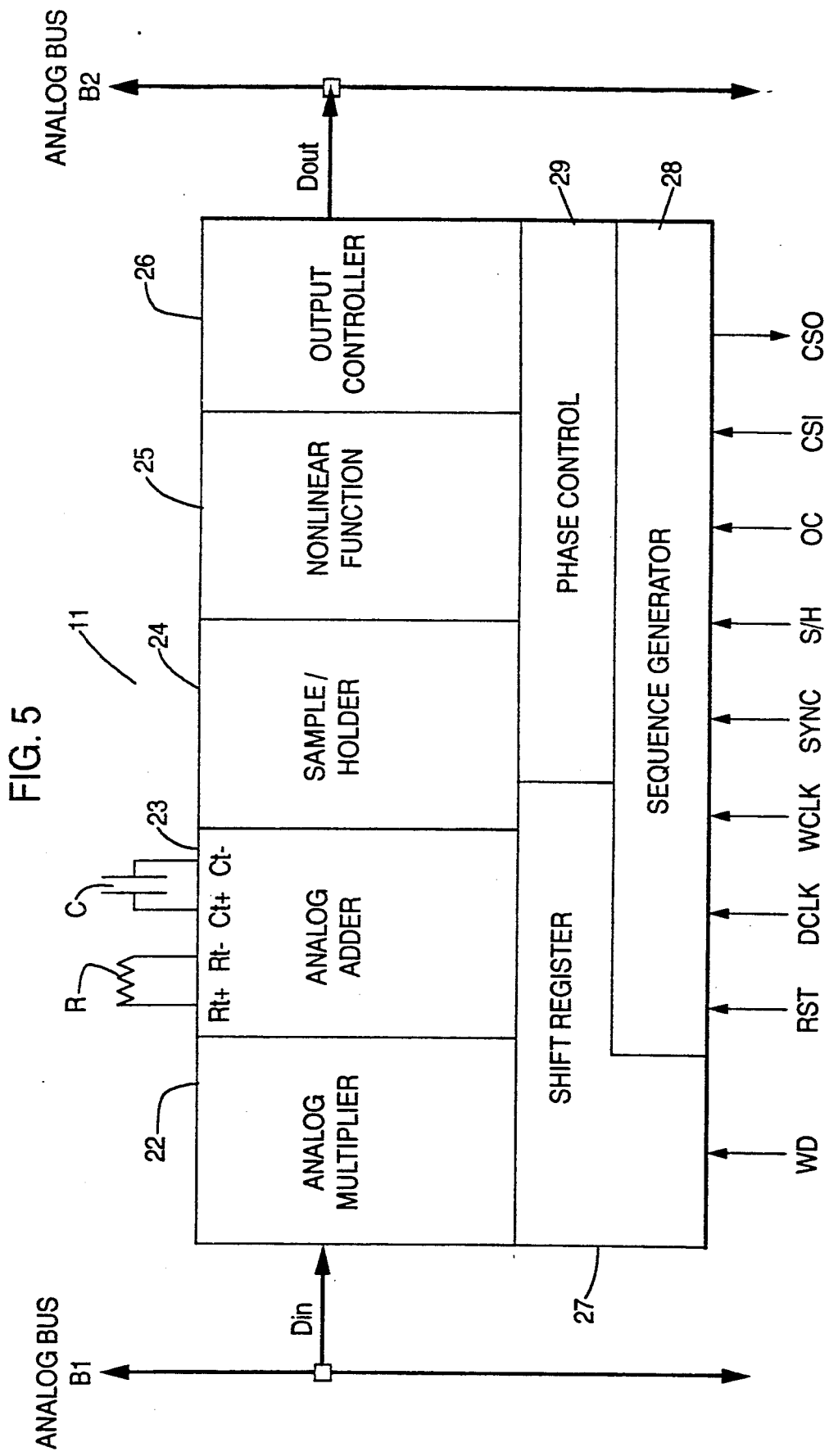
FIG. 5 shows the principle structure of the analog neural processor ANP of the present invention.

FIG. 5 shows the structure of an analog neuron processor (ANP) of the present invention.

Analog input signals transmitted in a time divisional manner from separate ANP's are input to analog multiplier unit 22 in ANP 11 through analog bus B1. Analog multiplier 22 multiplies the analog input data by the digital weight data WD which is received in bit serial form from shift register 27 and is then subjected to a serial-to-parallel conversion, thereby providing a product signal representing the product of the analog input signal and the digital weight data. Analog adder 23 comprises a Miller integrating circuit containing an external resistor R and a capacitor C, and obtains the sum of the respective product signals obtained from the analog input signal transmitted in a time divisional manner from a plurality of ANPs (the position in which each of the ANPs exists is called a node) provided at the previous stage and connected to analog bus B1, and obtained from the analog input signal for a threshold value transmitted from a dummy node. Next, the product signals are held by sample-hold unit 24 for the desired time period and the sampled/held output is converted through non-linear type function unit 25. Output control unit 26 delays the output of non-linear function unit 25 for a predetermined time period under the control of sequence generator 28. The analog output signal DOUT is then outputted to analog bus B2. Sequence generator 28 produces a control signal to be supplied to the inside of this computer system. Phase control unit 29 controls the phase of a control signal to ensure that the switches connected to the analog circuit portions within the ANP and digital circuit portions are turned on and off. In particular, when the first switch is turned on and the second switch is turned off, the phase of the control signal is controlled to prevent both first and second switches from being turned on simultaneously.

Sequence generator 28 receives signals RST, DCLK, WCLK, SYNC, and CSI from a later described master control block and outputs a CSO, thereby forming a control signal within the ANP.

Neural networks are required to perform high speed operations using parallel processing. The present invention uses time divisional data, but groups of ANPs normally perform parallel pipeline processing. An ideal neural network needs connecting wires for connection between respective neurons. Thus, the above structure would require a lot of wires. The present invention deals with time divisional data. Thus, the time required to process a sum of products in each ANP becomes a little long. However, groups of ANPs are arranged vertically, namely, in the direction of the layers, in parallel with each other. Therefore, parallel processing of ANPs within one layer may be performed, thus decreasing processing time. In addition, a pipeline process is possible between layers, which further decreases total processing time. When inputs are received simultaneously and in parallel by, for example, three ANPs connected to an analog bus, the three ANPs produce products of analog inputs and weights. These products are maintained as electric charges in capacitors of integrators in the three ANPs. In the next time period, the three ANPs produce products of analog inputs from the same analog bus and weights. These products are added to those determined in the previous time period in the capacitors of the integrators. When the sum of the products of the analog input signals from all the ANPs in the previous stage multiplied by the weights are produced, the sum is sample/held. Thereafter, a sample/hold signal is outputted through a sigmoid function upon an input of a CSI control signal. Upon completion of the output, the CSI falls down. A CSO then rises after a predetermined delay, thereby permitting use of the output bus by the ANP of the adjacent neuron chip within the same layer.

MOST PREFERRED EMBODIMENT

The present invention is explained in detail in accordance with an embodiment.

Figure 6:
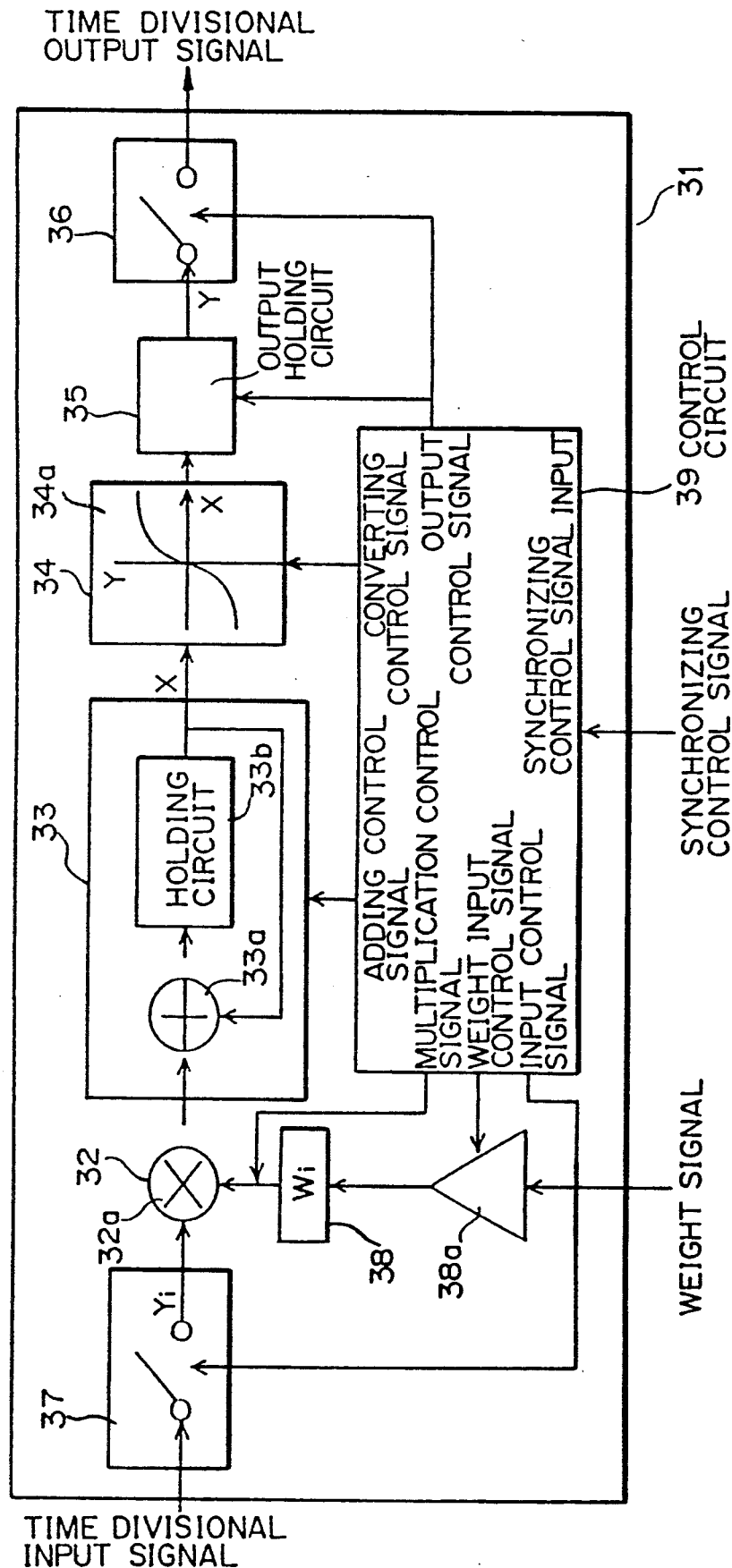
FIG. 6 is a block diagram of an embodiment of the basic unit according to the present invention.

FIG. 6 shows a block diagram of the first embodiment of the basic unit of the neuron chip (ANP). Multiplying unit 32, adding unit 33 and threshold value process unit 34 constitute an execution unit of a continuous neuron model. Output holding unit 35 is also provided. Where a plurality of inputs connected to basic unit 31 is expressed as Yi and the weight determined corresponding to respective connections as Wi, multiplying unit 32 calculates $$Y_i \cdot W_i$$

Adding unit 33 calculates $$X = \Sigma Y_i \cdot W_i - \Theta$$

where $\Theta$ is a threshold value. Where a final output from threshold value unit 34 is Y, the following equation is calculated.

$$Y = 1/(1 + exp(-X)) \quad (1)$$

The weight "$-\Theta$" is multiplied by the value "$+1$" inputted from the dummy node. The result "$x-\Theta$" is then output from adding unit 33. Therefore, threshold value unit 34 performs a conversion by using an S character curve.

Multiplying unit 3 comprises multiplying type D/A converter 32a. An analog signal (inputted through input switch 37) from basic unit 31 in the previous layer or a later described dummy node circuit is multiplied by the weight information (inputted through the later described weight holding unit 38) of the digital signal and the resulting product is outputted as an analog signal. Adding unit 33 comprises analog adder 33a (composed of an integrator) and holding circuit 33b (for holding the added result of analog adder 33a). Multiplying type D/A converter 32a receives an analog input signal at a reference voltage terminal of D/A converter 32a and respective bits of the weight at respective digital input terminals as the digital input signal, and multiplies the analog input signal by the weight. Analog adder 33a adds the resulting product output from multiplying type D/A converter 32a to the added value obtained at the previous timing and held in holding circuit 33b, thereby providing a new added value. Holding circuit 33b holds the added value obtained by analog adder 33a and feeds back the held value to analog adder 33a as the previous added value. These adding processes are carried out in synchronization with the adding control signal outputted from control circuit 39. Threshold value unit 34 is composed of non-linear type function generating circuit 34a comprising an analog function generator. It outputs a nonlinear signal such as a sigmoid function in response to the input. When the accumulation of the multiplied result is completed, including addition of the threshold value ($-\Theta$), an operation process of the sigmoid function shown in equation (1) is performed by adding the threshold value ($-\Theta$) to the added value x held in holding circuit 33b, thereby providing the analog output value Y. Output holding unit 35 comprises a sample/hold circuit and holds that output value Y of the analog signal from non-linear type function generator 34a which constitutes an output to basic unit 31 in the following stage layer.

The output switch 36 is turned ON for a predetermined period upon receiving an output control signal from control circuit 39. The final output is maintained in output holding unit 35 and processed to be outputted on analog bus B2. An input control signal from control circuit 39 turns ON input switch unit 37, to receive the input signal when an analog output is transmitted from the final output of basic unit 31 in the previous stage layer. Weight holding unit 38 comprises a parallel out shift register. It maintains the weight signal for use by multiplying unit 32 after the weight signal is bit serially transmitted from the weight memory and passes the gate 38a after it opens (when the eight input control signal is turned on by controlling circuit 39). The weight data is provided in parallel to a multiplying unit when the multiplication control signal is provided. Control circuit 39 in the digital circuit unit produces a synchronizing signal for use inside the circuit based on an external synchronization signal and carries out a function of the analog process of the inside of the circuit.

As constructed above, the input and output signals of basic unit 31 with the signal process structure shown in FIG. 6 can be realized by using the analog signal. Multiplying type D/A converter 32a may receive the weight data of the digital signal in parallel or may convert the weight data into parallel data after receiving them as serial data. If the weight data is formed of an analog signal, an analog multiplying circuit may be used instead of the multiplying type D/A converter 32a.

Figure 7:
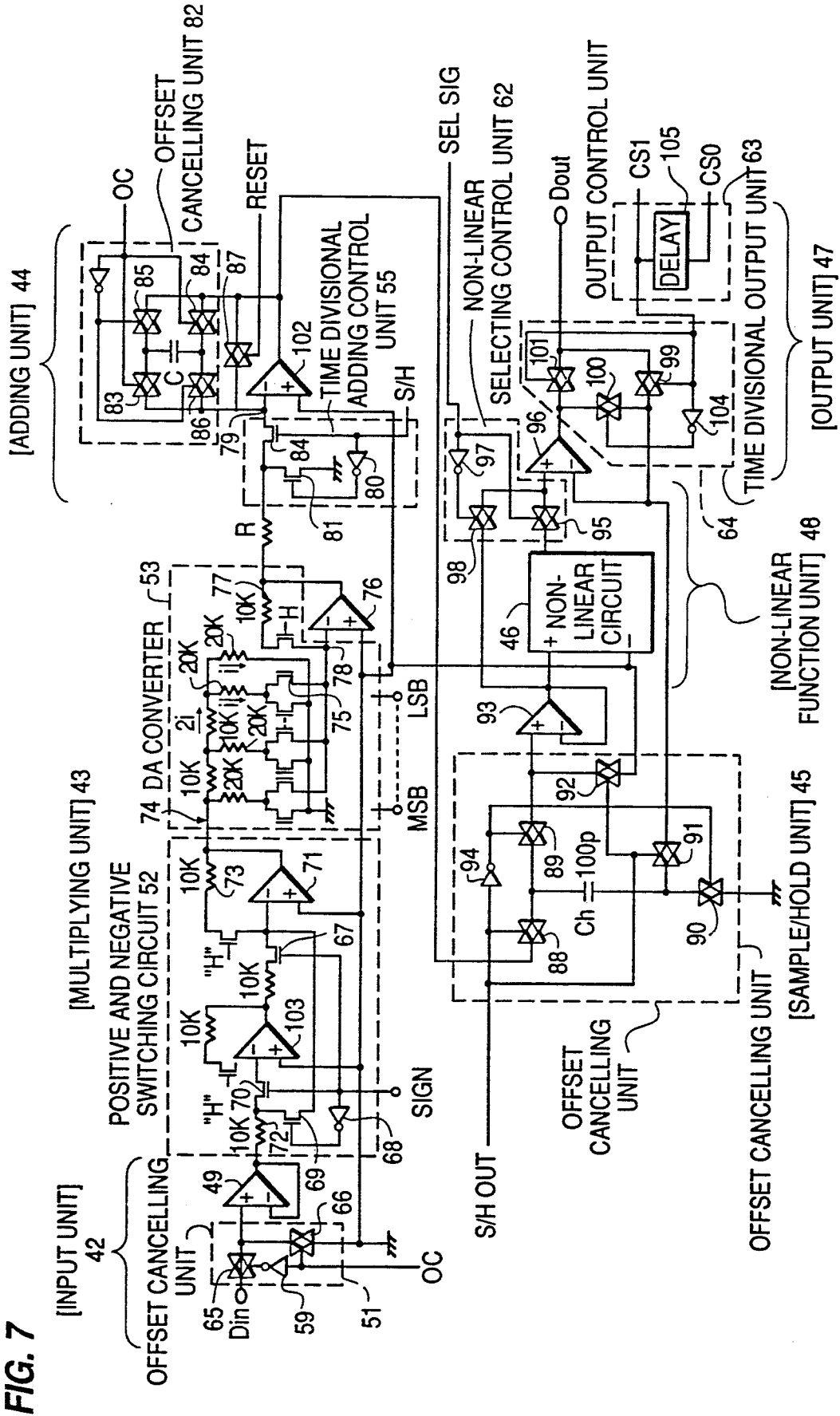
FIG. 7 is a detailed circuit diagram of an embodiment of the basic unit used for the present invention.

FIG. 7 is a circuit diagram of an embodiment of a neuron chip or analog neuron processor (ANP) of the present invention. The neuron unit of the present invention comprises input unit 42, multiplying unit 43, adding unit 44, sampling/holding unit 45, non-linear function unit 46 and output unit 47.

Input unit 42 comprises offset cancelling producing circuit 51 and unity gain buffer (operational amplifier) 49. The output of the operational amplifier 49 is fed back to its minus terminal in unity gain buffer 49 as a voltage follower and input voltage is applied to its plus terminal. The data input terminal Din receives a time division analog pulse signal. OC represents an offset control signal. When it is "1" the analog switch 66 is turned on and "0" volts is compulsorily applied to unity gain buffer 49. However, when offset control signal OC is "0", the analog switch 66 is turned off and another analog switch 65 is turned on, and the data is input to unity gain buffer 49. When offset control signal OC is 1, 0 volt is compulsorily input to the neuron unit, thereby cancelling the offset voltage produced in the output of the operational amplifiers provided up to the output of the multiplier. Analog switches 65 and 66 control the switching of the OC signal in the positive and negative phases, respectively. A phase control circuit prevents the circuits from being turned on simultaneously. Hereinafter, this will be referred to as OC being subjected to phase control.

Positive and negative switching circuit 52 is formed by combining two amplifying blocks in cascade form. The amplifying block comprises an input resistor 72 (10 kΩ) and a feedback resistor (10 kΩ) to provide a 10/10=1-time reversed voltage. The sign of the analog voltage is determined depending on whether the signal passes through one or two stages of the amplifying block. The control voltage is a sign bit (SIGN) of the digital weight data and this sign bit is connected to the gates of MO switches 67 and 70. The control signal of the sign bit (SIGN) is also subjected to a phase control. When the sign bit (SIGN) is 1, the input voltage from the input unit 42 is reversed by the first amplifying block in switching circuit 52. The reversed input voltage then passes through the amplifying block containing amplifier 71 in the following stage as switch. 67 is turned on, thereby providing a positive phase signal. Where the sign bit (SIGN) is 0, switch 69 is turned on by reverse circuit 68. Then, as switches 67 and 70 are turned off, the input signal from the input unit 42 is applied to the minus terminal of operational amplifier 71 in the post (second) stage through switch 69. Therefore, operational amplifier 103 with resistor 72 in the previous stage and resistor 7 for feedback of the operational amplifier 71 in the following stage constitute an amplifying block which is a unity gain inverter. That is, the input of the input unit 42 is negative when the sign bit is negative, and positive when the sign bit is positive. This provides a voltage according to whether the synapse connection is excited or suppressed. An output from positive and negative switching circuit 52 is supplied to a point, namely, a reference voltage terminal 74, of R-2R-resistor circuit network of D/A converter 53.

The R-2R system in the D/A converter 53 will now be explained. The internal switch, e.g., 75, is turned on or off depending on the digital weight data from MSB to LSB. When the digital value is 1, the current flows through switch (transistor) 75 into an imaginary ground 78 of operational amplifier 76. This imaginary ground 78 is maintained at the same voltage as the plus terminal of amplifier 76. The plus terminal of amplifier 76 is grounded, so that imaginary ground 78 is imaginary 0. In an exemplary D/A converter, R represents 10 kΩ and 2R represents 20 kΩ. A current flows in resistor 2R regardless of the state of the switch.

Whether or not the weight current flowing through resistor 2R flows toward imaginary ground 78 is determined by the value of the digital data. When the current flowing through the rightmost resistor 2R is determined to be I, the vertical current flowing in 2R corresponding to LSB located second from the right is provided as $(2R \times I)/2R = I$ by dividing the voltage applied to the right-most resistor 2R by 2R. Therefore, the current 2I flows in the horizontal right-most resistor R. The voltage $2R \times I + R \times 2I$ is applied to the vertical resistor 2R third from the right and the voltage is divided by 2R to provide the current 2I. Similarly, the currents through the vertical resistor 2R (20 kΩ) become 4I, 8I, 16I, or higher powers of 2 multiplied by I. The data from MSB to LSB determines whether or not the weight current of the second power of 2 multiplied by I flows into the minus terminal of the operational amplifier 76. Therefore, the current corresponding to the digital weight data flows into the imaginary ground 78 with an amplitude of the second power of 2 times I. As the input impedance of the operational amplifier is infinite, and the current flowing toward the imaginary ground 78 flows through a feedback resistor 77 of operational amplifier 76, the output voltage Vout of the D/A converter 53 is given by, $$V_{out} = -\frac{E}{2^n} \times (D_0 + 2 \times D_1 + 2^2 \times D_2 + \ldots + 2^{n-1} \times D_{n-1})$$

where E is the input voltage, $D_0$ is the LSB and $D_{n-1}$ is the MSB. That is, the output of the multiplying unit 43 is the value obtained by multiplying the input voltage by a weight. The weight coefficient is controlled by the digital value from MSB to LSB.

Adding unit 44 uses a Miller integrator in a time divisional manner, to carry out an accumulation and an adding operation on respective products of the time divisional multiplexing analog signal and the digital weight data. Sampling/holding unit 45 performs sampling/holding of the addition result.

Adding unit 44 is an integrator comprising resistor R and capacitor C in FIG. 5. The input unit of adding unit 44 contains time division adding control unit 55 and when the sample/hold signal is 1, the output of multiplying unit 43 is input to imaginary ground 79 of operational amplifier 102. When the S/H signal is 0, inverter 80 turns on switch 81 and the output of multiplying unit 43 is connected to ground through resistor R. Thus, the input is not added to capacitor C of adding unit 44. When the S/H signal is 1, the output voltage of multiplying unit 43 is input to the minus terminal of operational amplifier 102 through a resistor R. The current obtained by dividing the input voltage by resistor R is input to capacitor C through imaginary ground 79 to perform an integration.

Thereafter, when the S/H signal becomes 0 and multiplying unit 43 is disconnected from adding unit 44, multiplying unit 43 can multiply the next signal by the weight data. Offset cancelling unit 82 including a integration circuit containing capacitor C is provided with an offset cancelling function by using four switches. When the sampling hold (S/H) signal is 0 and the offset control signal OC is 1, switches 83 and 84 are turned on and switches 85 and 86 are turned off. When the offset control signal OC is 0, an input voltage is applied to the data input terminal of data input unit 42 via data input terminal $D_{in}$ and the corresponding output of multiplying unit 43 is applied to capacitor C through resistor R. Then, switches 85 and 86 are turned on and capacitor CT has a minus polarity on the side connected to minus terminal 79 of operational amplifier 102 and has a positive polarity on the side connected to the output of operational amplifier 102. When the offset control signal OC becomes 1, data input is compulsorily made 0. In this case, if an offset does not exist, even if the input signal is transferred through positive and negative switching circuit 52 and multiplying unit 43, the output of the D/A converter becomes 0. However, as the operational amplifiers 49, 103, 71, and 102 are employed and the offset voltage is activated, the offset voltage is added to capacitor C in adding unit 44 and is consequently stored. This is different from the case where offset control voltage OC is 0, switches 83 and 84 are turned on and the polarity of capacitor C is reversed. Therefore, the offset voltage produced upon receipt of the input signal is controlled by making the offset control signal OC "1" and changing the polarity of the capacitor C. The present invention achieves an equivalent offset cancelling function by reversing the polarity of capacitor C. Switch 87 is controlled by a reset signal. When the reset signal is received, the voltage of capacitor C is made 0 and the output of the adding block is compulsorily 0 as it is a resetting operation. This offset control signal OC is also subjected to phase control.

The output of adding unit 44 is supplied to sample holding unit 45 and stored in capacitor Ch through switch 88 when the phase-controlled sample hold control signal S/H$_{out}$ is 1. When the S/H$_{out}$ signal is 1, the control signal of switch 90 is turned to 0 by inverter 94 and one terminal of capacitor Ch is not grounded. When switch 91 turns on, the final output signal of the unit is applied to capacitor Ch through switch 91. That is, the final output signal at that time is fed back from the output terminal of operational amplifier 96 to the lower side of capacitor Ch. Thus, capacitor Ch stores the voltage obtained by subtracting the final output signal from the output of adding unit 44. This voltage stored in capacitor Ch is input to the plus side of unity gain operational amplifier 93 through switch 89. This operational amplifier 93 operates as a buffer and the output of the operational amplifier 93 is input to a sigmoid function unit 48. When the S/H$_{out}$ control signal is 1, switch 88 turns on and the difference between the output of the adder 44 and the final output value $D_{out}$ is stored in capacitor Ch. Since, at this time, switch 92 is turned on, 0 volts are compulsorily applied to operational amplifier 93. The offset voltage ΔV is applied to the lower side of capacitor Ch through switch 91 through sigmoid function unit 46, operational amplifier 96 and analog switch 100. Therefore, when the S/H$_{out}$ control signal is 0, namely, when switch 89 is turned on and switch 92 is turned off, the voltage stored in capacitor Ch, namely, the output of the adding unit 44 (offset voltage ΔV), is finally outputted through amplifier 93 and sigmoid function circuit 46. When the S/H$_{out}$ signal is turned to 1, the offset voltage formed at this timing becomes ΔV. As a result, the offset voltage is cancelled.

The non-linear function unit 48 for forming a sigmoid function block comprises non-linear selection circuit 62. The phase control SEL SIG signal is turned to 1, switch 95 is turned on and the output of sigmoid function circuit 46 is applied to operational amplifier 96. However, when the SEL SIG signal is 0, the control signal of switch 98 is made 1 through inverter 97, switch 98 is turned ON and the output of the sigmoid function is cut. The output voltage of sample and hold unit 45 is directly input to operational amplifier 96 without having a sigmoid function applied to it. Operational amplifier 96 is basically a unity gain operational amplifier for directly feeding back the output to the minus terminal, and is operated as a buffer. It acts as a buffer in making the output impedance 0. Output block 47 is connected to time division output unit 64 and output control unit 63. When CSI is "1", switches 99 and 101 are turned on. The final output operational amplifier 96 outputs the final output at data output $D_{out}$. This output is then fed back to the minus terminal of operational amplifier 96 and simultaneously to sample/hold unit 45. On the other hand, when CSI is 0, switch 100 is turned on and switch 101 is turned off. Therefore, the output of amplifier 96 is not produced on the $D_{out}$ data line. However, as switch 100 is turned on to provide a unity gain buffer voltage, the voltage follower operation of operational amplifier 96 is not disturbed, but is carried out. Output control unit 63 determines whether the output pulse voltage is transmitted by control signal CSI for a daisy chain operation. CSI is then outputted as CSO through a delay circuit 105 and the timings of the output analog signals to the other adjacent neuron unit(s) in the same layer is determined. Therefore, the present invention transmits an analog signal in a time divisional manner from output unit 47. This does not conflict with other output signals from other neuron units.

Figure 8:
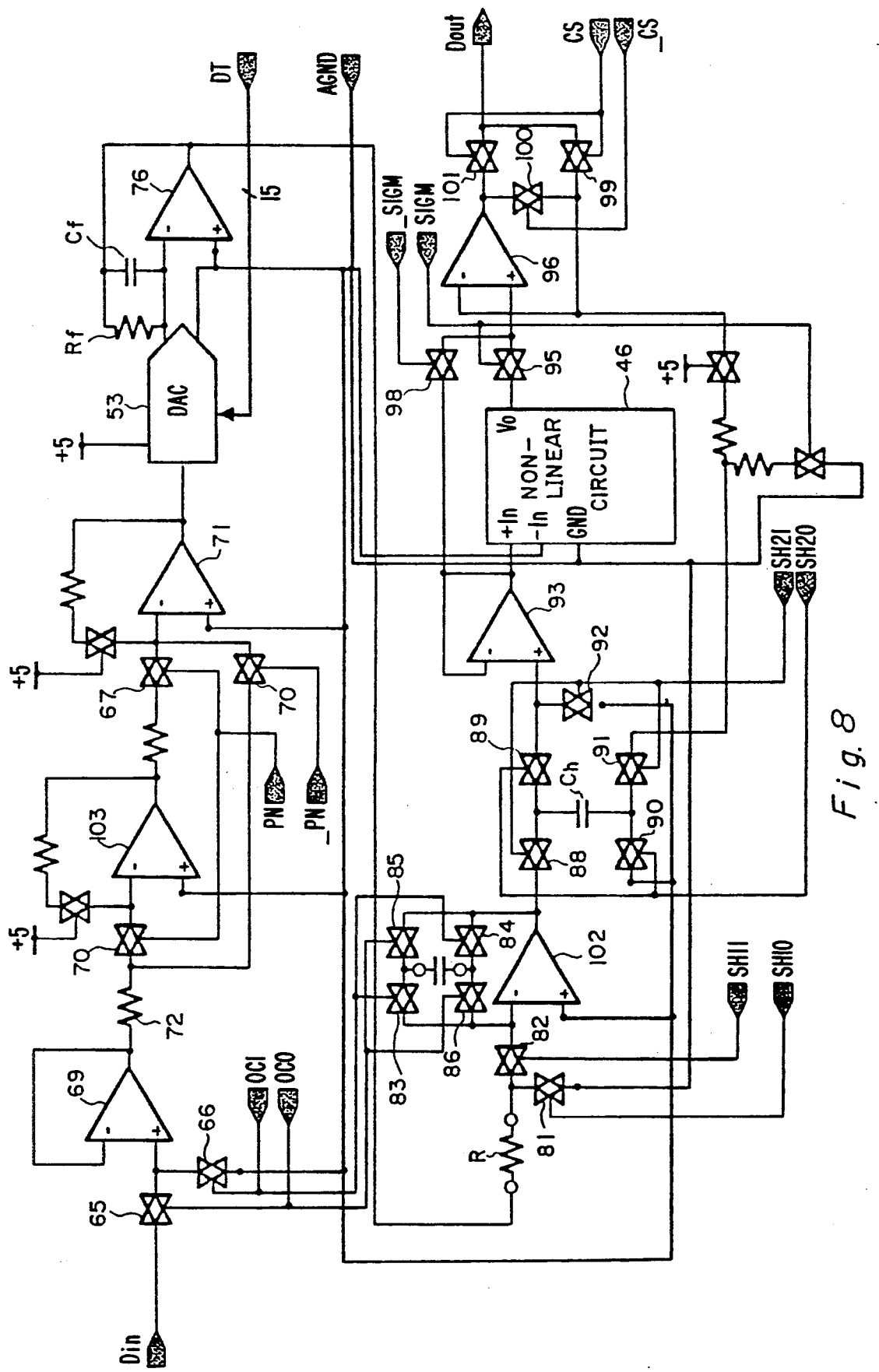
FIG. 8 is a detailed circuit diagram of another embodiment of the basic unit used for the present invention.

The phase control shown in FIG. 8 is realized by forming the signals offset cancellation OC; sign SIGN;

sample hold S/H; sample hold S/Hout; sigmoid selection signal SEL SIG; daisy chain signal CSI in FIG. 7 from two signals, namely, OC0 and OC1; PN and minus PN; SH11 and SH10; SH21 and SH20; minus SIGM and SIGM; and CS and minus CS; respectively. One control signal is formed by two signals comprising a positive phase and a negative phase, and is shifted by shifting the phase of respective signals so that the positive phase of the control signal does not turn the switch on at the same time as the negative phase of the control signal turns on a different switch. The capacitor Cf and resistor Rf connected to the output terminal of D/A converter 53 makes the feedback signal from operational amplifier 76 match the operation speed of D/A converter 53, and D/A converter 53 receives digital input from the DT terminal. Parts in FIG. 8 which are the same as those in FIG. 7 are given the same numbers. Therefore, their explanation is omitted.

Figure 9:
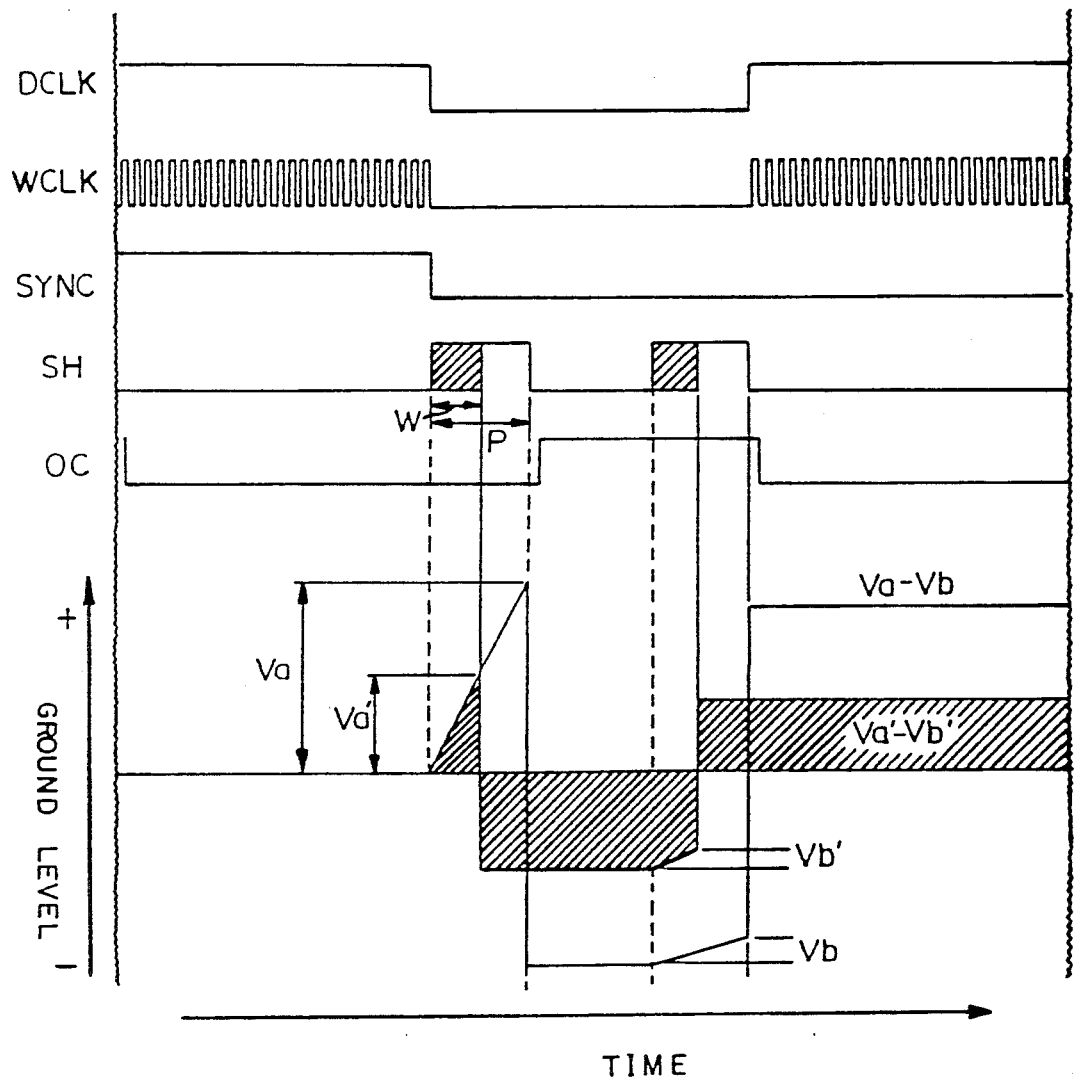
FIG. 9 shows a view for explaining the timing of an integrator used in the basic unit in the present invention.

FIG. 9 shows a timing chart for an integrator. Data clock DCLK and weight clock WCLK are basic operation clocks. When data clock DCLK is high, a high-speed weight clock WCLK is outputted during a half period of the data clock DCLK. Weight clock WCLK is a synchronizing clock for inputting serial weight data to the integrator. Data clock DCLK is a basic clock for processing an analog input signal. Synchronizing signal SYNC can achieve synchronization of respective analog neuron units within respective layers. The operation of the output voltage of the integrator is shown by a triangular waveform in the lower part of FIG. 9. The integrated waveform is controlled by a pulse signal of sample/hold control signal S/H. During the period of high sample/hold S/H control signal, an integration is carried out. Namely, a charge is applied to capacitor C (FIG. 5) of the integrator via terminals Ct+ and Ct− of the adder 23. During the period in which the sample/hold control signal (S/H pulse) is high, this charge is gradually accumulated in the capacitor C in order to increase the voltage. When the sample/hold (S/H) control signal pulse is low, the charging operation is terminated. Therefore, only the charged quantity during the scope of the integration time is important. Thus, the pulse width of the sample/hold control signal is controlled to expand or compress the scope of the integration period. Therefore, even if the input signal is the same, the output of the integrator becomes charging voltage Va′ when the sample/hold control signal S/H has a pulse width W.

When sample/hold control signal S/H is low, the polarity of the capacitor of the integrator is changed and the integration output, to which an offset component is added, is reversed. When offset control signal OC is high and sample/hold control signal S/H is also high, offset voltage Vb (Vb′) is added to the capacitor. When the S/H signal becomes low again, and the offset cancelling signal OC becomes low, the integral output value Va-Vb (Va′-Vb′), in which the offset component is cancelled, is subjected to a sample/hold operation.

Figure 10A:
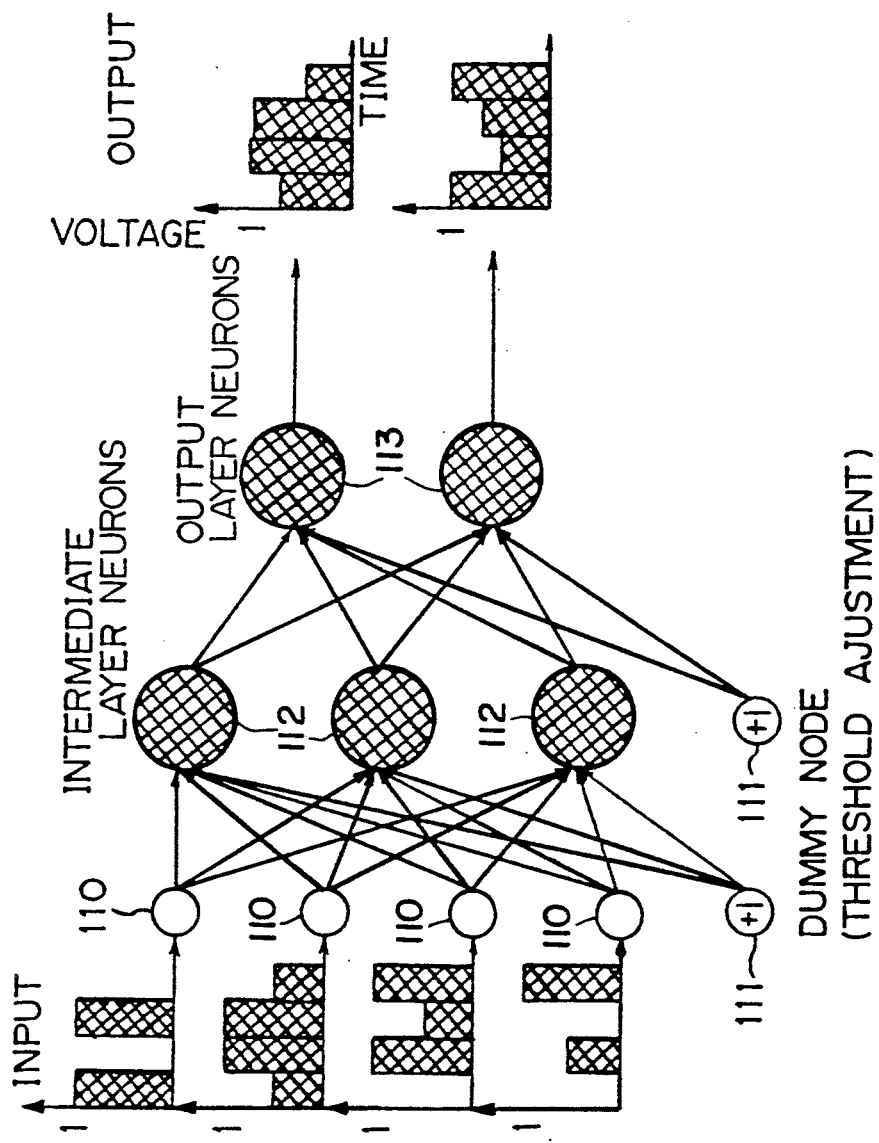
FIG. 10A shows a conceptual view of a layered type network.

Next, a layered type neural network is explained. FIG. 10A is a conceptual view of a layered type network. In this network, the input data enters input nodes 110 of the input layer on the left side and is sequentially processed in the rightward direction. Respective neurons 112 of the intermediate or hidden layer receive output from the previous layer including dummy node 111, forming a complete connection between two layers. If there are four input nodes 110 in the input layer, one dummy node 111 is added to it. Thus, it is observed from respective neurons 112 in the hidden layer that the input layer has five neurons. Dummy node 111 controls the threshold value and adds the constant value "−Θ" to the value x obtained by the result of the sum of the product and included in the following sigmoid function, and then shifts a waveform defined by the following equation in a positive direction along the x axis, thereby providing the function f(x−Θ).

$$f(x) = \frac{1}{1 + \exp(-x)}$$

This is equivalent to a change in the weight corresponding to dummy node 111 within each neuron with the constant value Θ produced by a later described maximum value node circuit. Therefore, if the weight corresponding to the dummy is prepared, the threshold value may be expressed by the weight instead of using a dummy node. In the example illustrated in FIG. 10A, it is observed by neuron 113 in the output layer that the intermediate layer has four neurons. The input data applied to the input layer is subjected to the sum-of-the-products arithmetic operation by using the weight data in intermediate layer neurons 112 and output layer neurons 113, resulting in the production of the output data.

Figure 10B:
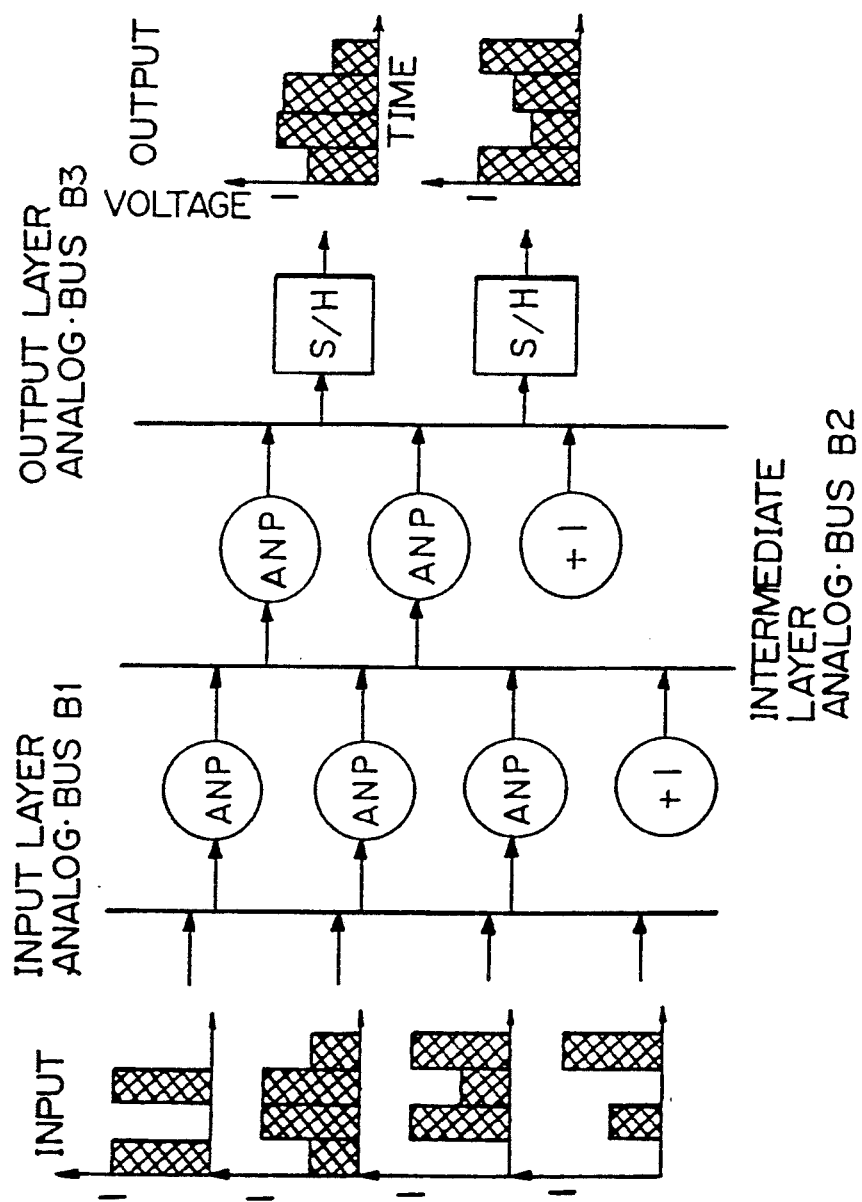
FIG. 10B shows another conceptual view of a layered type neural network.

The layered structure shown in FIG. 10A can be implemented by using the ANP of the present invention as illustrated in FIG. 10B. Independent analog buses B1, B2 and B3 are provided between respective layers, namely, between the input layer and the intermediate layer, and between the intermediate layer and the output layer, and at the output layer. All the vertical ANPs operate in parallel. A sample hold circuit S/H is provided at the output of the output layer.

Figure 11:
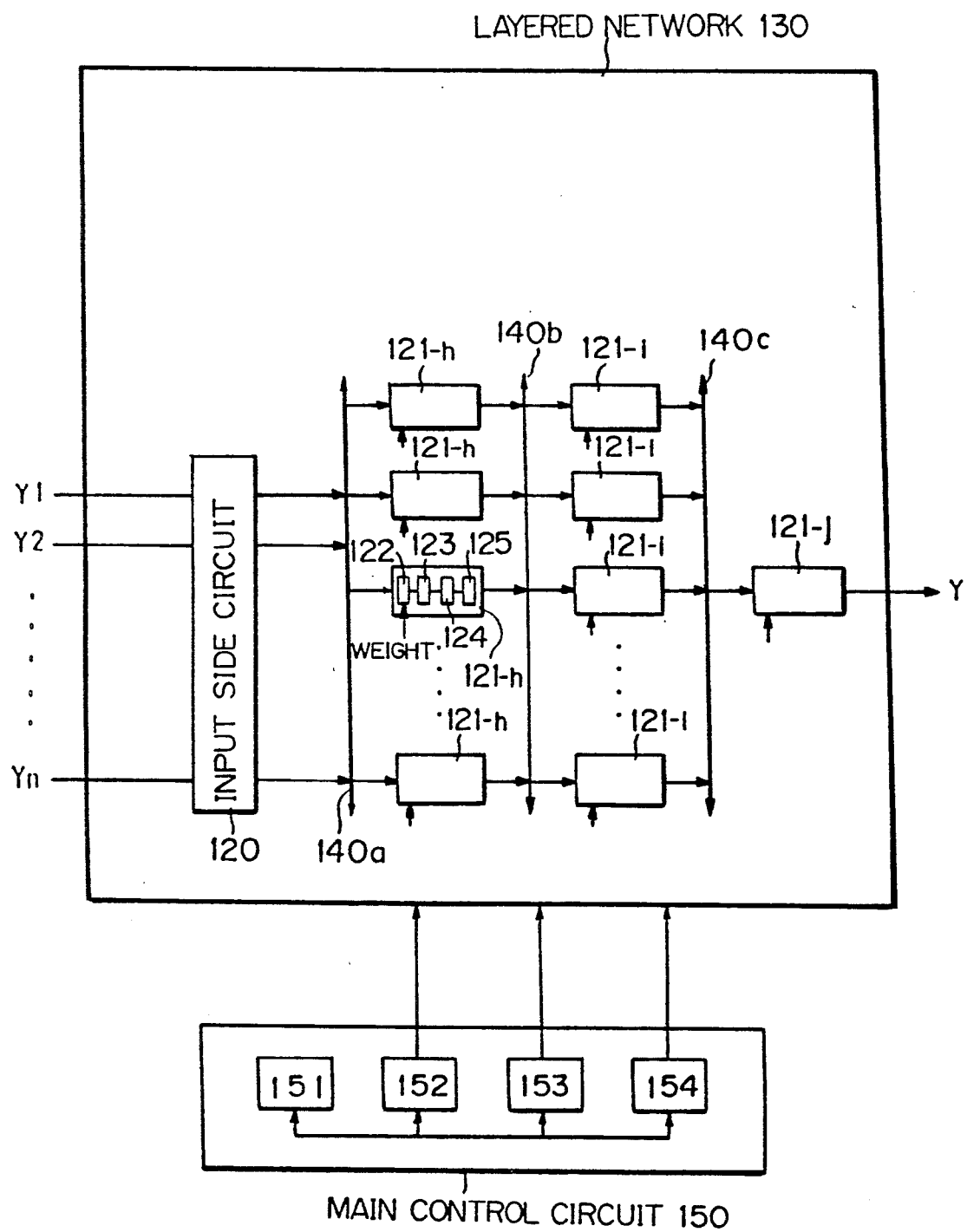
FIG. 11 shows a block diagram of an embodiment for forming a layered type network by a neuron computer of the present invention.

FIG. 11 shows an arrangement of an embodiment of the present invention. Input side circuit 120 corresponds to an input layer and 121 designates each analog neuron processor ANP forming a basic unit of a layered network. 121-h designates a plurality of basic units forming an intermediate layer, including the first or input layer of basic units. When there are more than three layers, 121-h designates a plurality of basic units forming one stage of or a plurality of stages of the intermediate layer and 121-i designates one or a plurality of stages of the intermediate forming the hidden layer and 121-j designates an output layer. An electric connection is formed between basic units 121-h and basic units 121-i, between two basic units 121-i, and between basic units 121-i and basic unit 121-j. A layered network designated by 130 is formed based on a weight determined by respective connections.

Each basic unit 121 has at least multiplying unit 122, adding unit 123 and threshold unit 124. Further, it is sometimes provided with output maintaining unit 125. Multiplying unit 122 receives a plurality of units and corresponding weights, and performs a multiplication operation. Adding unit 123 adds a multiplication result of inputs from all basic units 121 in the previous layer, the multiplication results being obtained by multiplying unit 122.

Threshold unit 124 converts the addition results obtained by adding unit 123 to a threshold value function of a nonlinear type and calculates a final output. When output maintaining unit 125 is provided, the final output obtained by threshold value unit 124 is maintained. The input and output to basic unit 121 is realized by an analog signal.

Analog buses form a common line between an input layer and the front-most stage of the intermediate layer (bus 140-a), between respective intermediate layers (bus 140-b) and between the last stage of the intermediate layer and output layer (bus 140-c). 150 is a main control circuit, which controls data transfer in a layered network of 130. The main control circuit 150 is provided with driving unit selection means 151, weight setting means 152, threshold value processing actuating means 153 and output value transmitting means 154.

In this embodiment, driving unit selection means 151 sequentially selects basic unit 121 in the previous stage of the layer. Output value transmitting means 154 is synchronized with the selection process and the final output of the analog signal maintained by the selected basic unit 121 is processed to be output to basic unit 121 of the post-stage layer in accordance with a time divisional transmission format through analog bus 140. When this input is received, multiplying unit 122 of basic unit 121 of the post-stage layer sequentially selects the weight corresponding to the connection with basic unit 121 of the prestage layer, the weight being determined by weight setting means 152, and performs a multiplication process on the input and weight. Adding unit 123 sequentially adds the multiplication result obtained by multiplying unit 122. When all the sum-of-the product processes of basic unit 121 in the prestage layer are confirmed to be completed, threshold value process actuating means 153 performs a process of converting the signal by using nonlinear threshold value function f. Thus, basic unit 121 outputs $f(X-\Theta)$. Then, the post-stage layer becomes the new prestage layer and the same process is repeated for the following post-stage layer. Because of this latter transmission system, the output pattern corresponding to the input pattern is output from the output layer 121-$j$ of the layered network.

Figure 12:
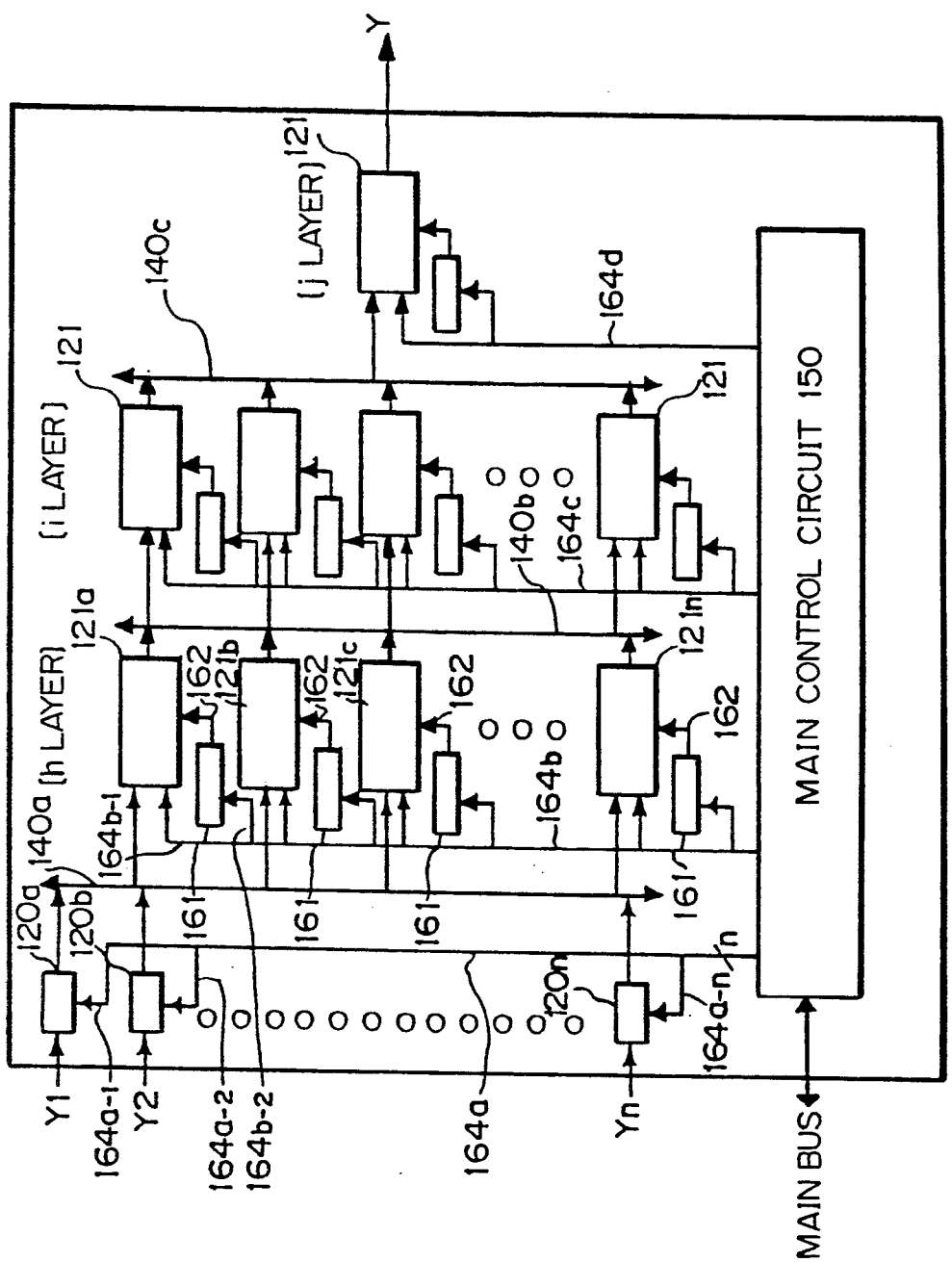
FIG. 12 is a detailed block diagram of the embodiment shown in FIG. 11.

FIG. 12 shows an embodiment of the network structure data process apparatus formed by connecting a plurality of basic units 121 in a layered manner. This embodiment temporarily holds a weight provided to respective basic units 121 outside the units and performs a control of CSI by a main control circuit.

Figure 1:
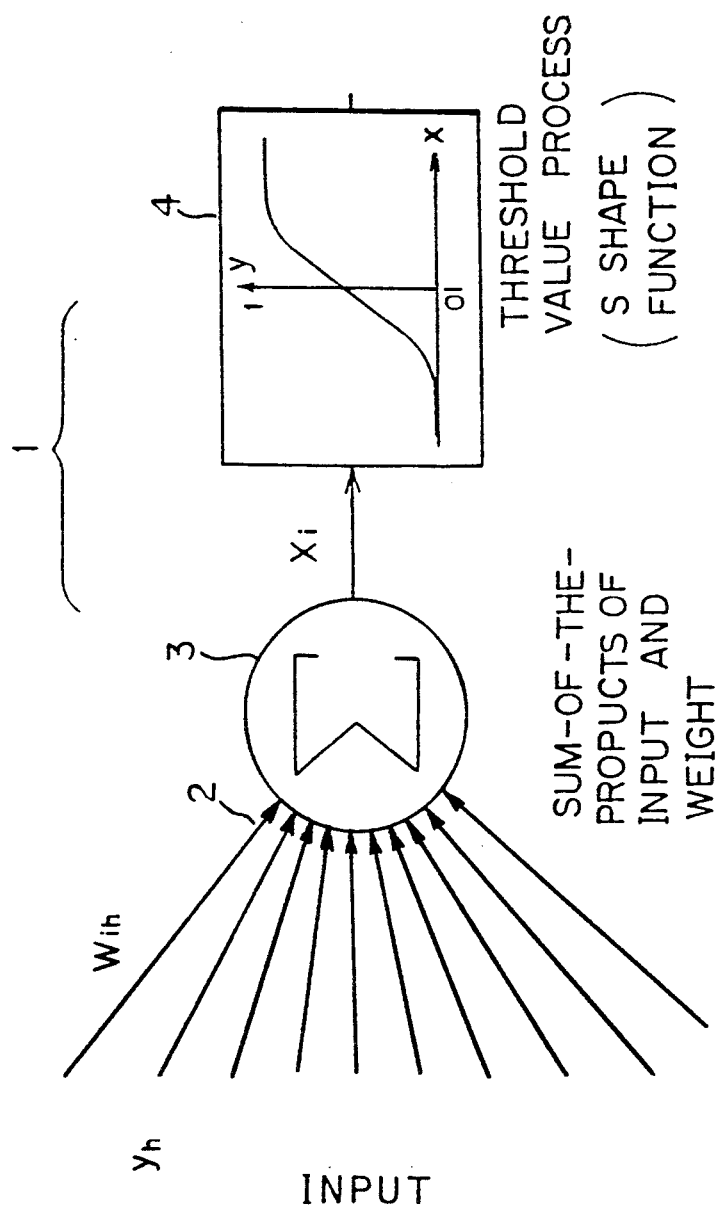
FIG. 1 shows a principle structure of a basic unit of a neuron model.
Figure 2:
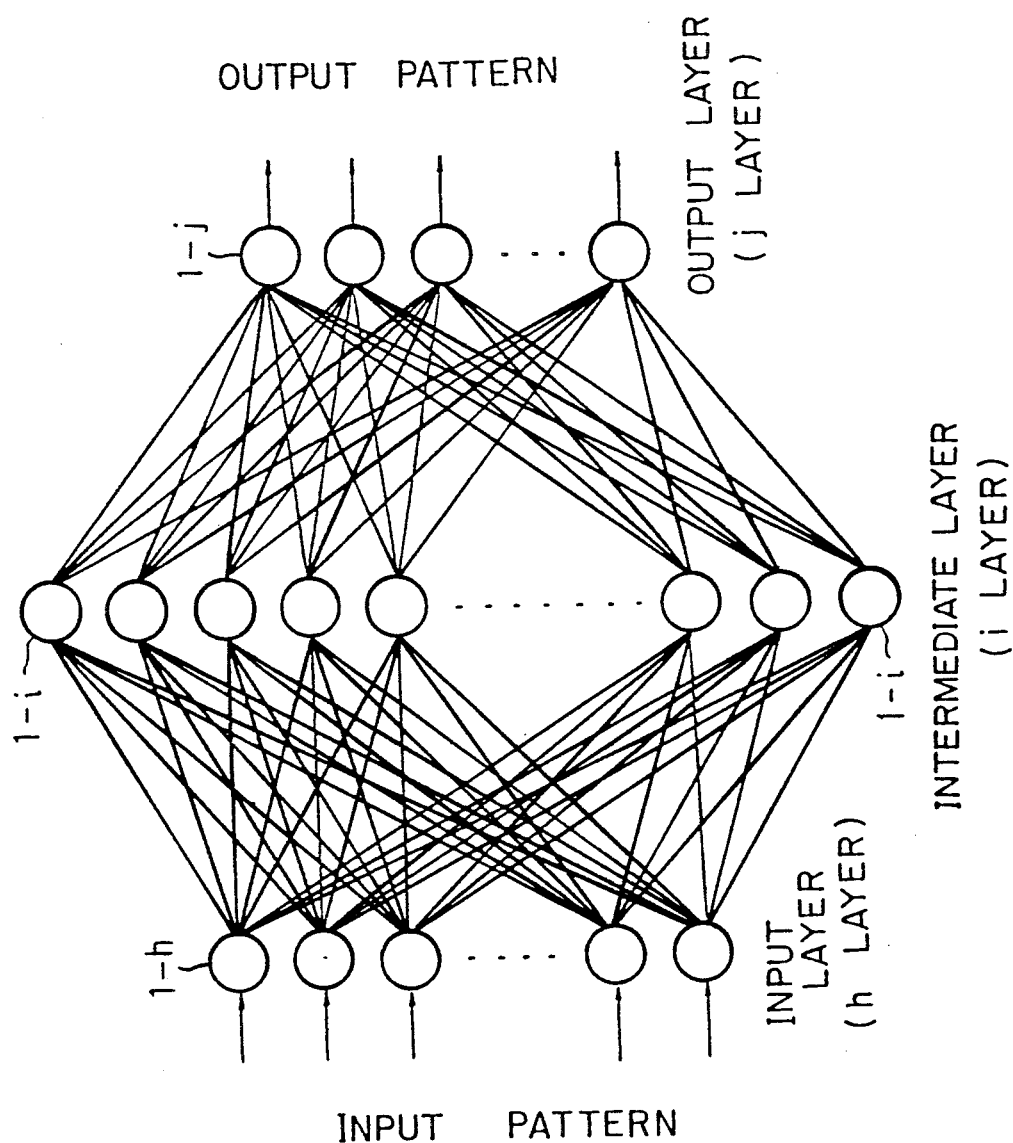
FIG. 2 shows a conceptual view of a structure of a layered type neural network.
Figure 3:
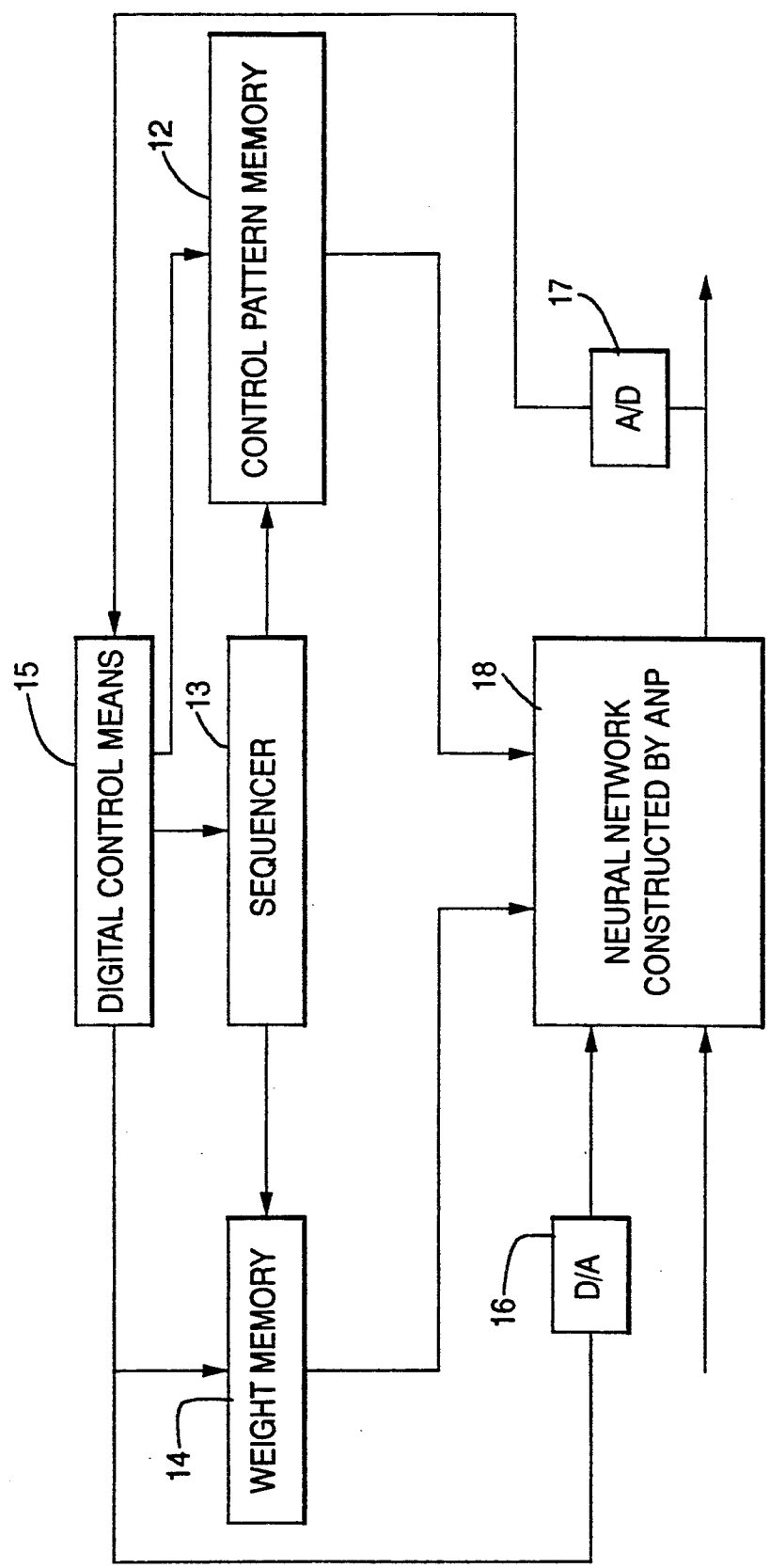
FIG. 3 is a principle block diagram of an embodiment of the present invention.

FIG. 12 shows the structure of the embodiment of the layered network shown in FIG. 2. In this embodiment, the electrical connection between the layer structure of the layered network is realized by a single common analog bus 140 (represented in FIG. 12 by the analog buses 140a-140c). Accordingly, the final value outputted from the output switch 36 (FIG. 6) of basic unit 121 is constructed such that it is outputted in the output mode of the analog signal, while the final output value is inputted to basic unit 121 located in the following stage layer. The input layer is designated by h, the hidden layer by i, and the output layer by j, as shown in FIG. 2.

A weight output circuit 161 is provided for respective basic units 121 and outputs the weight for weight holding unit 38 (FIG. 6) of basic unit 121. Weight signal line 162 connects the output of weight output circuit 161 through weight holding unit 38, provides input side circuits 120a-120n in accordance with the number of input patterns, and outputs an initial signal to the input layer of the layered network as an input pattern. Synchronizing control signal lines 164a-164d transfer the synchronizing control signals from main control circuit 150 carrying out the control of the data transfer to weight output circuits 161, input side circuits 120 and control circuits 39 of the basic units 121. Synchronization control signal lines 164a-164d are designated by common lines in the drawing but the circuits are connected to the main control circuit 150 via individual signal lines.

Figure 13:
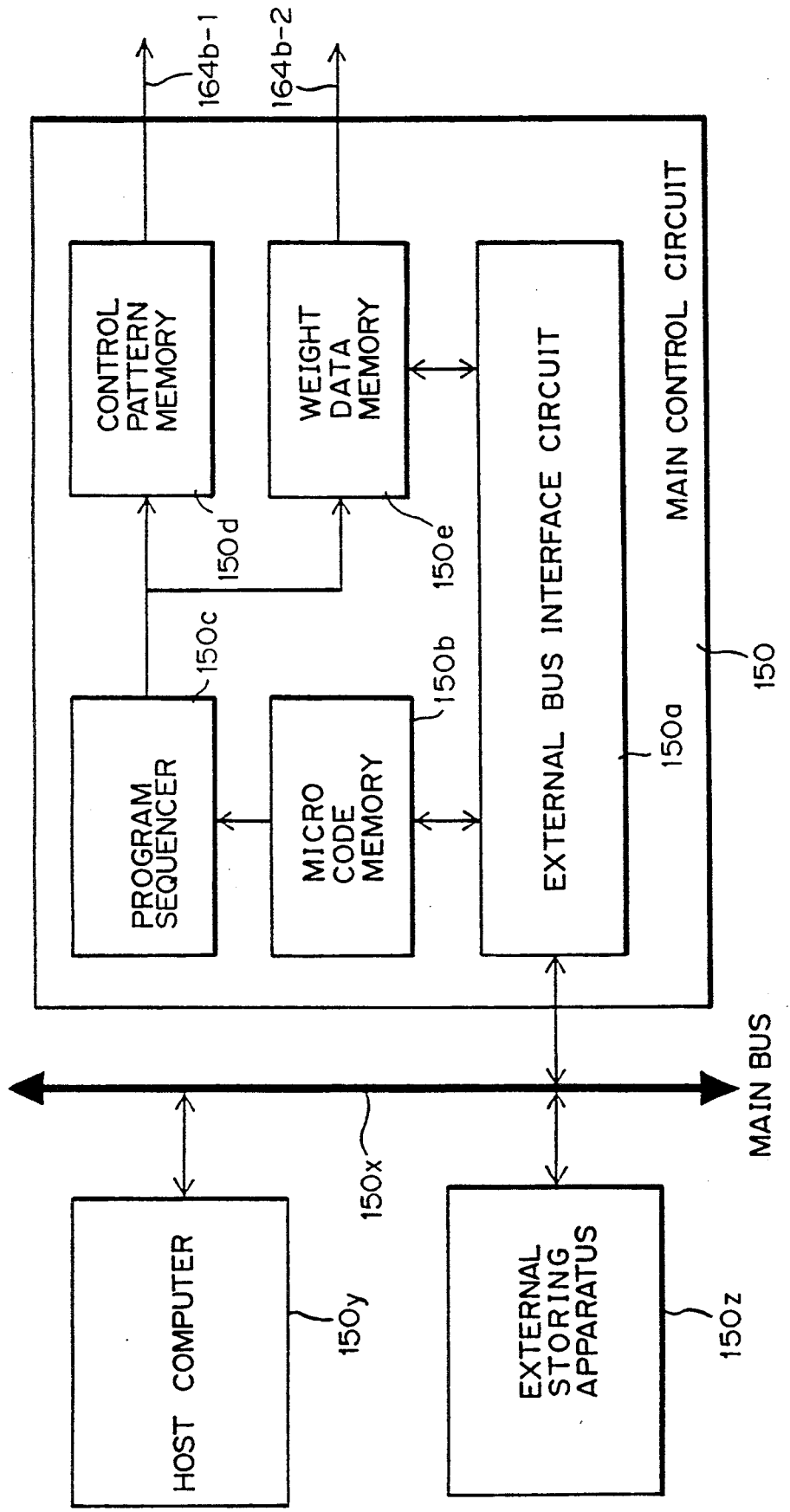
FIG. 13 shows a diagram of a system arrangement of a main control circuit.

FIG. 13 shows in detail the system of main control circuit 150.

Main control circuit 150 comprises external bus interface circuit 150a, microcode memory 150b, program sequencer 150c, control pattern memory 150d and weight data memory 150e. External interface circuit 150a is connected to host computer 150y and external memory apparatus 150z through main bus 150x and receives an operation instruction from host computer 150y. Microcode memory 150b stores a microcode for defining operation of program sequencer 150c. Program sequencer 150c controls access to control pattern memory 150d and weight data memory 150e in accordance with a microcode within microcode memory 150b. Control pattern memory 150d has output signal lines connected to input side circuit 120 and basic unit 121 in an initial layer, a hidden layer and an output layer, individually. It turns the output signal lines on or off to select each of respective sets, that is, respective sets of input side circuit 120, input layers, hidden layers, and output layers or basic units 121 in a time divisional manner, in accordance with an instruction from program sequencer 150c. Weight data memory 150e provides respective basic units 121 with weight in synchronization with the time divisional input signal in accordance with the instruction from program sequencer 150c, by providing the weight of digital data to respective weight output circuits 161. Host computer 150y includes a processing unit and a main storage, determines a weight by a learning algorithm such as back propagation and provides the input pattern Yi. The external storage device stores data for forming a neuron computer.

The operation of the embodiment shown in FIGS. 12 and 13 is next explained, with reference to the timing chart shown in FIG. 14.

When a request for conversion to an output pattern is provided by host computer 150y through main bus 150x, main control circuit 150 transmits an output control signal sequentially and cyclically to an input side circuit 120 and selects a plurality of input side circuits 120 sequentially and cyclically. Namely, main control circuit 150 sequentially selects input side circuit 120 from control pattern memory 150d in accordance with an instruction of program sequencer 150c by sequentially turning on synchronization control signal lines 164a for respective input side circuits 120. Namely, main control circuit 150 turns on only synchronization control signal (CSI) line 164a (e.g., 164a-1 in FIG. 12) selected from n synchronization control signal lines to open a gate of input side circuit 120a, in order to output input pattern Y1 supplied to initial signal output circuit 120a to analog bus 140a and turns off other synchronization control signals 164a. Next, main control circuit 150 turns on a synchronization control signal on line 164a-2 to open a gate of input side circuit 120b, in order to output an input pattern Y2 of input side circuit 120b to analog bus 140 and turns off other synchronization control signal lines 164a. The following operation is conducted as recited above. Main control circuit 150 performs an ON and OFF operation on synchronization control until the input pattern Yn of input side circuit 120n is outputted to analog buses 140a. Main control circuit 150 simultaneously sets the outputs of weight data memory 150e for respective weight output circuits 161 through synchronization control signal lines 164b in synchronization with ON operations of respective synchronization control signal lines 164a to provide weight to respective weight output circuits 161 of respective basic units 121 in the input layer h.

Figure 14B:
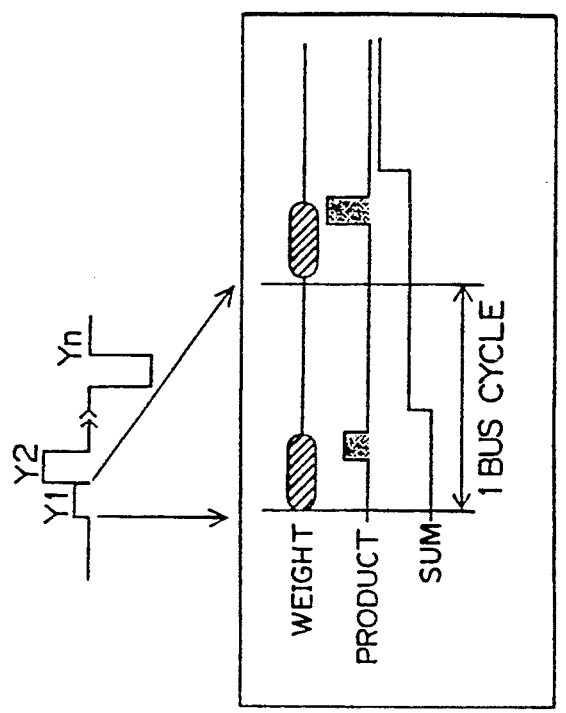
FIGS. 14A and 14B are timing charts of a signal process in the embodiments shown in FIGS. 11 and 12.
Figure 14A:
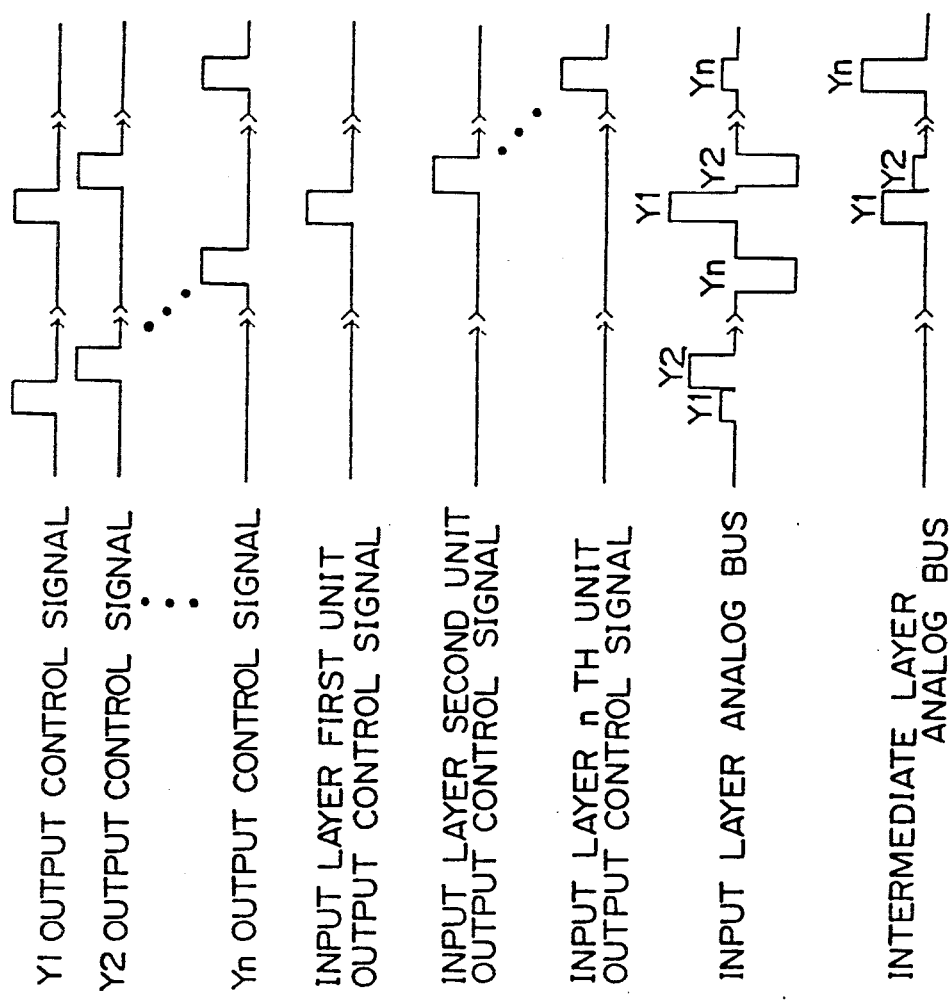

In FIG. 14A, a synchronization control signal on synchronization control signal line 164a is represented by "Yi output control signal" (i=1 to n) and input side circuit 120 is sequentially and cyclically selected by these signals, where n designates the number of input side circuits 120. The input side circuit 120i, selected above, transmits an analog signal Yi provided as an input pattern to an analog bus 140 (represented by an input layer analog bus 140a in the drawing) provided between the h layer and the input side circuits 120. This input pattern is given through host computer 150y. Accordingly, an analog signal Yi is sequentially transmitted on the input layer analog bus 140a sequentially. The number of the analog signal Yi corresponds to that of input side circuit 120i. Initial input pattern Yi, and following input patterns Yi are transmitted one after another repeatedly.

Multiplication process unit 122 of respective basic units 121 in the h layer receives the transmitted analog signal Yi transmitted and uses a weight Wi of weight holding units 38 set by main control circuit 150 to carry out an arithmetic operation (Yi·Wi). The weight Wi is previously determined in MPU in accordance with the back propagation method Accordingly, main control circuit 150, as shown in FIG. 14B, sets a weight Wi corresponding to selected input side circuit 120 into weight holding unit 38 in respective basic units 121 of the h layer through weight output circuit 161 in synchronization with a selection process of input side circuit 120. The products of Yi and Wi are obtained in 1 bus cycle, and the sum of the products and the previous sum-of-products are obtained. It is possible to set a weight in basic unit 1 in accordance with any mode of an analog signal or digital signal. The weight is designated by respective connections and as stated above, should be expressed accurately by $W_{ij}$ (j indicates the number of the basic unit in the h layer) but is represented by Wi to simplify the explanation.

Figure 15:
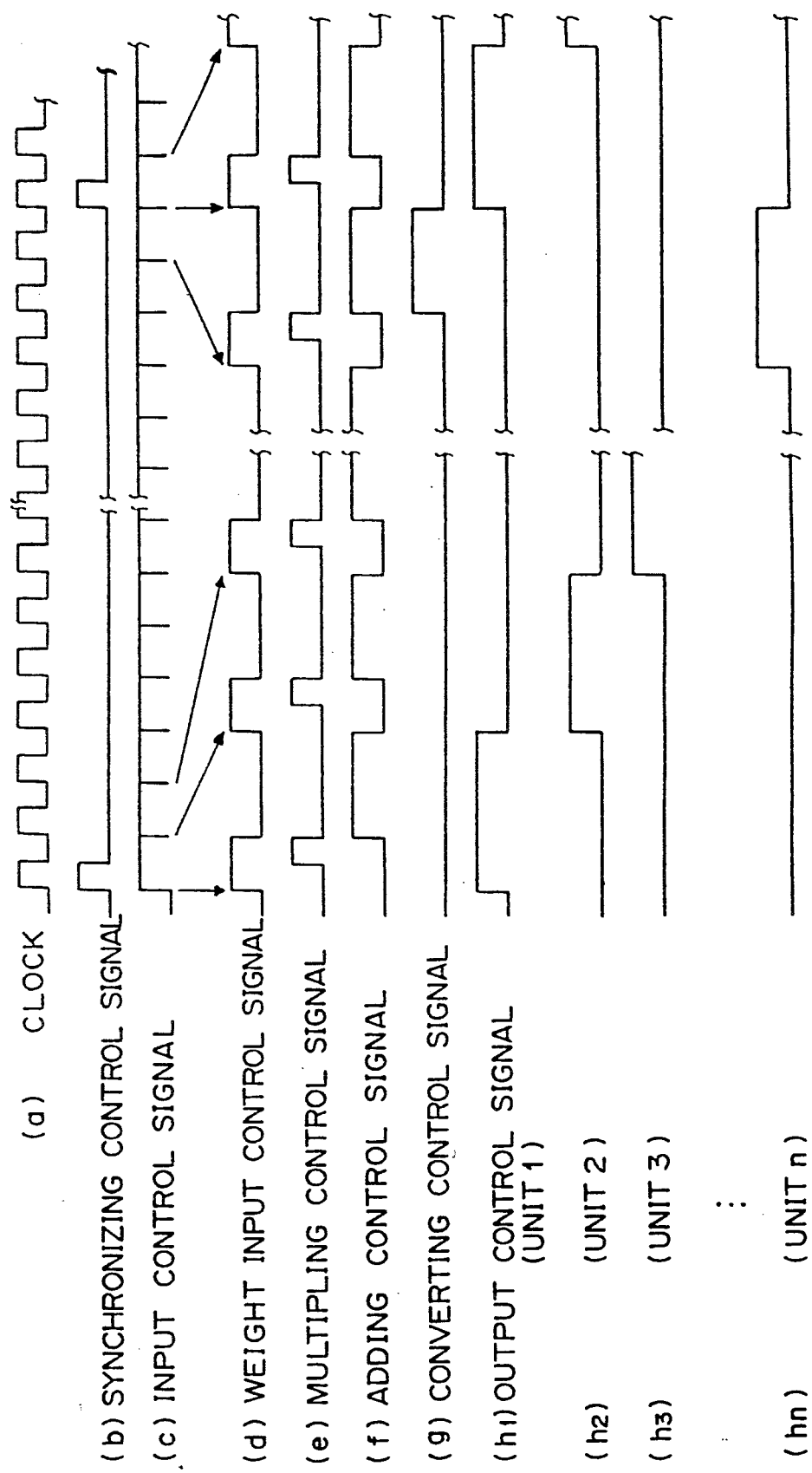
FIG. 15 is also a timing chart of a signal process of the embodiments shown in FIGS. 11 and 12.

The processing operation is explained by referring to the timing chart shown in FIG. 15, for signal processing of a basic unit 121 with reference to basic unit 31 in FIG. 6. Basic unit 121 (for example 121a in FIG. 12) in the intermediate layer is explained.

When control circuit 39 (FIG. 6) receives a synchronization control signal from control pattern memory 150d of main control circuit 150 through synchronization control signal line 164b (represented by 164b-1 in FIG. 13) it turns ON input control signal (c) corresponding to OC and makes input switch unit 37 conductive. At the same time, control circuit 39 turns ON weight input control signal (d) opening a gate buffer 38a and an output control signal (hl) corresponding to CSI for making output switch unit 36 conductive. Then, in synchronization with a clock (a) main control circuit 150 sequentially turns ON CSI of the synchronization control signal line 164a and input pattern signals Yi maintained in input side circuit 120a, 120b ... 120n are provided to multiplication type D/A converter 32a through analog bus 140 and input switch unit 37.

Main control circuit 150 provides a weight of weight data memory 150e to weight output circuit 11 through synchronization control signal line 164b (represented by 164b-2 in the drawing) and this weight (digital data) Wi is stored in weight holding unit 38 through buffer 38a. Then, the output control signal (hi) is turned ON for only one period of the clock (a), the analog gate of the sample hold circuit in the basic unit 121 is made in an open state for this period, and the held analog value is outputted to i layer analog bus 140b through output switch unit 36. The weight Wi of the digital value is stored in holding unit 38. Multiplication control signal (e) is then turned ON and multiplication type D/A converter 32a multiplies analog signal Yi received through switch unit 37 by the weight Wi, thereby outputting the multiplication result as an analog signal. Next, as the adding control signal (f) is turned ON, an analog adder 33a formed by an integrator operates an analog value (which is initially cleared to 0) maintained immediately before in sample hold circuit 33b is added to the multiplication result of D/A converter 32a, thereby storing the addition result in sample hold circuit 33b again.

In accordance with the above operation, one bus cycle is completed and input pattern Y2 for input side circuit 120b is provided from input switch unit 37 in synchronization with the next clock (a) and weight output circuit 161 provides weight W2 corresponding to the input pattern Y2. Thus, input pattern Y2 is multiplied by weight W2 and the multiplication result is added to the value held in sample hold circuit 33b. Thereafter, this operation is repeated until the process for an input pattern Yn multiplication of the input pattern Yn by Wn is completed, conversion control signal (g) is turned ON. The value obtained by accumulating the multiplication result is then inputted to non-linear type function generating circuit 34a of threshold processing unit 124 (FIG. 11) and the corresponding Y value is maintained. Therefore, the threshold processing unit 124 performs the following arithmetic operation.

$$Y=1/(1+exp(-X+\Theta))$$

Therefore, the final output value Y, which is the final operational output of the basic unit 121, can be obtained and is maintained. This result is output to analog bus (140b) in the following stage at the following rise of the output control signal. When this value Y is obtained, the accumulated value in accumulation unit 33 is in synchronization with a selection cycle of the next input side circuit 120 and is cleared by a clear signal.

In accordance with the operation described above, respective basic units 121 provide the final output value Y from input pattern Yi and weight Wi.

Hereafter, the explanation returns to the structure of the embodiment shown in FIG. 12. As explained in detail by referring to FIG. 15, the process for inputting the pattern set in all the input side circuits 120 is completed and then main control circuit 150 again provides the respective basic units 121a-121n with synchronization control signals. Thus, a similar operation is carried out in accordance with input pattern Yi newly provided to input side circuit 120 and a new weight Wi.

On the other hand, the final output value Y of the basic unit 121 of the h layer thus obtained is held and transmitted in a time divisional manner to basic unit 121 of the i layer positioned in the next stage through analog bus 140b in the same manner as for input side circuit 120. Namely, main control circuit 150 controls output signals hl to hn (FIG. 15) provided to control circuit 39 for respective units 121a to 121n in the h layer through synchronization control signal line 164b (which is represented by 164b-1 in FIG. 12) sequentially and cyclically, thereby turning the output switch unit 36 of the basic units 121a, 121b, . . . ON sequentially and cyclically. Therefore, the analog signal of the final output value maintained in the respective basic units 121a to 121n is transmitted in a time divisional manner to multiplying unit 122 of respective basic units 121a to 121n in the i layer period. Respective basic units 121a to 121n in the i layer carry out the same operation as described above. They use the final output value Y of basic unit 121 in the h layer obtained by the above process, and carry out transmission processing for basic unit 121 in the i layer in a similar time divisional manner, thereby dividing final output value Y of basic unit 121j in the output layer. Main control circuit 150 similarly controls respective basic units through synchronization control signal lines 164c and 164d individually connected to respective basic units 121 in the intermediate layer and the output layer.

Figure 16:
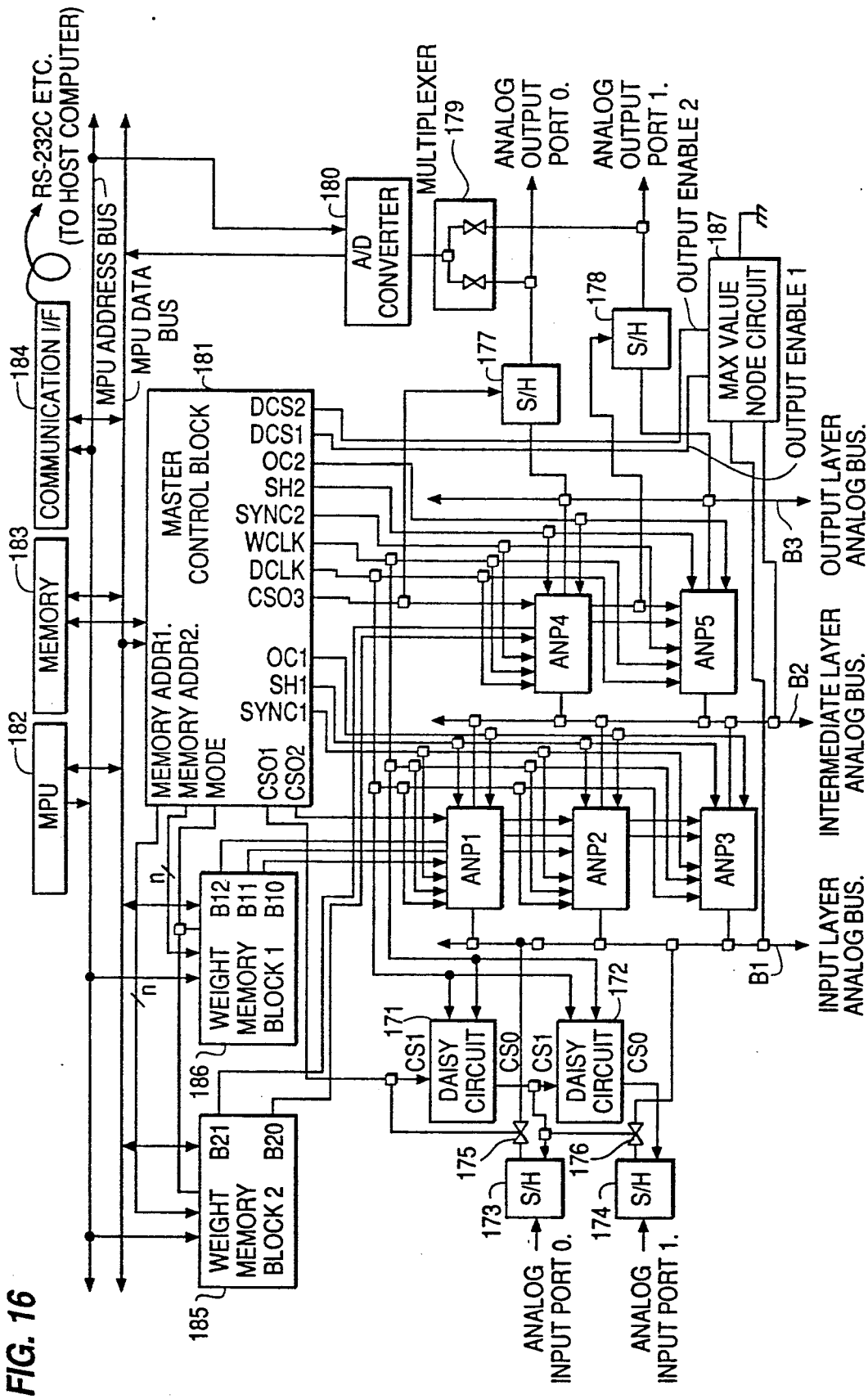
FIG. 16 is a detailed block diagram of an embodiment of a neuron computer of the present invention which is realized by a layered type neural network.

FIG. 16 is a block diagram of the layered neuron network of the neuron computer of the present invention. Analog neuron processors ANPs 1 to 5 comprising neuron chips, are provided in parallel in respective layers and analog buses B1, B2 and B3 are independently provided between two layers. In FIG. 8, the intermediate layer is formed by ANPs 1, 2 and 3 and the output layer is formed by ANPs 4 and 5. The input stage does not have any ANPs, but has daisy circuits 171 and 172 for inputting the analog input signal in good timing. The circuits designated by S/H are sample/hold circuits 173 and 174.

ANPs 1 to 5 need logic signals from control and many control signal lines are connected to respective layers from master control block (MCB) 181. Data clock DCLK is applied to daisy circuits 171 and 172 at the input side of all the ANPs and constitutes a basic clock for analog processing. A weight clock WCLK is applied to all the ANPs and daisy circuits 171 and 172 at the input side. This provides a high speed clock for the weight data. The weight data is input to respective ANPs 4 and 5 and ANPs 1, 2 and 3 from weight memory blocks 185 and 186 in synchronization with the weight clock WCLK. The synchronization clock SYNC1 is applied to ANP1-ANP3 in the intermediate layer and the synchronization signal SYNC2 is applied to ANP4-ANP5 in the output layer for the synchronization clock. SH1 and OC1 represent the sample/hold control signal and offset control signal, respectively, for the ANPs in the intermediate layer, and SH2 and OC2 represent these signals for the ANPs in the output layer.

Daisy circuits 171 and 172 of the blocks on the left side are the input side circuits corresponding to the input layer. In order to realize the input node, namely, the neurons in the input layer, the analog input signal applied to the analog input ports should be applied to the daisy circuits in a time divisional manner at the same timing as an ANP produces the analog signal. That is, a basic operation is constructed when ANPs 4 and 5 in the output layer receive analog signals from ANPs 1, 2 and 3 in the previous intermediate layer in a time divisional manner through analog bus B2. The relationship described above exists between the intermediate layer and the input layer. This relationship should be such that the analog input data in the input layer exist before the ANPs in the intermediate layer. Therefore, the output should be provided to analog bus B1 from the analog input ports 0 and 1 via sample/hold circuits 173 and 174, respectively, upon receiving the analog input signal at the same time as the ANPs in the intermediate layer output the analog signal to analog bus B2. In other words, the input signals from the analog input ports 0 and 1 are applied to analog bus B1 in a time divisional manner. The analog signal from the analog input port 0 is applied to the analog bus B1 at an appropriate timing. The next analog input signal from analog input port 1 is applied to analog bus B1 after the analog signal from analog input port 0 is applied to the same analog bus B1.

In order to achieve the above synchronization, the input control signal CSI outputted at a constant timing is applied to daisy circuit 171 and after a certain period, daisy circuit 171 produces output control signal CSO. The CSI for daisy circuit 171 is produced by CSO1 of master control circuit 181. Daisy circuits 171 and 172 form a kind of delay circuit. When daisy circuit 171 receives input control signal CSI from master control unit 181 it transmits the CSO signal to the vertically lower adjacent daisy circuit 172 so that the analog output signal is outputted from analog input port 1 to the vertically the lower adjacent daisy circuit 172. This operation is called a daisy control.

When the output CSO1 of master control circuit 181 rises, switch 175 is turned on and the analog input signal of analog input port 0 held in sample/hold circuit 173 is applied to analog bus B1. As CSO1 is the CSI of daisy circuit 171, the CSO of daisy circuit 171 rises a predetermined time after the fall of its CSI. This CSO is the CSI for daisy circuit 172, and simultaneously turns switch 176 on. Thus, the analog input signal of analog input port 1 held in sample/hold circuit 174 is applied to bus B1. The present layered structure needs such daisy control. That is, an analog input signal is applied to analog bus B1 through analog input port 0 and sample/hold circuit 173. The next analog input signal is outputted to the same analog bus B1 through analog input port 1 and sample/hold circuit 174. From the viewpoint of respective neurons in the hidden layer, the analog input signal of analog input port 0 and the following analog input signal from analog input port 1 are sequentially inputted in a time divisional manner.

Daisy circuits 171 and 172 output output control signal CSO by delaying input control signal CSI by a predetermined period to avoid a bus competition on analog bus B1.

After ANP1 receives output control signal CSO2 from master control block 181 as CSI to enable receiving the analog signal, CSO is applied to ANP2 as CSI and thereafter ANP2 outputs CSO. ANP3, which receives CSO of ANP2 as CSI, next produces the analog signal. In summary, ANPs 1, 2 and 3 produce outputs in turn, thus completing the daisy operation in the intermediate layer. In parallel with this operation, master clock control block 181 manages all of the operations and provides CSO3 to ANP4 in the output layer and then ANP4 produces its output. After completion of the output, ANP4 provides CSO to ANP5 and ANP5 produces its output.

Outputs from ANPs 4 and 5 in the output layer are subjected to a sample/hold operation by sample/hold circuits 177 and 178, respectively, under the control of CSO3 from master control block 181 and daisy chain output control signal CSO from ANP4. The output voltage is outputted as the analog output signal from analog output ports 0 and 1 and selected by analog multiplexer 179. An A/D conversion is applied to the output of multiplexer 179 by A/D converter 180 and then the output of A/D converter 180 is transmitted to digital control circuit means comprising MPU 182, memory 183 and communication interface 184. The output signal is compared to a teacher signal stored in the MPU 182 during learning to determine whether or not the output signal is the desired one. The weight data of the later described weight memory is changed based on this comparison. Maximum value node circuit 187 receives dummy node control signals DCS1 and DCS2 from master control block 181 as output enables 1 and 2 and is connected to analog buses B1 and B2.

Figure 17A:
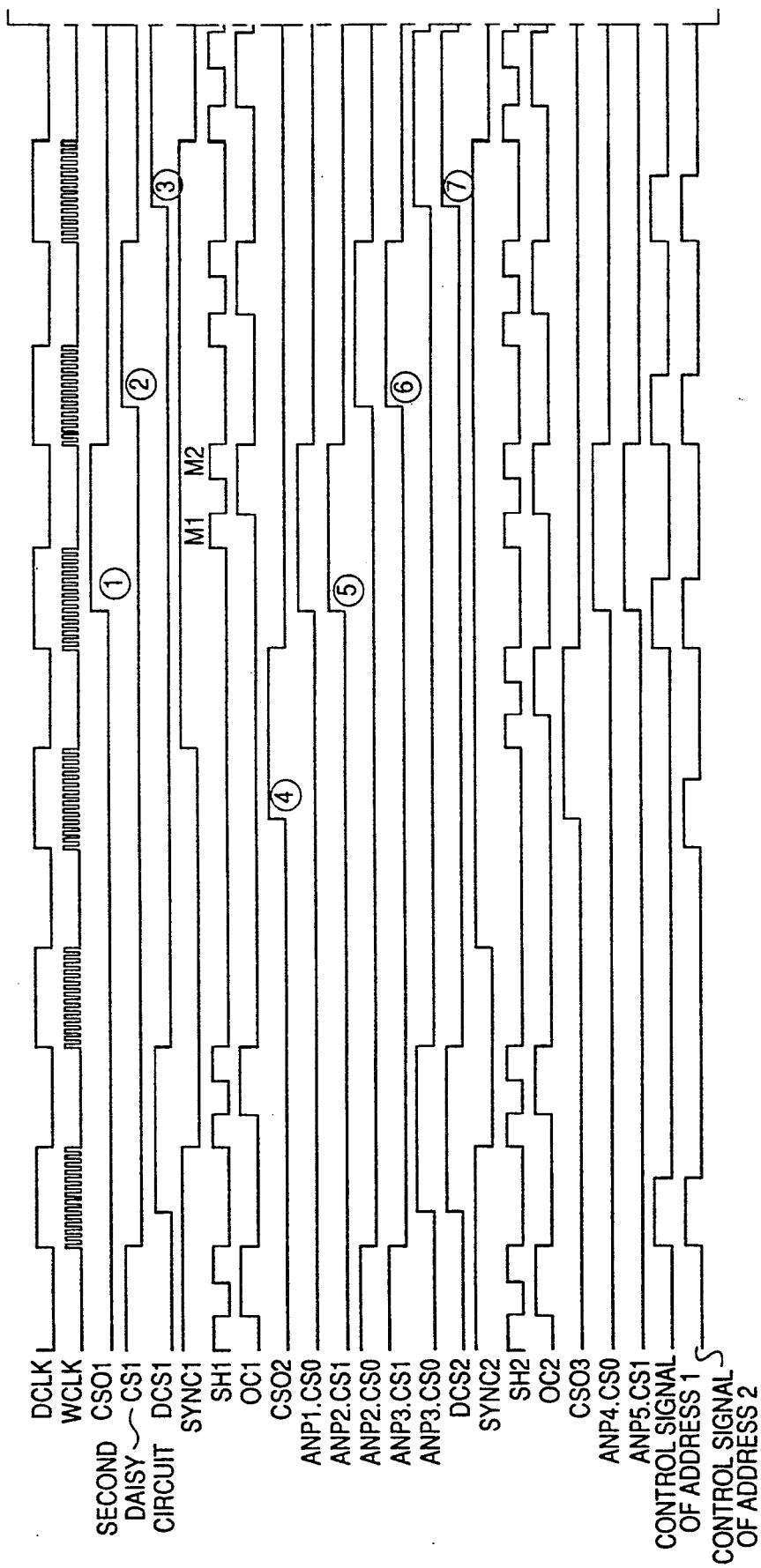
FIGS. 17A and 17B show a timing chart of the signal process shown in the detailed circuit shown in FIG. 16.
Figure 17B:
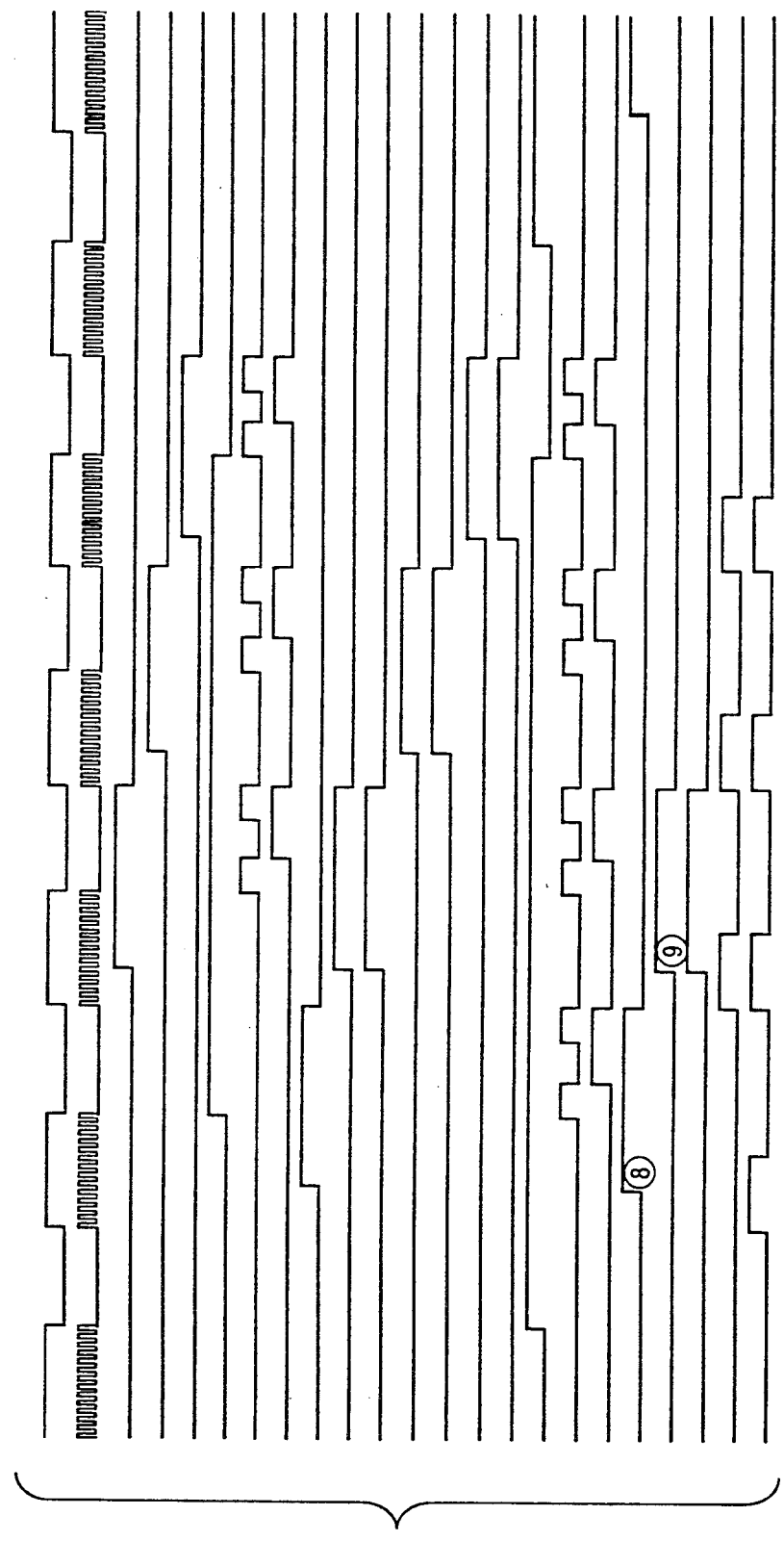

FIG. 17, formed by placing FIG. 17B to the right of FIG. 17A, is a timing chart of a layered neuron computer according to the embodiment shown in FIG. 16. A control signal line is extracted every layer. The data clock DCLK, i.e., the basic operational clock, and weight clock WCLK are simultaneously applied to daisy circuits 171 and 172 on the input sides of all ANPs in the same layer.

Weight clock WCLK is a serial synchronizing pulse for transmitting the serial digital weight and for reading the weight from the weight memory block. The control signal determines at which timing the input data is received. In the timing chart of FIG. 17, CSO1 is a busy daisy chain control signal outputted from master control block 181, namely, the daisy chain control signal CSI applied to daisy circuit 171. The CSI signal supplied to daisy circuit 171 causes the first analog input signal to be output to analog bus B1 from analog input port 0 and sample/hold circuit S/H 173. In the timing chart shown in FIG. 17, at time ①, the analog signal from S/H 1 is outputted to analog bus B1. At this moment, when the voltage is applied to analog bus B1, ANP1, ANP2 and ANP3 perform a parallel sum-of-the-products operation for this analog signal.

The CSO signal output from daisy circuit 171 rises at timing ②, a predetermined time after CSO1 falls. The CSO signal output from daisy circuit 171 is a CSI control signal applied to second daisy circuit 172 in the input layer. During the high-CSI period for daisy circuit 172, the analog input signal is applied to ANP1, ANP2 and ANP3 through sample/hold circuit S/H 174, thereby executing a sum-of-the-products operation.

DCS1 from master control block 181 is a control signal to be applied to a dummy node. Respective layers receive signals from the dummy node as well as input signals. The number of nodes is equal to the number of neuron nodes plus one. Therefore, the input layer has two inputs, although it seems to have three inputs when observed from the ANPs provided in respective intermediate layers. Therefore, a control signal block comprises two CSIs and one DCS1. The input cycle starts from the initial CSI and ends at the input DCS1 to the dummy node. The dummy node is provided by the maximum value node circuit 187 which outputs a threshold value voltage fixed on the analog bus while CSI is being inputted.

As shown at time ③, from the beginning of the rise of DCS1 and while the output voltage is being outputted, respective ANPs in the intermediate layer perform the sum-of-the-products operations as for the ordinary input. The fixed value voltage of a high CSI signal is added to the sum of the products of the previous two analog input signals, thereby enabling an addition to be conducted after multiplication. SYNC1 becomes high at a falling edge of DCL before the rise of CSO1 and becomes low at the falling edge of the DCLK after the rise of DCS1. SYNC1 is a synchronizing signal for the input layer. When WCLK is inputted, the analog input is multiplied by the weight data. Sample/hold signal SH1 inputted to the ANP at the intermediate layer, provides two high portions M1 and M2 and the product is obtained a little before the first high portion M1 and the sum is produced during the high portion M1 and then held. At the next high portion M2, the offset voltage Vb is subtracted from the held voltage (as indicated in FIG. 9) and the resulting voltage is subjected to a sample/hold operation. This process is repeated for the analog signal to be inputted, thereby computing the sum of the products. In this case, respective ANPs in the intermediate layer perform the sum-of-the-products operation three times, including the one for the dummy node. Thus, the processes of respective ANPs in the intermediate layer are completed and the addition of the products for three inputs is completed.

In the timing chart illustrated in FIG. 17, when DCLK is high immediately after the fall of DCS1, the result of the sum-of-the products operation of three signals is obtained from analog input ports 0 and 1, and the dummy node value is held in capacitors (Ch in sample/hold unit 45 in FIG. 7) of respective ANPs 1, 2 and 3. This operation is basically repeated. The rise in the CSO2 signal determines when the output signal of ANP1 is outputted to analog bus B2 provided between the intermediate layer and the output layer.

Offset control signal OC1 shown below SH1 performs an offset cancel within an ANP. Respective ANPs use analog signals including an operational amplifier therein and thus the circuit itself has an offset which is cancelled by the control signal of the OC1 signal. As shown by OC1, every time one sum-of-the-products operation is carried out, one pulse is output to perform an offset cancelling inside the ANP. In the timing chart, as shown by time ④, when CSO2 rises, the signal held in ANP1 is outputted to the analog bus B2, and ANP4 in the output layer performs a sum-of-the-products operation during the high-CSO2 period. The rise of CSO2 shown by time ④, designates a timing when the sum-of-the products result obtained as a result of the preceding input signal is outputted.

The timings in the intermediate layer and the output layer are explained by referring to FIG. 17. The analog signal is produced in synchronization with outputs ④, ⑤, ⑥, and ⑦, of the daisy chain control signals for the hidden layer and outputs ⑧ and ⑨ for the output layer and it is produced on the analog bus as the result of the previous process cycle for the analog signal in accordance with daisy chain control signal outputs ①, ② and ③ for the input layer. The execution of the pipeline process is explained later. Upon the rise of CSO2, shown by time ④ in the timing chart, ANP1 produces the output. Two pulses are outputted as shown by the signal SH2. Signal SH2 is inputted to the first neuron ANP4 in the output layer in the block diagram shown in FIG. 16. Namely, one sum operation in ANP4 is carried out on two high portions of the SH2 signal. Three neurons comprising ANPs 1, 2 and 3 are shown in the intermediate layer. In addition, the dummy node is added to it by maximum value node circuit 187, thereby providing four neurons in total. Accordingly, a pulse comprising two high portions of SH2 signal is produced four times starting at time ④.

The analog signal in the hidden layer is inputted to ANP4 in timings of four pairs of high portions of the SH2 signal to perform the sum-of-the products operation. This operation is naturally conducted simultaneously with the timing with which the ANP in the hidden layer performs the sum-of-the-products operation on the input signal, thereby conducting pipeline processing. The CSO signal from ANP1 provided in the intermediate layer is shown below CSO2 and is CSI for ANP2 in the same intermediate layer. This is shown by the portion designated by time ⑤. The CSO for ANP2 is shown below ANP2's CSI and the CSI for ANP3 is shown below ANP2's CSO and the CSI for the dummy node is shown below the CSI for ANP3, and DCS2, outputted from the master control block, becomes high at time ⑦. The CSI signal is inputted to ANP1, ANP2 and ANP3 in the intermediate layer and maximum value node circuit 187 for the dummy node, in the sequence of times ④, ⑤, ⑥ and ⑦. During this period, signal SH2 produces four pulses, each having two high portions. The neuron of ANP4 provided in the output layer adds the products of input analog signals and weights four times.

At time ④, when CSI is input to ANP1, the analog signal from ANP1 is output to the analog bus between the intermediate layer and the output layer and is input to ANP4. At the same time, corresponding weight data are input to ANP4, the multiplications are carried out and the products are added at the first high portion of the SH2 signal and the sum is subjected to a sample/hold operation at the second high portion. Upon completion of the calculation, the CSO signal from ANP1 rises, thereby providing CSI of ANP2 at time ⑤. Then the weight data are multiplied by the analog data, so that the sum can be calculated. A predetermined period after the fall of the state shown by time ⑤, the CSI to ANP3 becomes high and the sum-of-the-products operation is carried out by ANP4, as shown by time ⑥. At time ⑦ the fixed voltage output from the maximum value node circuit 187 is then input to ANP4 and added to the result accumulated up to this point through the sum-of-the-products operation.

The above operation is applied in parallel to ANP5 in the output layer, thus realizing simultaneous processing.

When CSO3 outputted from master control block 181 rises, the result of the sum-of-the-products operation calculated by ANP4 is output to analog bus B3 connected to the output layer. The control signal according to which maximum value node circuit 187 provides the output to analog bus B2 is DCS2 and this corresponds to time ⑦. The operation up to DCS2 shown in the timing chart of FIGS. 17A and 17B is for outputting the calculation result from the hidden layer. The same operation will be applied to the signal designated below DCS2 in the timing chart. This signal defines the operation of the output layer side connected in cascade to the intermediate layer. Upon a rise of CSO3, the result of the sum-of-the-products operation calculated by ANP4 is output. ANP4 and ANP5 in the output layer produce the output.

For example, the rise in CSO2 at time ④ enters ANP1 and this rise is delayed from DCLK. This is because, where the multiplication of the analog input signal and the digital weight data is performed, the digital data read by WCLK are serial. These serial data are converted to parallel data and thus the rise in CSO2 is delayed by the time required to convert the serial data to parallel data and the time taken for the analog input signal to arrive at the D/A converter, namely, the multiplying process unit 32a (FIG. 6). That is, the rise in CSO2 is delayed from the rise in DCLK by the time required to read the serial data. When some data, for example, 16 cycles of WCLK, pass after the rise of DCLK, the data set is completed. When 8 cycles of WCLK pass after the rise in CSO2, the analog multiplication starts.

Figure 18:
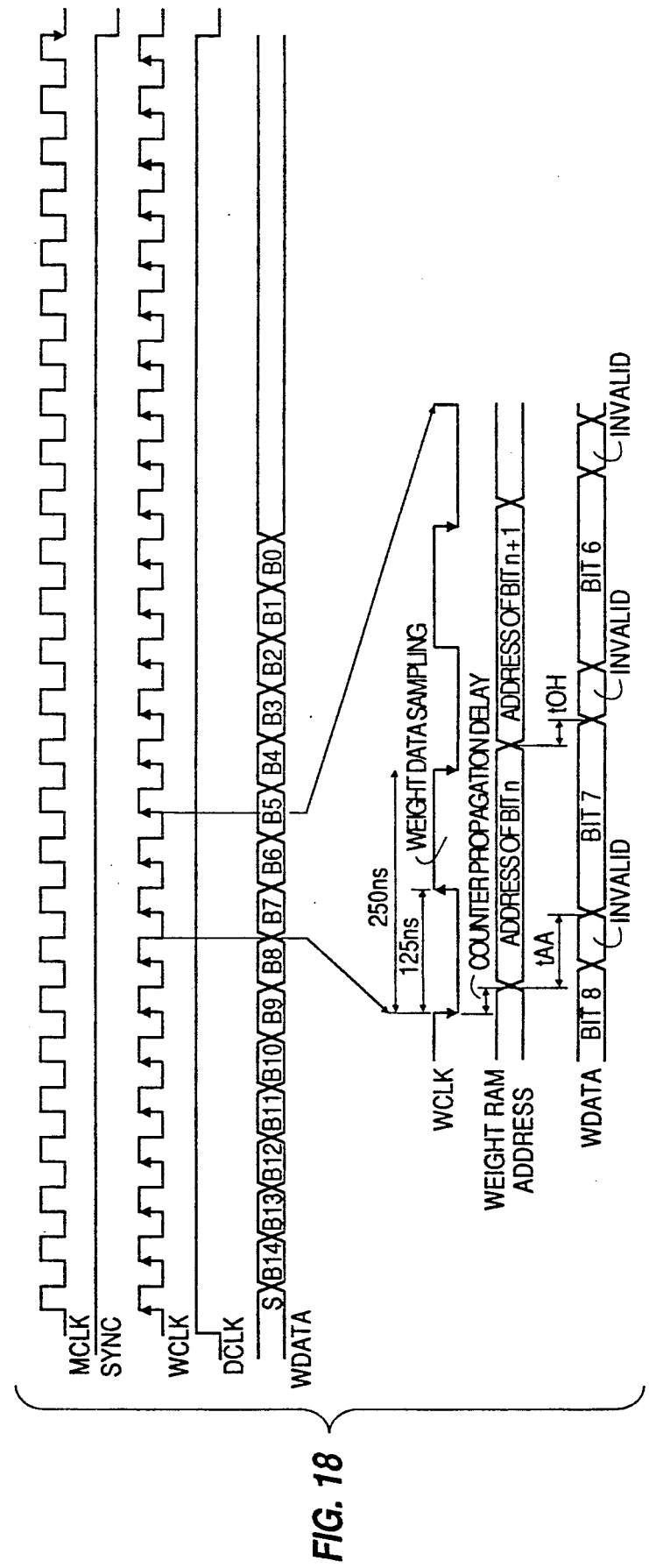
FIG. 18 shows a timing chart of the process upon reading the digital weight data.

FIG. 18 shows a timing chart designating a reading of the digital weight data. It shows the master clock MCLK, synchronizing signal SYNC, weight clock WCLK, data clock DCLK and actual weight data WDATA. The weight data WDATA are read out from the weight memory in a bit serial manner and 16 bit data are input serially. S indicates a sign bit and B14 to B0 show numerical value bits. In FIG. 18, portions B7, B6 and B5 of the weight data WDATA are shown in the lower part of FIG. 18 to indicate their relation with the weight clock WCLK. The period of weight clock WCLK is 250 nsec and the duty ratio is 50%. After the propagation delay of a counter for updating the address provided in the sequencer 13 passes from the fall of WCLK the address is provided to the weight memory. The address of bit n of the weight memory (RAM) stores bit 7 of weight data WDATA. When period tAA has passed after the determination of this address, bit 7 is read out. The change from bit 7 to bit 6 is determined by the change in the clock to the next period and bit 6 is read from the weight memory at the next period. 16 bits of weight data are inputted to ANP and the product of the 16-bit weight data and the analog voltage input to ANP are calculated by the internal D/A converter. The input of the analog voltage starts after the rise of the data clock DCLK. Therefore, it takes time for the analog input voltage to reach the D/A converter. It is necessary to control this time and the time required for setting the digital weight data and to input the analog voltage so that the arrival time of the analog voltage complies with that of the weight data.

For example, the analog input voltage rises at bit 7 of the weight data. When bit 0 of the weight data and all the following weight data are determined, the multiplication of the weight data and the analog value starts and the addition can be conducted during the period when WCLK becomes low at the next timing.

Operational timing of ANPs is defined by SYNC signal, WCLK, and data DCLK. There is an error in time when the analog input voltage is transmitted from an input terminal of an ANP to the D/A converter 32a and CSI rises after DCLK rises, taking into account the possible difference in rising time between CSI and DCLK.

Figure 19A:
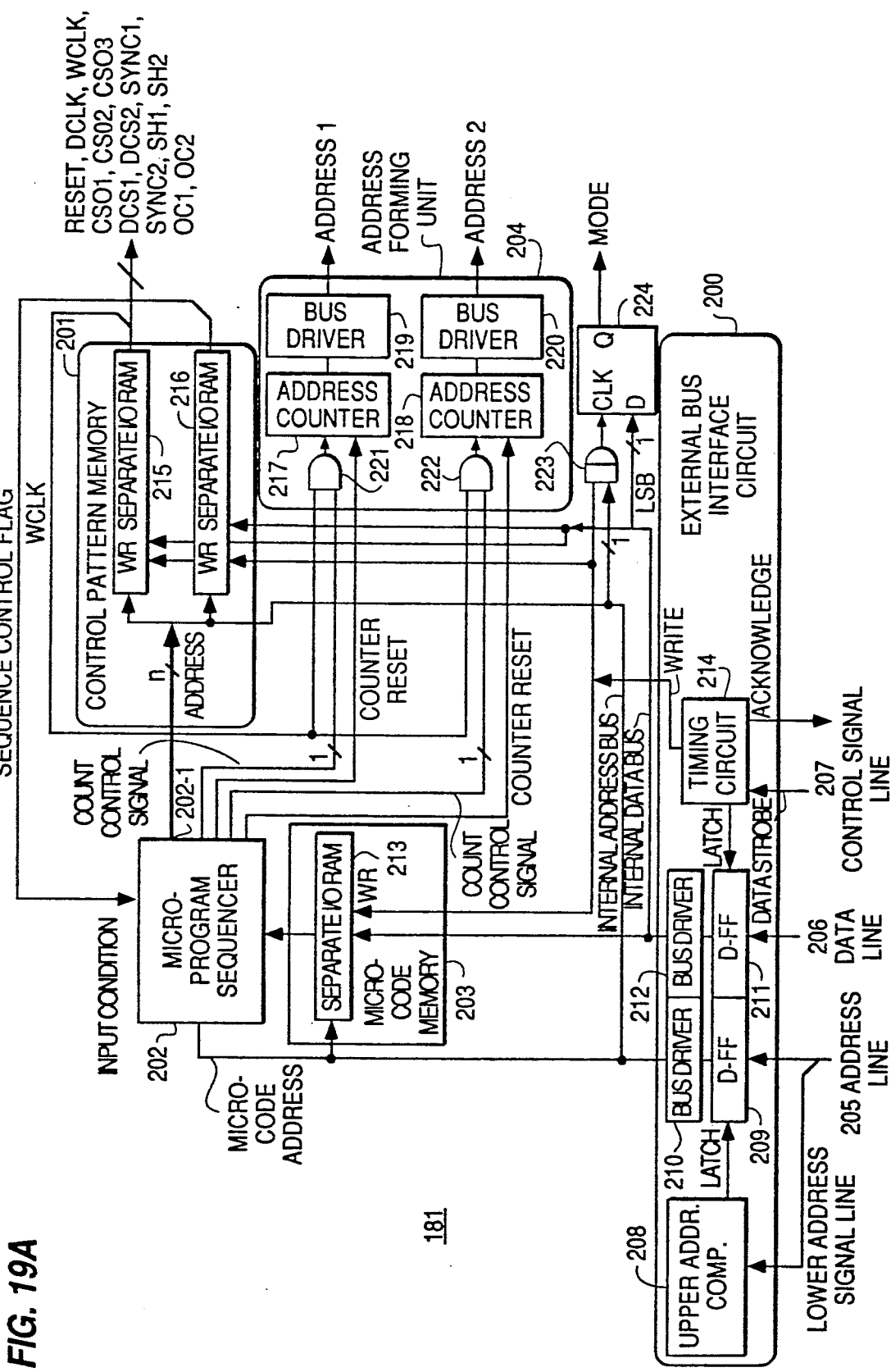
FIG. 19A shows a detailed circuit diagram of a master control block.

FIG. 19A shows the structure of master control block 181, which controls all the control signals. The main structure elements comprise external bus interface circuit 200, control pattern memory 201, micro-program sequencer 202, micro-code memory 203 and address forming unit 204. External bus interface circuit 200 is connected to address line 205, data line 206 and control signal line 207 through an interface connected to the MPU 182. Upper address comparing circuit 208 and D-FF 209 of the register in external bus interface circuit 200 decodes the upper address given by the MPU 182 (FIG. 16). When the upper address is the same as the predetermined one, the lower address and data are set in D-FFs 209 and 211 by using a latch signal from timing circuit 214 as a trigger. The address and data are inputted through respective bus drivers 210 and 212, and through the internal address bus and the internal data bus. The address is used to refer to micro-code memory 203 and to write micro-code into micro-code memory 203 from the MPU 182 through the data bus. The lower address is applied to micro-program sequencer 202 through bus driver 210 and the MPU 182 can refer to control pattern memory 201 by using a predetermined address.

The data from the MPU main memory 183 is latched by D-FF 211 to data line 206 and is applied to separate I/O RAM 213 in microcode memory or separate I/O RAMs 215 and 216 in control pattern memory 201 through bus driver 212. The data strobe signal from the MPU 182 or the memory 183 is added to timing circuit 214 through control signal line 207 and the acknowledge signal is returned, thereby controlling the transmission and receiving the address and data. Timing circuit 214 controls latch timing in D-FF 211 and D-FF 209 and controls the writing timing of micro-code memory 203 and control pattern memory 201 through the WR signal.

One period of each of the "1" and "0" patterns of a control signal given to the neuron chip, as shown in the timing charts of FIGS. 9A and 9B, are stored in control pattern memory 201 and read out from control pattern memory 201 in accordance with the control of microprogram sequencer 202, thereby producing one period of the patterns. For example, reset signal RESET, data clock DCLK, weight clock WCLK, CSO1, CSO2, CSO3, SYNC1, SYNC2, SH1, SH2, OC1 and OC2 are read from the first separate I/O RAM 215 and the control information accompanied by the pattern, namely, the sequence control flag, is read from second separate I/O RAM 216. Where the pattern "1000110001" is stored in control pattern memory 201, the address of control pattern memory 201 is controlled to repeat the bits comprising "1 and 0" and the repeated pattern is read out from control pattern memory 201. As the control signal patterns are extremely complex, they are prestored in separate I/O RAMs and the bit patter is sequentially outputted by designating the address of separate I/O RAM 215 under control of micro-program sequencer 202. Thus, a plurality of the same patterns are repeated, as determined by the address control. One pattern period is called an original pattern. In order to repeat the original pattern, specific information is fed back to micro-program sequencer 2 from control memory 201. The sequencer control flag within the second separate I/O RAM 216 is inputted to micro-program sequencer 202, so that the addressing is returned to the head address in which the original pattern is stored in the first I/O RAM 215. Thus, the original pattern is repeated. Micro-program sequencer 202 transmits an address signal to separate I/O RAM 215 through general purpose port output line 202-1 until the required condition is satisfied. Normally, the address is incremented but the address signal is returned to the head address in which the original pattern is stored. As a result, a predetermined control pattern is repeatedly outputted from separate I/O RAM 215.

FIG. 19B shows the relationship between the information of memories 201 and 203 for controlling master control block 181. In FIG. 19B, control pattern memory 1 corresponds to the first separate I/O RAM 215 and control pattern memory 2 corresponds to the second separate I/O RAM 216. The control code of sequencer 202 is stored in micro-code memory 203, which stores mainly jump commands and repeat commands. Repeat commands are stored in a predetermined address and the number of the control pattern repetition in the control pattern memory is stored in the corresponding address of control pattern memory 2 in accordance with the repetition command. When this number reaches "10", ten repetitions are carried out. In this way, the address increases until it reaches a jump command in micro-code memory 203 and the address jumps to 500H by the second jump in micro-code memory 203, thereby producing pattern 2 which is repeated 5 times. The address jumps to "100H" again at the third jump in the micro-code memory 203, thereby outputting pattern 1. Thus, the original pattern is repeated and read from control pattern memory 1.

WCLK is formed in synchronization with the reading clock of the address referred to by control pattern memory 201 and information is read out from weight memories 185 and 186 (FIG. 16) in synchronization with WCLK. The addresses of weight memories 185 and 186 are accessed by the address signal outputted from addresses 1 and 2 of address forming unit 204. Addresses 1 and 2 are separated, address 1 being for the hidden layer and address 2 being for the output layer. The weight data applied to the ANPs in the hidden layer are read out from weight memory 185 designated by address 1. The weight data applied to the ANP(s) in the output layer are read out from weight memory 186 designated by address 2. The contents of weight memories 185 and 186 are stored bit by bit in the increasing direction of the address and it is necessary to apply a count control signal to address counters 217 and 218 from micro-program sequencer 202. Incrementing addresses are applied sequentially to weight memories 185 and 186 through bus drivers 219 and 220 from address counters 217 and 218. A plurality of weight data is read out from weight memories 185 and 186. WCLK from the first separate I/O RAM 215 and a counter control signal from microprogram sequencer 202 are applied to AND circuits 221 and 222 in address forming unit 204. When the counter control signal is high, the address counter is updated by WCLK. Address counters 217 and 218 are incremented from 1 to 16 bits of WCLK. The remaining 17 to 26 bits of WCLK are inhibitted by turning the counter control signal low and stopping incrementing address counter 217 and 218. A counter reset signal is transmitted to AND circuits 221 and 222 from microprogram sequencer 202 in synchronization with SYNC1 and SYNC2 and reset address counters 217 and 218. The address is returned to the head address of weight memories 185 and 186.

The mode signal outputted from master control block 181 comprises a mode designating an ordinary use of the weight memory, namely, separating the weight memory from the MPU data bus to apply the weight data to the ANPs and a mode in which the weight memory is connected to MPU data bus and is referred to by the MPU 182. A mode signal is formed when the LSB of the data from the MPU 182 is input to flip-flop 224 by using as a trigger signal an AND signal output from AND circuit 223 when a bit of the lower address and write signal WR from timing circuit 214 is applied to AND circuit 223. When the mode signal is 0, the weight memory is available for an ordinary use.

Write signal WR and a bit of the internal address bus are input to a clock terminal flip-flop 224 through AND circuit 223 and the LSB of the internal data bus is input to the data terminal of flip-flop 224. The upper address signal is input to comparing circuit 208 and it is determined whether master control block 181 is selected. If it is, the lower address and data are applied to DFFs 209 and 211. This interface operation is applied to the other devices connected to the MPU 182 and the weight memory supplies the weight data to the ANP during a normal period, and if the weight memory is directly connected to the data bus of the MPU 182, bus competition is caused. To prevent this, the mode is 1 when the LSB of the data bus is supplied to the flip-flop, thereby preventing the weight memory from being chip-selected and producing the data on the data bus from the weight memory. The internal address bus designates the addresses of either micro-code memory 203 or control pattern memory 201 by using the internal address bus. The desired data is written into the accessed address to the internal data bus. Thus, the program stored in micro-program sequencer 202 is selected, and the programs stored in micro-code memory 203 and separate I/O RAM 216 are changed and the control pattern stored in separate I/O RAM 215 is changed.

Figure 20A:
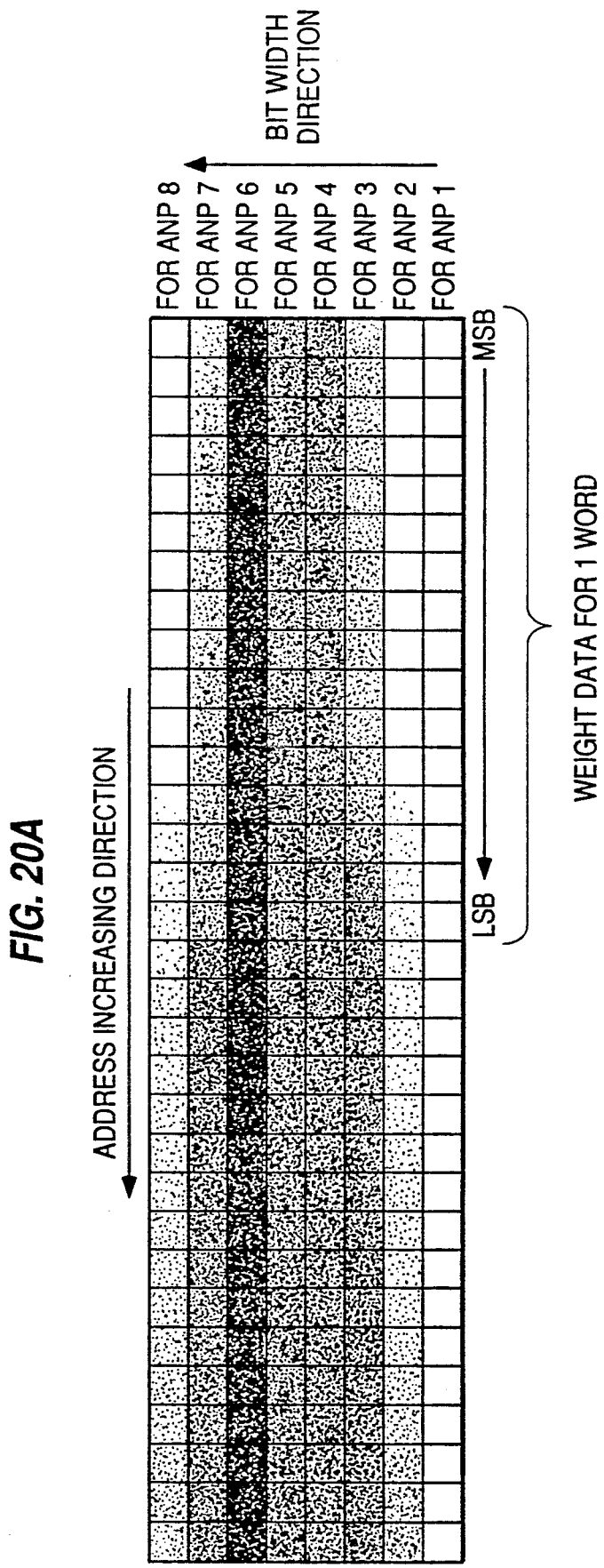
FIG. 20A shows the detailed circuit structure of the weight data memory.

FIG. 20A shows the data storage structure of weight data memory 230. The 8 bits in a column direction are the 8-bit data stored in the same address and thus, bits 1, 2 ... 8 are for ANP1, ANP2 ... ANP8, respectively. In the row direction, the addresses are different and increase from right to left. The weight data comprise 16 bits including the sign bit and these bits are stored in addresses from the small address value to a large address value. MSB is the sign bit and the other 15 bits are numerical value bits. When the address provided by microprogram sequencer 202 increments in synchronization with WCLK, one word of the weight data, namely 16 bits, is read out from MSB to LSB, and is thereby applied simultaneously to 8 ANPs. As the data is stored in the increasing direction of the address, the address count is conducted for the weight data. Namely, the bits in one word of weight data from MSB to LSB is counted, so that one item of weight data is provided under the control of the weight data memory. Control is also conducted by micro-program sequencer 202.

Figure 20B:
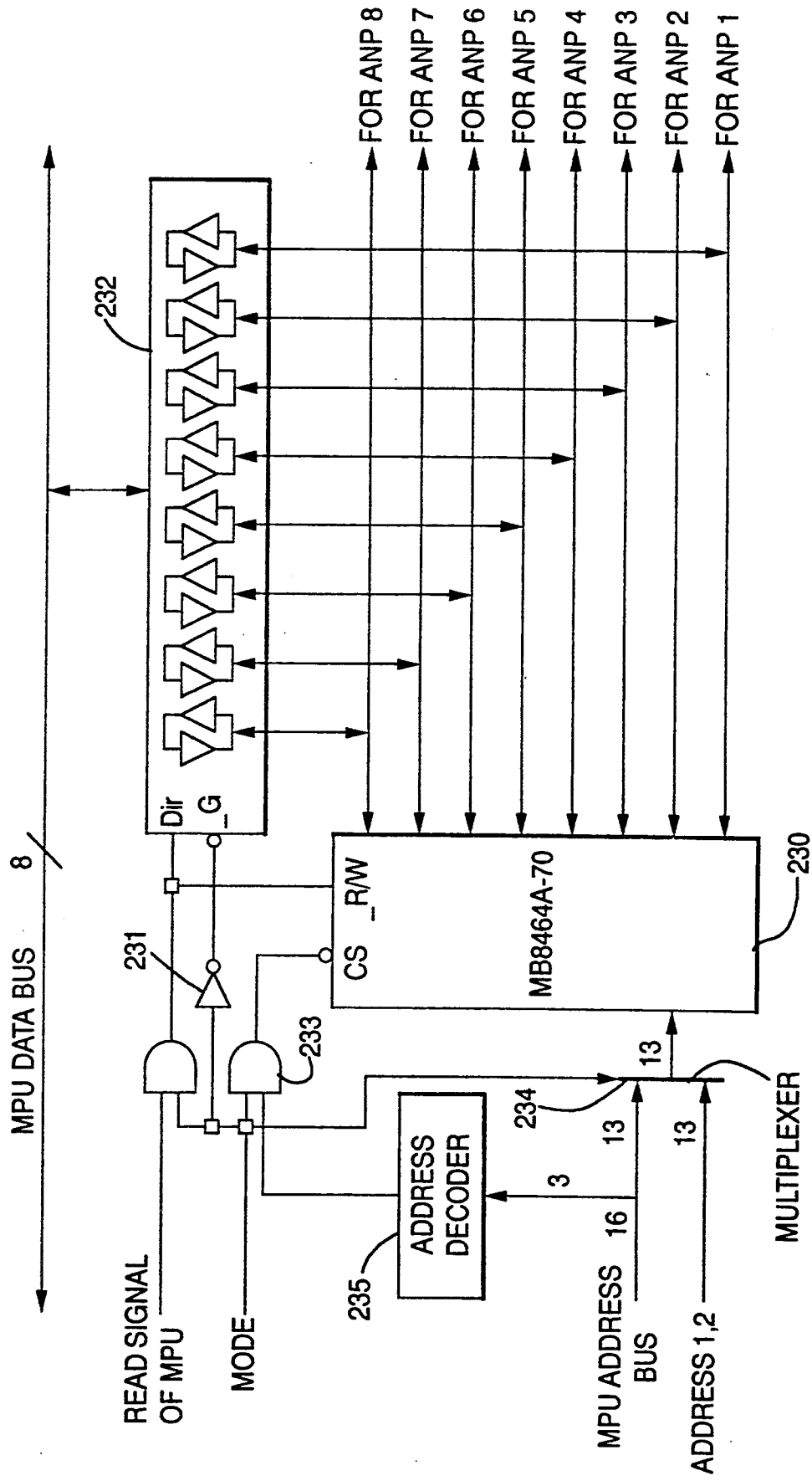
FIG. 20B shows the detailed circuit structure of the weight data memory.

FIG. 20B shows a circuit of weight memory blocks 185 and 186. Memory 230 comprises a RAM, such as MB8464A-70. The output comprises 8 bits corresponding to ANP1 to ANP8. Basically, either the bus signal line viewed from the MPU bus or addresses 1 and 2 viewed from master control block 181 are used. Addresses 1 and 2 are the same as addresses 1 and 2 in FIG. 19A. They are input, incrementing in synchronization with WCLK. 8-bit data is simultaneously read out and respective bits are simultaneously applied to ANP1 to ANP8.

When the mode signal is 0, weight memory 230 is chip selected through AND gate 233. Addresses 1 and 2 from microprogram sequencer 202 become effective at multiplexer 234. Weight data from weight memory 230 are transmitted to ANPs 1 to 8. Meanwhile, the output of the inverter circuit 231 is high, thus disenabling tri-state bus transceiver 232 and preventing the weight memory 230 from being output to the MPU 182. If the data is to be output to the MPU 182, the mode signal is turned to 1 and memory 230 is chip selected through address decoder 235 according to appropriate address information from the MPU 182 and memory 230 receives an address signal from MPU 182. When the mode signal is 1, memory 230 is selected through address decoder 235 by address information from MPU 182, thereby producing the output to MPU 182. When the mode signal "1" is read by MPU bus or written in memory 230 from the bus, the read and write direction is determined by that read signal on the data line transmitted from MPU 182 through AND gate 236.

The learning algorithm will now be explained. FIG. 20C shows a flowchart of a learning algorithm using back propagation as utilized in the present invention. The learning is conducted as follows. All the information to be learned is input to a neural network, namely, a layered type network constituted of ANPs, through an input control circuit, not shown, from the MPU 182. The input signal passes to the network output through the input side circuit, the hidden layer and the output layer. It is further applied to the MPU 182 through an A/D converter. The learning algorithm exists in the main storage 150z (FIG. 13) on the side of the MPU 182. The teacher signal is obtained from main storage and transmitted to the MPU 182 and the error between the output of the network and the teacher signal is examined. If the error is large, the MPU 182 changes the weight data representing the strength of the network's connection to a direction such that the right output is produced by the network. The weight data is applied to ANPs in respective layers through weight memory 230.

When the weight data is updated in accordance with the learning algorithm, the learning process is carried out in accordance with the learning algorithm of the back propagation shown in FIG. 20C. When the learning algorithm starts, the MPU 182 obtains the error between the teacher signal $Y_L$ and the current output $Y_L$ at the L-th neuron ANPr in the output layer and inserts it into $Z_L$ (step S1). The output $Y_L$ is the output of the neuron $ANP_L$. If the sigmoid function is used as a non-linear element, the output $Y_L$ is provided as the output value of a nonlinear function. Therefore, in the neuron $ANP_L$, error $Z_L$ must be propagated into the input side of the non-linear function. When this error propagation is conducted, the energy function, namely, the second power of the error signal multiplied by $\frac{1}{2}$, provides the following energy equation.

$$E_L = \tfrac{1}{2}(Y_L - Y_L)^2$$

The partial differentiation of the non-linear type function input $X_L$ is as follows.

$$\delta = -\frac{\partial E_L}{\partial X_L}$$

The above equation can be changed to the following equation.

$$\delta = -\frac{\partial E_L}{\partial X_L} = -\frac{\partial E_L}{\partial Y_L} \cdot \frac{\partial Y_L}{\partial X_L}$$
$$= (Y_L - Y_L) \cdot f(X_L)$$

If non-linear function $f(X_L)$ is a sigmoid function, it is expressed as follows.

$$f(X_L) = \frac{1}{1 + e^{-X_L}}$$

Differentiation $f'(X_L)$ of the sigmoid function yields the following equation.

$$f'(X_L) = Y_L(1 - Y_L)$$

This is equal to $V_L$ shown in step S2 in the flowchart in FIG. 20C. Accordingly, $\delta$, namely, the partial differentiation of non-linear function input $X_L$, is $V_L \times X_L$. This provides $U_L$ shown in step S2. The error $\delta$ for the non-linear function input of the energy is back-propagated to the hidden layer.

The k-th neuron in the hidden layer is designated as $A_K$. The output of $A_K$ is $Y_K$. Linear function input $X_L$ of neuron $ANP_L$ in the output layer is expressed by the sum of the products obtained by multiplying the output $(Y_1 \ldots Y_{KMAX})$ of the neurons in the hidden layer by the respective weight $W_{LK}$. Accordingly, the partial differentiation of $X_L$ with regard to $W_{LK}$ is output.

$$\frac{\partial X_{Lk}}{\partial W_{Lk}} = \frac{\partial}{\partial W_{Lk}} \cdot \Sigma W_{Lk} Y_k = Y_k$$

On the other hand, the change in the weight $W_{LK}$ for energy $E_L$ is provided by the following equation.

$$-\frac{\partial E_L}{\partial W_{Lk}} = -\frac{\partial E_L}{\partial X_L} \cdot \frac{\partial X_L}{\partial W_{Lk}} = U_L \cdot Y_k$$

Namely, $T_{LK}$ at step S3 expresses the following item.

$$-\frac{\partial E_L}{\partial W_{Lk}}$$

This is the partial differentiation of the energy with regard to the weight. Accordingly, $T_{LK}$ may be determined as the variation $\Delta W$ of the weight and in order to speed up the conversion, the following recurrence formula is used. This corrects the weight by adding the second term of the first equation shown in step S4.

$$\Delta W_{Lk} = \alpha T_{Lk} + \beta \cdot \Delta W_{Lk}$$

$$W_{Lk} = W_{Lk} + \Delta W_{Lk},$$

where $\beta$ and $\alpha$ are constants. A special neuron $ANP_L$ in the output layer is noted and all the neurons in the hidden layer are supposed to be corrected. Thus, it is necessary to repeat k from 1 to kmax with regard to respective $ANP_L$s. This is conducted by a repetition shown by R1 in the flowchart and it is necessary to repeat k, the number of repetitions being equal to the number of neurons $k_{max}$ in the hidden layer. When this repetition is ended, back propagation for the special neuron $ANP_L$ is completed. Accordingly, the above operation should be applied to all the neurons (ANP1, ANP2 ... $ANPL_{max}$) in the output layer. Thus, as shown by R2 in the flowchart, L is repeated from 1 to $L_{max}$. Therefore, the process is repeated, the number of repetitions being equal to the number $L_{max}$ of the neurons in the output layer.

Next, the learning is conducted from the hidden layer to the input layer. The algorithm is almost the same as that described above, but the error signal cannot be expressed by the difference between the teacher signal and the output voltage as shown at step S5. Namely, $A_K$ is the k-th neuron in the hidden layer and corresponds to the output error signal $Z_K$. This is clarified by the following equation.

$$-\sum_L \frac{\partial E_L}{\partial X_L} \frac{\partial X_L}{\partial Y_k} = -\sum_L \frac{\partial E_L}{\partial X_L} \cdot \frac{\partial}{\partial Y_k} \sum_K W_{Lk} Y_k$$

$$= -\sum_L \frac{\partial E_L}{\partial X_L} \cdot W_{Lk} = \sum_L W_{Lk} \cdot U_L$$

Accordingly, the process is repeated from 1 to Lmax to obtain the index error of $Z_K$ at step S5 and is therefore repeated through a route (R3), the number of repetitions being equal to the number of outputs. Thus, the error signal $Z_K$ is in the hidden layer. Thereafter, the algorithm is the same as that between the hidden layer and the output layer. First, the differentiation value $V_K$ of the sigmoid function is outputted and $U_K$, namely a change for the non-linear function input of the energy, is obtained at step S6. At step S7, the product $T_{kj}$ of the $U_k$ and the output $Y_j$ of the input layer is obtained.

As the main weight change portion, the second term is added to speed up the conversion, as shown in step S8. $\Delta W_{kj}$ is obtained and added to the previous value of $W_{kj}$, thereby providing a new $W_{kj}$. This is a process for updating the weight. This process is repeated, the number of repetitions being equal to the input number Jmax (R4). The process is repeated from J equals 1 to J equals Jmax and the weight between the input and hidden layers is updated. $Z_k$ of S5 corresponds to the error signal of the output from the hidden layer and $Z_K$ can be expressed such that the partial differentiation $U_L$ of the energy of the output layer for the function input value is back-propagated and $W_{Lk}$ is finally determined when the weight in the hidden layer and output layer is determined. The calculation for updating the weight starts from neuron $ANP_L$ at the output layer and moves to neuron $ANP_K$ in the hidden layer. The weight change $\Delta W$ cannot be calculated at neuron $ANP_K$ in the hidden layer if $\Delta W$ in the previous stage cannot be obtained. This is called the back propagation method as the learning becomes possible only when the process goes back to the input layer.

In the back propagation method, the learning data are input as complete information. This method includes a forward operation for outputting the result of the learning and a backward movement for changing the strength of all the connections to minimize the error.

This forward operation is also necessary. The analog neural network unit of the present invention can be effectively utilized in the forward operation. The back propagation of the output value is carried out by the MPU 182. If the non-linear function is different from the sigmoid function, the differential value of the non-linear function is different from that of the sigmoid function. For example, for the function tanh(X), the learning algorithm is as shown in FIG. 20D and the differential result of the non-linear function can be expressed as $VL = 1 - |YL|$ in the output layer (S2') and $VK = 1 - |YK|$ (S6') in the hidden layer.

As the process is designated by the same reference numbers as in FIG. 20C, the explanation is omitted.

Figure 21:
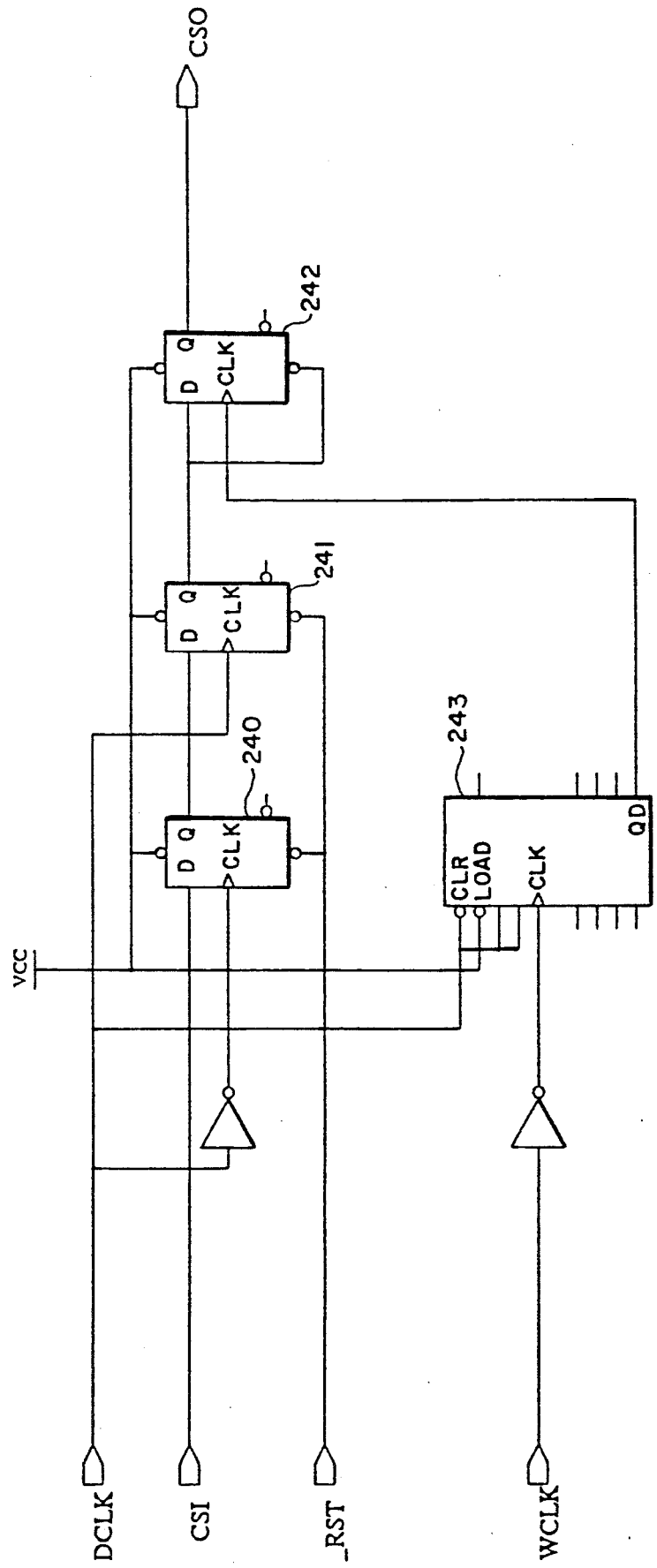
FIG. 21 shows a block diagram of a daisy circuit.

FIG. 21 shows the structure of the input side daisy circuits 173 and 174. 240, 241 and 242 are D-type flip-flops. The data input to the D terminal is selected by the write of the DCLK signal and the output Q is turned to the state "1". The first flip-flop 240 sets the CSI signal at the fall of DCLK and in the next rise of DCLK, the output signal is set in the second flip-flop 241.

The output of the second flip-flop 241 is applied to the D terminal of the third flip-flop 242. The clock signal for setting the input is outputted from 4-bit counter 243. Counter 243 is triggered at the fall of WCLK and cleared at the fall of DCLK. Therefore, at the fall of DCLK, counter 243 becomes all 0. After the fall of WCLK is input 8 times, the QD signal of the MSB of counter 243 becomes high, thereby enabling a high signal to be output as a CSO from flip-flop 242.

The output of flip-flop 241 becomes 0, thereby clearing CSO. In accordance with such operation, the daisy operation is conducted, in which CSO is output at a predetermined time corresponding to 8 pulses of WCLK after CSI falls.

Figure 22:
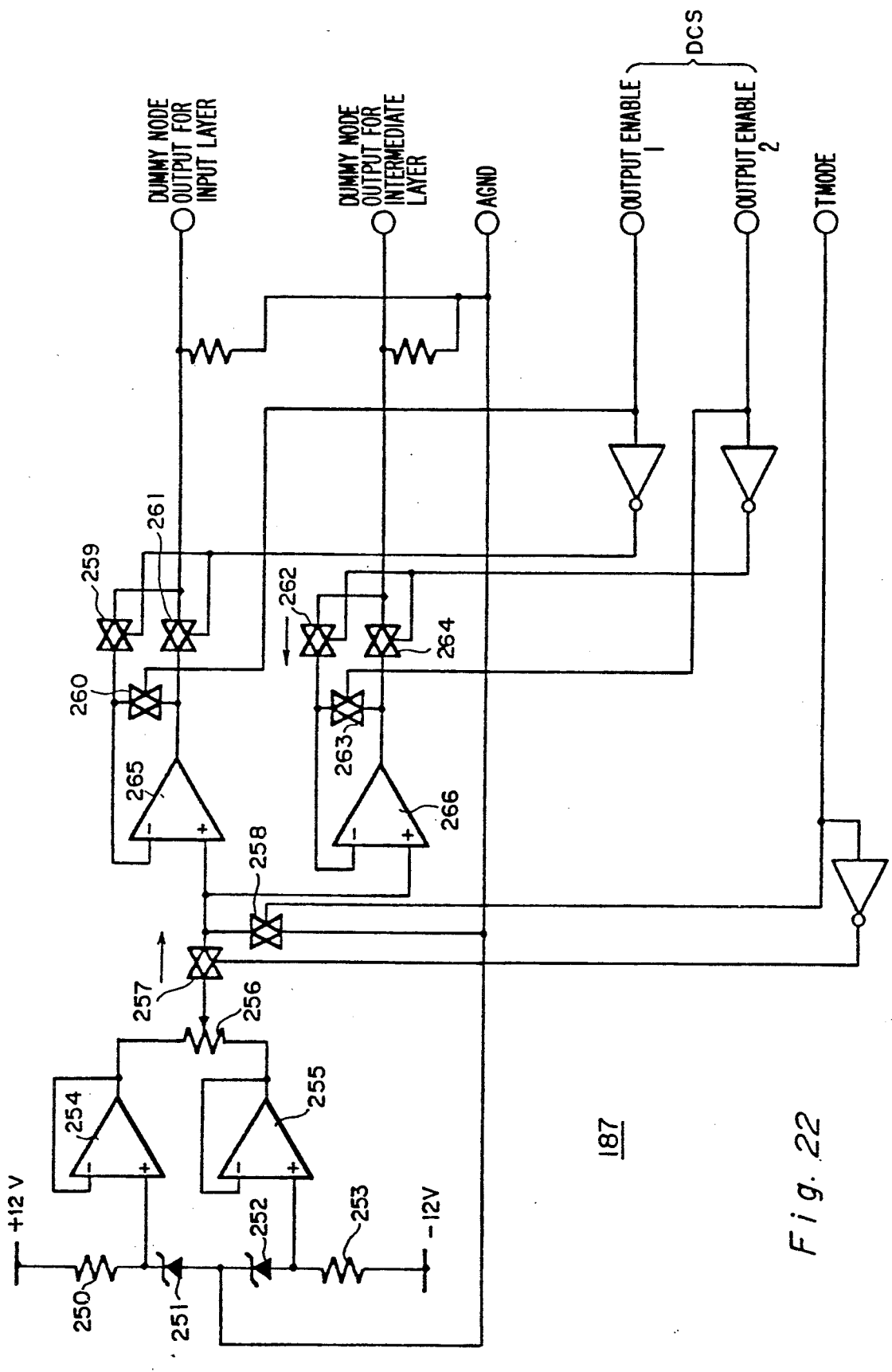
FIG. 22 shows a block diagram of a maximum value node circuit.

FIG. 22 shows maximum value node circuit 187 forming a neuron of the dummy node. Resistor 250, zener diodes 251 and 252, resistor 253, and voltage followers 254 and 255, form a circuit for providing a constant voltage. When a current flows between 12 volts and −12 volts through resistors 250 and 253 and Zener diodes 251 and 252, then +7 volts and −7 volts are respectively formed at the input of voltage followers 254 and 255. This voltage is outputted to output resistor 256, forming voltage followers 254 and 255. The operation is controlled by using analog switches 257 through 264 such that two constant voltages are outputted in a time divisional manner. When the T-mode signal is 0, a constant voltage is supplied to the next voltage follower 265 through analog switch 257. When the T-mode signal is "1", that is, in T mode, the output of analog switch 257 is suppressed so that the analog ground of "0" volts is input to voltage follower 265 via analog switch 258.

In the test mode, the offset on the bus is notified to the MPU 182. Voltage follower 265 is enabled by the switch control at the output portion. When the output enable 1 is turned to "1", analog switch 260 is turned on and provides feedback to the voltage follower 265. However, at this time the dummy node does not produce an output. Conversely, when the output enable 1 is 0, an output is produced at the dummy node, because switches 259 and 261 are turned on. Similarly, analog switch 263 and the switch control 262, 264 of the output for the intermediate layer are controlled by output enable 2 which is "0" enable. When output enable 1 or 2 is 0, a constant voltage is output at a dummy node. The upper dummy node output is for the input layer and the lower dummy node output is for the intermediate layer. The output voltages of these dummy nodes are fixed to the appropriate values and can be used as threshold voltages. Zener diodes 251 and 252 produce constant voltages during the reversed prior state. These constant voltages can be changed from +7 volts to −7 volts. The enable states of output enables 1 and 2 are determined by dummy node control signal DCS from master control block 181 to avoid a collision between the output voltages from this and other ANPs connected to the analog bus.

Figure 23:
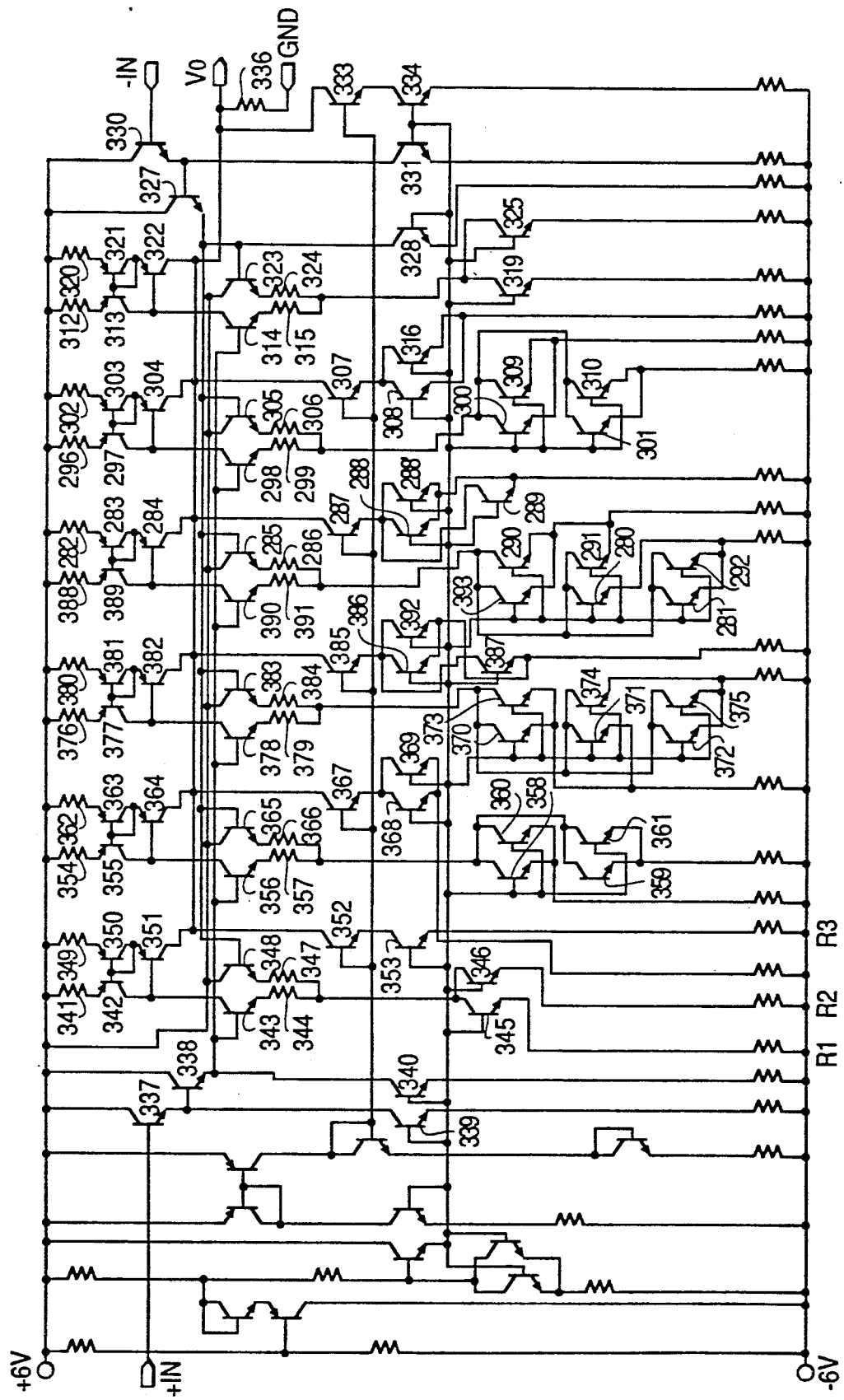
FIG. 23 shows a diagram of a sigmoid function producing circuit.
Figure 24:
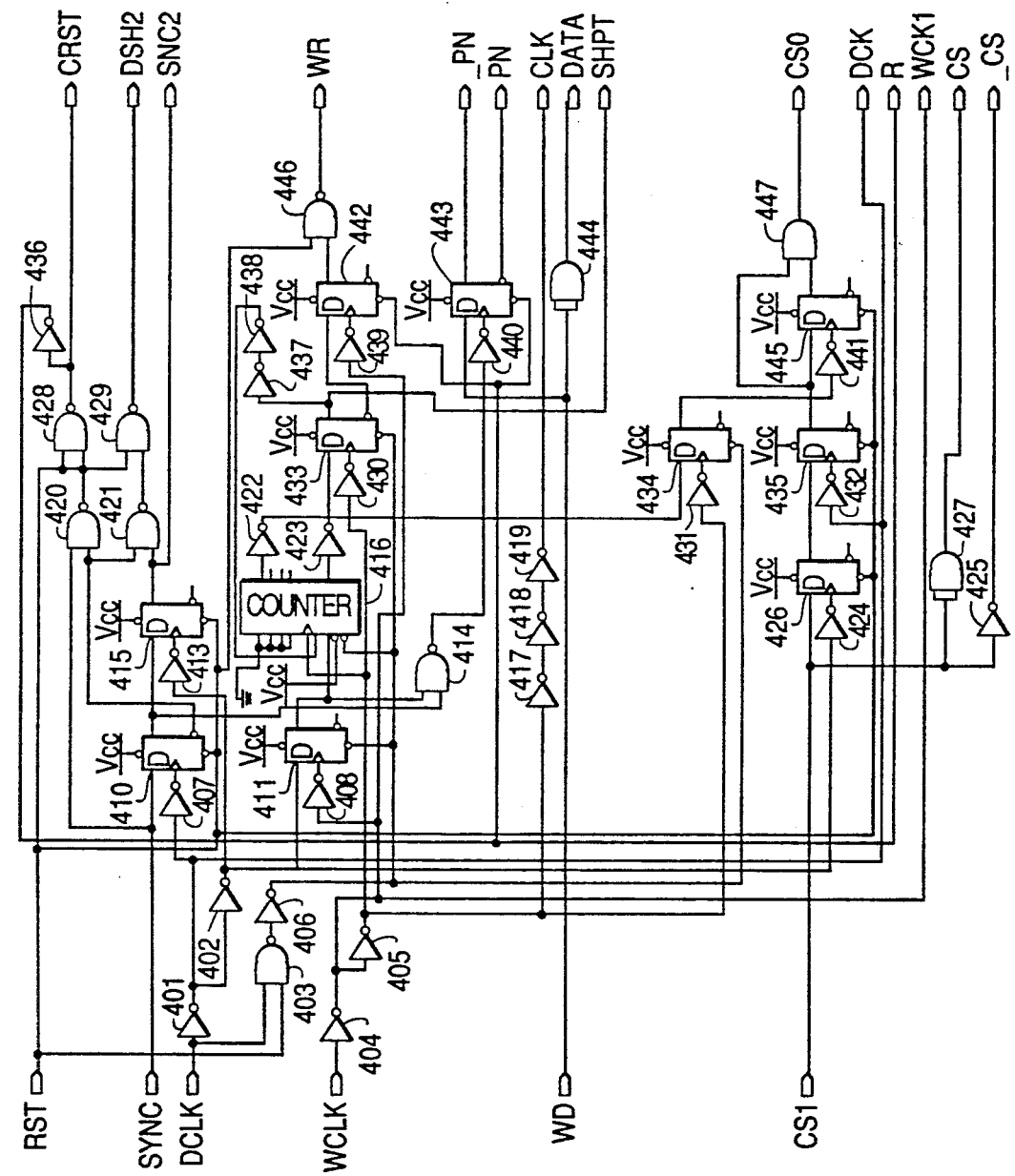
FIG. 24 shows a detailed circuit diagram of a sequence generator.
Figure 25:
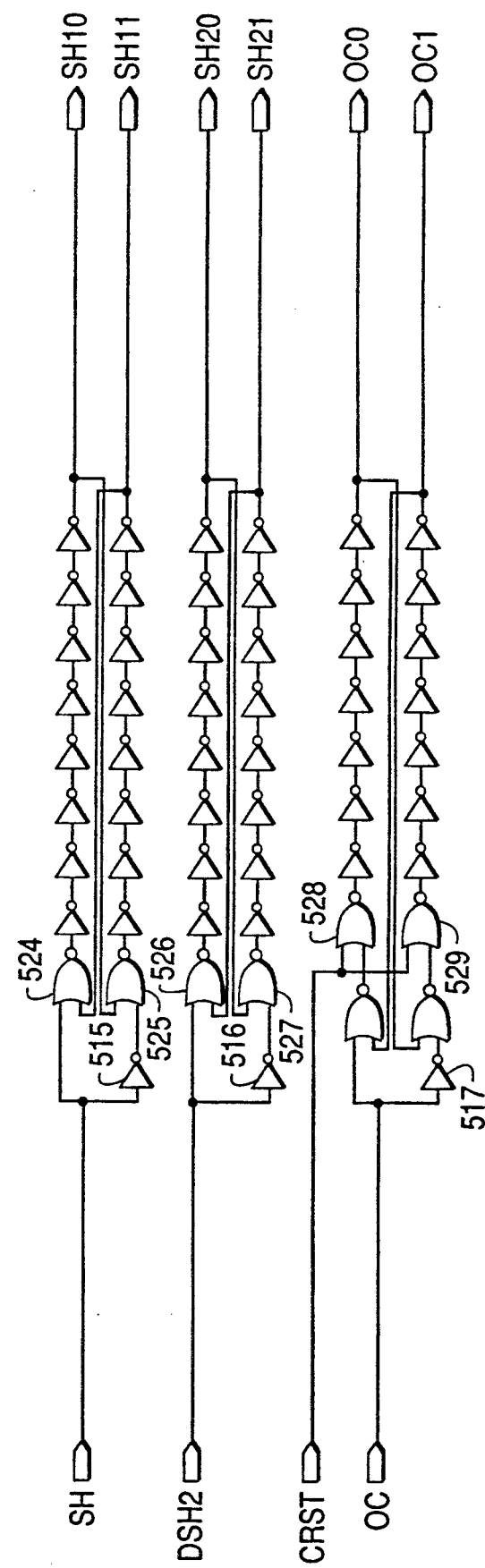
FIG. 25 shows a detailed circuit diagram of a phase control circuit.

FIG. 23 shows a non-linear function generating circuit and FIGS. 24, 25 and 26 show hardware on the digital logic side of the ANP.

FIG. 23 shows a transistor circuit for realizing a sigmoid function. The sigmoid function represents a monotonously decreasing function but does not exclude a linear function. Transistors 343, 356, 378, 390, 298 and 314 and transistors paired with them form differential amplifiers and the transistors connected to the collector side of the differential amplifiers constitute current mirror circuits. The collector current flowing through the collector of the transistor on the left side of the differential amplifier is the output current. The current mirror circuit changes the direction of the current and outputs it. The current enters resistor 336 connected to the output V0, which changes the voltage into current. As driving capability is lacking, an operational amplifier with a high impedance is provided at the output. The circuit provided on the input side of transistors 337 and 339 constitutes a bias-circuit.

A division linear method is used to realize a sigmoid function. The slopes of respective divisions of the sigmoid function are determined by the ratio of emitter resistor 344, connected to the emitter of the differential amplifier 343, 348, to output resistor 336. In this instance, the emitter resistance of transistor 343 is also included. The gains of respective differential amplifiers are different. The break point relating to a variation in respective division lines utilizes such saturation characteristics of the transistor. The saturation characteristics of all the transistors are different. The saturation characteristics of respective amplifiers are changed so that the value of the sum of the currents outputted from respective operational amplifiers forms a sigmoid function at the output point V0.

Transistor 345 and resistor R1 constitute a current source. Transistor 346, resistor R2, transistor 353 and resistor R3 are the current sources for supplying the same currents. Namely, the resistors are determined so that the current value of the current sources are the same. The collectors of transistors 345 and 346 are connected to each other and the sum of their currents flows through the common junction of resistors 344 and 347. The collector currents of transistor 343 and 348 become the same when the current is balanced. Transistor 351 is provided to improve the characteristic of the current mirror. Transistor 350 is diode connected.

The change in the current means that drawing the current from the output is changed to delivering the current to the output and vice versa. As shown in FIG. 23, the current flows from the collector of transistor 351 of the current mirror circuit to the output. The transistors whose emitters and collectors are connected to the same point form a single transistor. For example, transistors 358 and 360 form a single transistor which is the same as transistor 345. Transistors 359 and 361 form a single transistor and correspond to transistor 346. Transistors 368 and 369 form a single transistor and correspond to transistor 353. The same relationship is applied to the other transistors shown in the lower part of the circuit. Therefore, there are provided 6 circuits in which an operational amplifier with a constant current source and driven by the same current, changes the direction of the current in accordance with the polarities of the output voltages.

Transistors 337 and 338 form a level shift circuit and transistors 330 and 327 also form a level shift circuit. The level shift circuit makes the scope of the operation the same between the positive and negative area of the sigmoid function. Transistor 352 is for a correction such that the collector current of transistor 351 becomes the same as the collector current of transistor 353. The operations of the transistors 367, 385, 287 and 307 are the same.

FIG. 24 shows a detailed circuit of a sequence generator 28 (FIG. 5) for forming a pulse signal applied to the neuron chip. Inverters 401, 402, 404 and 405 form a clock signal. The clock signals are separately formed for a rise of a latch signal of flip-flops and a fall of a latch signal of flip-flops. The flip-flops in FIG. 24 perform latching at a rise of a clock and the inverter and flip-flop FF. Thus, the inverter and flip-flop from a flip-flop circuit for a latching. For example, when DCLK passes one inverter 401, it forms a clock signal for performing a latching of the data at the fall of DCLK. When DCLK also passes inverter 402, it forms a clock signal for performing a latching at a rise of DCLK. Similarly, the output of inverter 404 forms a clock signal for latching on a fall of WCLK and inverter 405 forms a clock signal for latching on a rise of WCLK.

Flip-flop 410 latches the SYNC signal at the fall of DCLK. Flip-flops 410 and 415 delay the SYNC signal by one cycle of DCLK to form SYNC2. Therefore, the SYNC signal and the signal delayed by one clock from the SYNC signal form a pulse of one $\tau$. After a rise of the SYNC signal, the pulse of $1\tau$, (one period of DCLK) enables the integration capacitor in the differential amplifier to perform a discharge. Namely, CRST is a reset signal for the capacitor. Signal DSH2 is formed by obtaining a pulse of $1\tau$ of the DCLK period from the fall of the SYNC signal and is for forming a sample hold signal of the capacitor within the ANP circuit.

In flip-flop 411, WCLK is the clock and DCLK is data. Thus, flip-flop 411 performs a latch of the DCLK signal at WCLK. Thereafter, the SYNC signal becomes high at NAND gate 414 and WCLK, coming immediately after DCLK becomes high, is used as a trigger signal to form a clock of flip-flop 443. Flip-flop 443 receives a sign bit of the digital weight data WD at the first WCLK after the SYNC signal becomes high. The sign bit is MSB of serial digital weight data. Flip-flop 443 latches the sign bit at a timing of flip-flop 411 and AND gate (414 and 440). Binary counter 416 counts the number of WCLK. As the 16-bit digital weight data is received, the weight clock WCLK is counted up to 16. Upon completion of a counting operation, the output of counter 416 becomes high and is entered into inverter 423. The input to inverter 423 designates that the count of the 16 bits is completed. Thus, this signal controls that the weight data inputted serially to the ANP is transmitted into shift register 27 (FIG. 5).

The LSB bit of counter 416 is input to inverter 422. The output of inverter 422 forms a CSO signal. CSO is a control signal of the daisy chain circuit. It comprises a delay circuit for carrying out a daisy operation such that the next CSO is produced after the CSO of the previous ANP falls to prevent competition of signals outputted from two ANPs in a stage. The delay time for the delay circuit is formed by counting WCLK and the value of the counter. When counter 416 completes the count, the designation signal for notifying a completion of the count to flip-flop 433 is latched to inverter 423 at 17 WCLK. The latch signal is returned to counter 416 via inverters 437 and 438, thereby preventing counter 416 from executing an incrementing operation.

When the output of inverter 438 becomes low the output $\bar{Q}$ of flip-flop 433 is input to flip-flop 442, thereby forming a gate signal WR for the output of shift register 27 (FIG. 5). Shift register 27 sequentially shifts 16 digital weight data and when the numerals of 15 bits (excepting the sign bit) are arranged in parallel, they are outputted. The gate signal WR prevents an output during the period of shifting and produces an output upon receiving all the 15 bits. The content of the shift register 27 is applied to a multiplier in the ANP. The signal output from flip-flop 433 is divided to be used for the enable signal and for the shift register. Flip-flop 442 latches the output of flip-flop 433 at the time of a rise at its clock input. A shifting operation is completed at the fall of 16 WCLKs and thereafter the opening of the gate is carried out at a rise of the latch signal, but may be carried out at a fall of the latch signal.

Flip-flop 412 forms a pulse signal for use in selecting a sigmoid function. By using flip-flop 412, it is selected at a time of receiving a reset signal depending on 0 or 1 of the weight input signal whether or not the sigmoid function is used. This method may not be used in the present system. Actually sigmoid selection signal may be directly formed externally. A daisy chain circuit is shown in the lower part of FIG. 16 for this purpose.

The output of counter 416 is delayed by flip-flop 434 and flip-flop 445 triggers the delayed signal. Therefore, DCLK is shifted by $1\tau$ with the head portion of the DCLK pulse cut, namely, the CSI signal itself sometimes does not have the same period as that of DCLK. Then, in order to form CSO from CSI, the beginning part, for example, the waveform corresponding to two microseconds, is cut. The waveform is then delayed by that amount and thereafter the DCLK signal is formed. Gates 425 and 427 form a buffer gate of the CSI and respectively operate as positive and inverter buffers.

FIG. 25 shows the phase control circuit 29 shown in FIG. 5 for forming a sample/hold (S/H) signal and an OC signal. The S/H signal is divided to be input to inverter 515 and gate 524. The OC signal is similarly divided. After the S/H signal is input to gate 525 through inverter 515, 8 inverter stages are provided. One signal with the same phase as the S/H signal and another signal with the opposite phase are formed. Several stages of inverters are connected in cascade and the output of one cascade line is input to the other cascade line, thereby avoiding a situation in which the outputs from both the first and second lines of the cascade are simultaneously "1". That is, the sample/hold S/H signal forms two signals comprising SH10 and SH11 to avoid the situation in which both become "1". Thus, the inverter chain is a delay circuit for avoiding concurrent ON states of both S/H signals. The delay time is determined by the length of the inverter chain and the output of one inverter chain turns on several stages after the other is turned on. The same process is applied to SH20 and SH21. The circuit relating to the OC signal operates in basically the same manner as recited above. The CRST signal is input to gates 528 and 529 and in the case of CRST=1, both outputs from the two chains are compulsorily turned to "1". The situation in which both OC0 and OC1 are simultaneously turned to "1" is ordinarily avoided, but when CRST is "1", both OC0 and OC1 turn to "1". Therefore, the reset function for charging a capacitor of an integrator through a control of the analog switch is realized.

FIG. 26 illustrates shift register 27 (FIG. 5) of 15 bits. Gates 602, 603 and 614 and flip-flop 627 correspond to one bit and are used for the following explanation. The output from flip-flop 628 at the previous timing is input to gate 603. This is the input from the previous bit and becomes a data signal for shifting. The other signal inputted to gate 603 is $\overline{SHFT}$, namely, an inverted signal of the shift signal SHFT. This is a shift control signal and if it is valid, a shift instruction is carried out. The output of flip-flop 627 is input to gate 602. Thus, the output of flip-flop 627 is fed back to the input of gate 602. The inverted SHFT signal is applied to the other input of gate 602 and this phase is different from that of the signal input to gate 603. Therefore, if the shift is invalid, the present output is maintained. The clock signal is entered independently from shifting. The shifting operation is not carried out even if the clock is received. The previous bit is shifted and inputted through gate 603 only when a period of the shift signal SHFT is effective, thereby performing a shift operation. A WR signal is input to AND gates 632 and 633, and forms a selection signal to determine whether the outputs for respective bits are produced and forms a control signal to determine whether or not the data stored in the shift register is transmitted to the multiplier. Inverter 620 provides a reset signal to 5 out of 15 flip-flops and gate 626 provides a reset signal to 10 flip-flops. Thus, shift register 27 has a function of a shift enable SHFT and output enable WR.

Figure 27A:
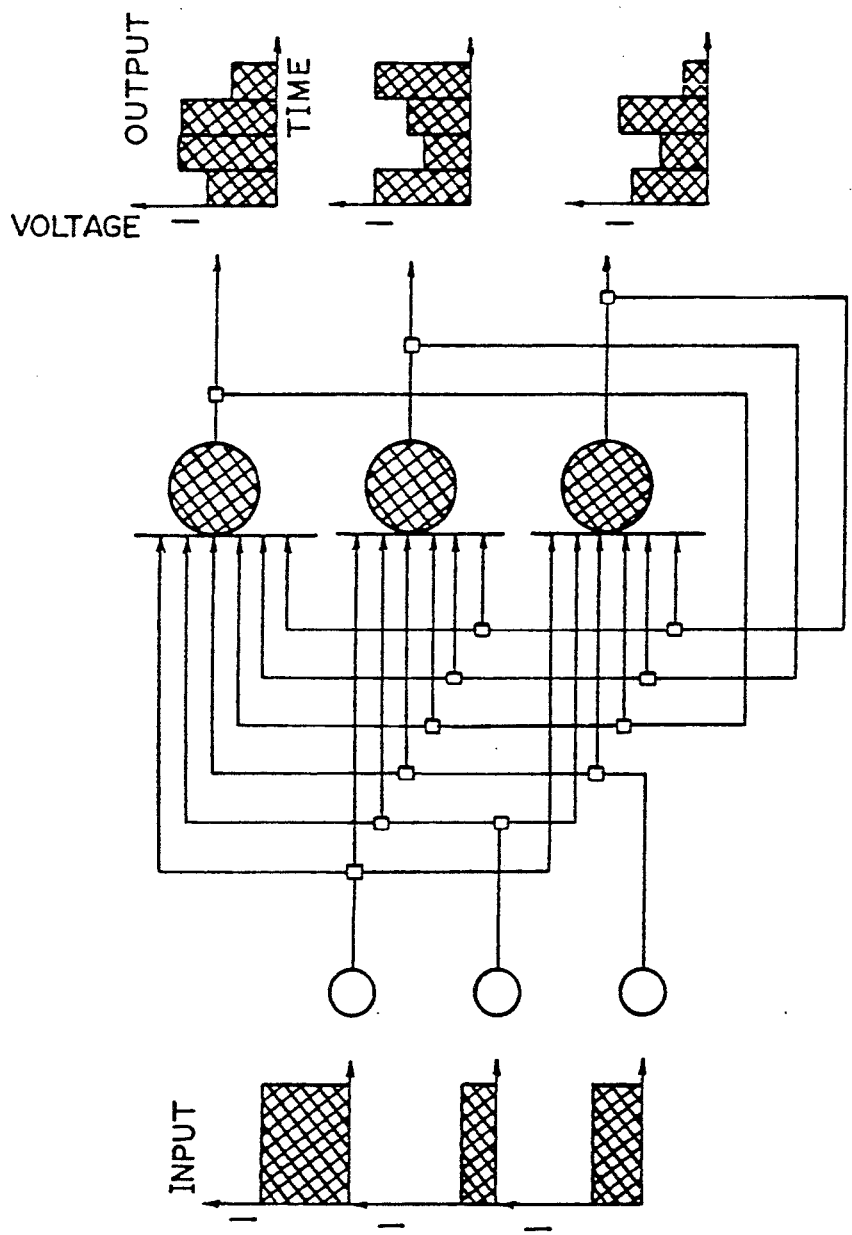
FIG. 27A is a conceptual view for explaining a feedback type network.

Next, the neuron computer of the present invention is explained by referring to a feedback type network. FIG. 27A is a conceptual view of a feedback type network. In this type of network input exists basically and a feedback path is provided to return as input the signal which is output from the network. The feedback type apparatus is used for the first case in which one layer in the layered type neural network is used in a time divisional multiplexed manner or for the second case in which a so-called Hopfield type neural network is used.

In the first case, the input and output signals of the ANP are provided in a time divisional manner and the output data of the same ANP are sequentially outputted at every constant sequence cycle at the output of respective ANPs and one of the sequence cycles operates sequentially as the input layer, the intermediate layer and the output layer. In the second case, the output voltage is fed back to the input until the output of the ANP reaches a predetermined value, that is, becomes stable. When the fed-back result is outputted, the cycle is repeated until the fed-back result complies with the previous data, namely, the data outputted by itself previously, and the state is converged if a stable solution is reached.

Figure 27B:
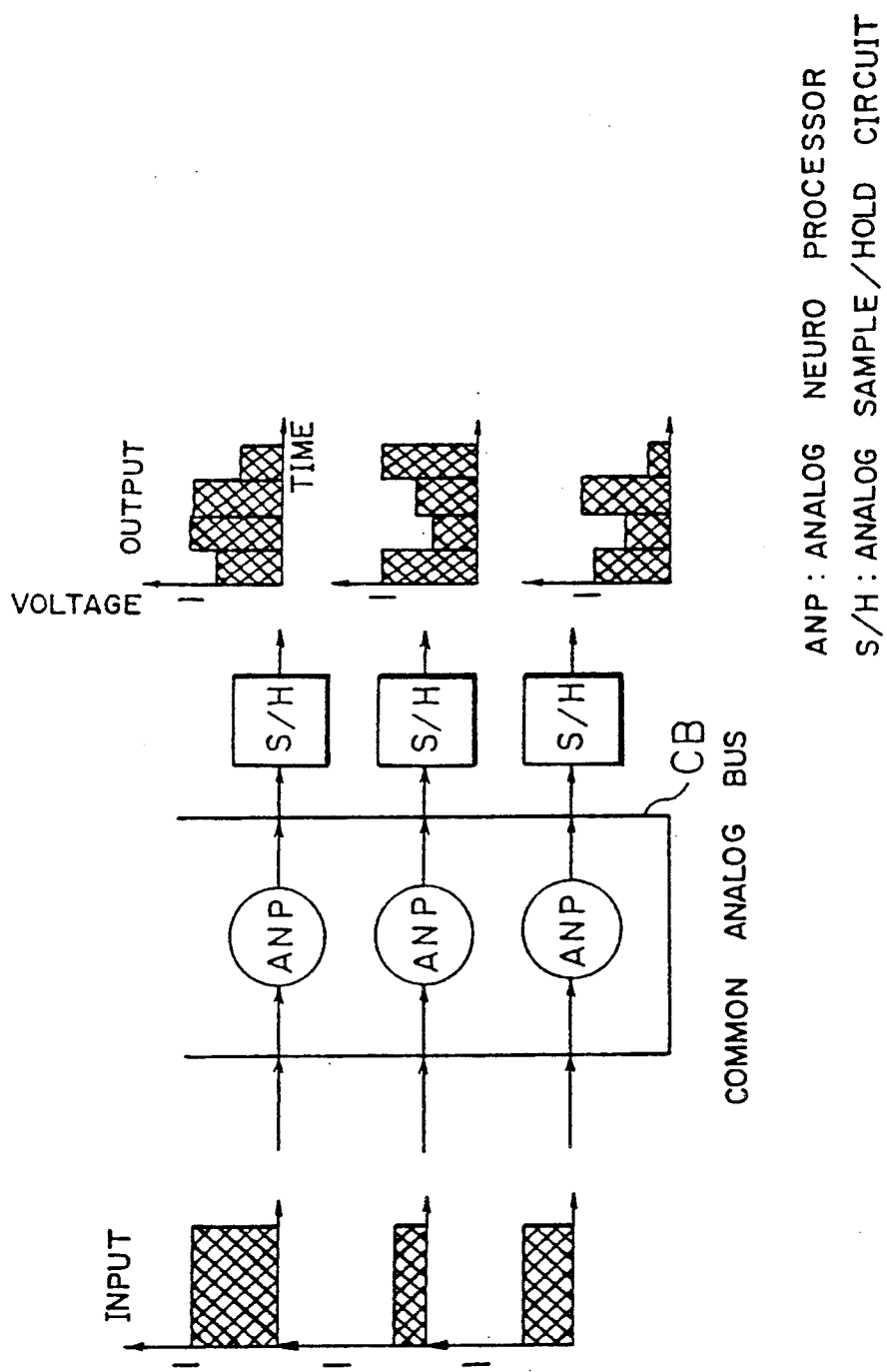
FIG. 27B shows an example in which a feedback type network can be realized by the neuron computer of the present invention.

According to the embodiment of the present invention shown in FIG. 27B, the feedback type is realized by the common analog bus CB forming a feedback path. The output obtained by the calculation of one ANP is fed back to respective ANPs through the feedback path, and this feedback operation is repeated.

Figure 28:
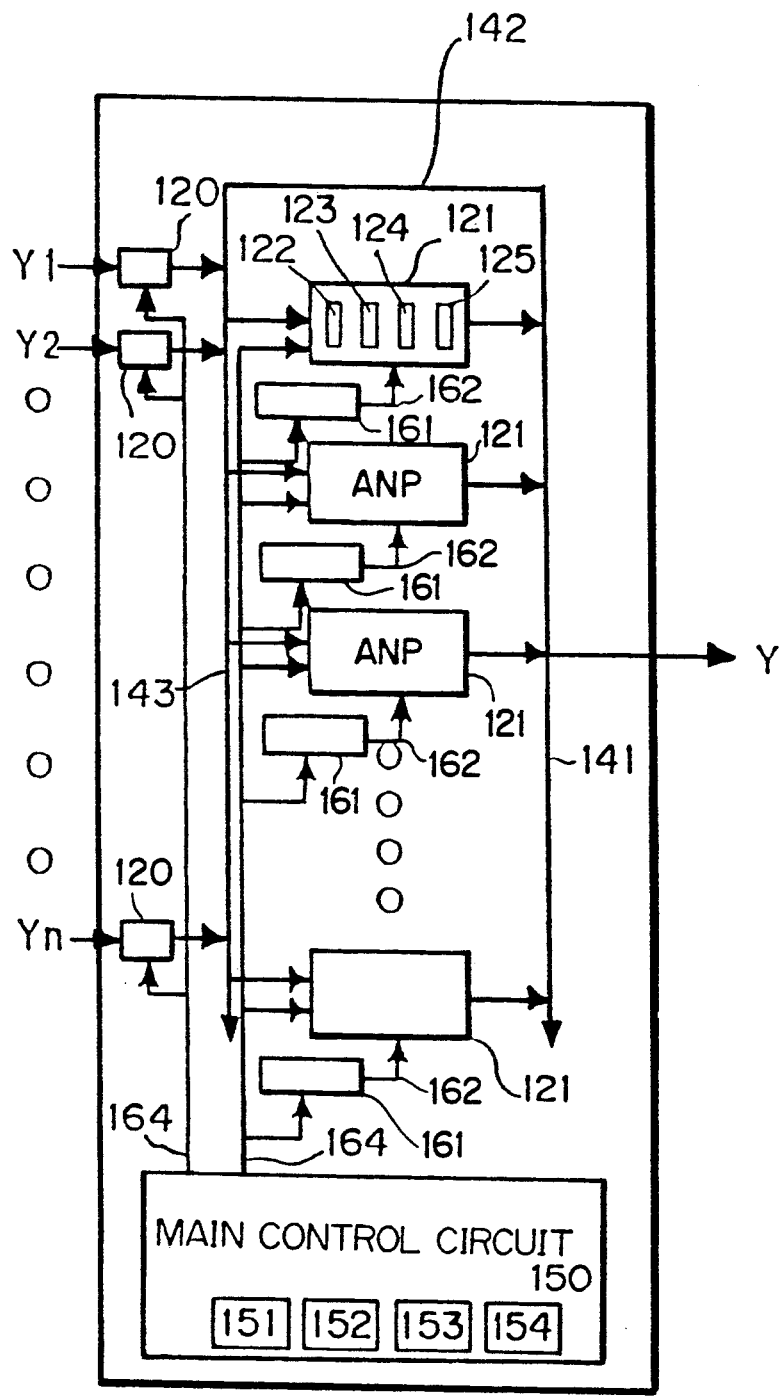
FIG. 28 shows a block diagram of an embodiment of a feedback type network.

FIG. 28 shows a view of an arrangement of the first embodiment of the feedback type network. In FIG. 28, 121 corresponds to a plurality of basic units forming a processing layer. These basic units 12 similarly have multiplying units 122, accumulating units 123 and threshold value elements 124, and sometimes have output holding units 125. Similarly, the inputs and outputs of basic units 121 are formed of analog signals. An electric connection is made between the output portions of respective basic units 121 and the input portions of basic units 121 through analog buses 141, 142 and 143. The weights determined corresponding to respective connections form a layered network in an equivalent manner, namely, a Hopfield type network.

142 is an analog bus and is a common line provided for electrically connecting the output portion and input portion to form a feed-back line. Main control circuit 150, which controls the data transfer, comprises driving unit selecting means 151, weight setting means 152, threshold value process initiating means 153 and output value transmitting means 154.

Driving unit selecting means 151 sequentially selects basic units 121. Output value transmitting means 124 feeds back the analog signal maintained by the maintaining portion of the output of selected basic unit 121 to multiplying process unit 122 of basic unit 121 through analog bus 142 in accordance with a transmission type of a time division, and in synchronization with the above selection process. Multiplying portion 122 of respective basic u its 121 receives the input and sequentially selects the weights corresponding to respective connections determined by weight setting determining means 152 and performs a multiplication process on the input and the weight. Adding portion 123 sequentially accumulates the multiplication result obtained by multiplying unit 122. When it is confirmed that all the accumulation processes concerning basic unit 121 in the process layer are completed, threshold value process initiating unit 153 initiates threshold value process unit 124 of basic units 121 and applies a constant threshold voltage to perform a calculation of a sigmoid function.

This process is repeated cyclically for a predetermined number. This data transfer system can provide an output pattern corresponding to the input pattern a the output of the layered network in which the layer is used in a time divisional multiplexed manner.

This embodiment discloses a network structure data process apparatus comprising a single layer. In order to form the network structure data process apparatus of a multi-layered structure by using a single layer structure, analog bus 142 is used as a common line. It feeds back the output of basic unit 121 of a single layer, thereby connecting the output of respective basic units 121 to the input portion of the basic unit 121.

Figures 29A, 29B:
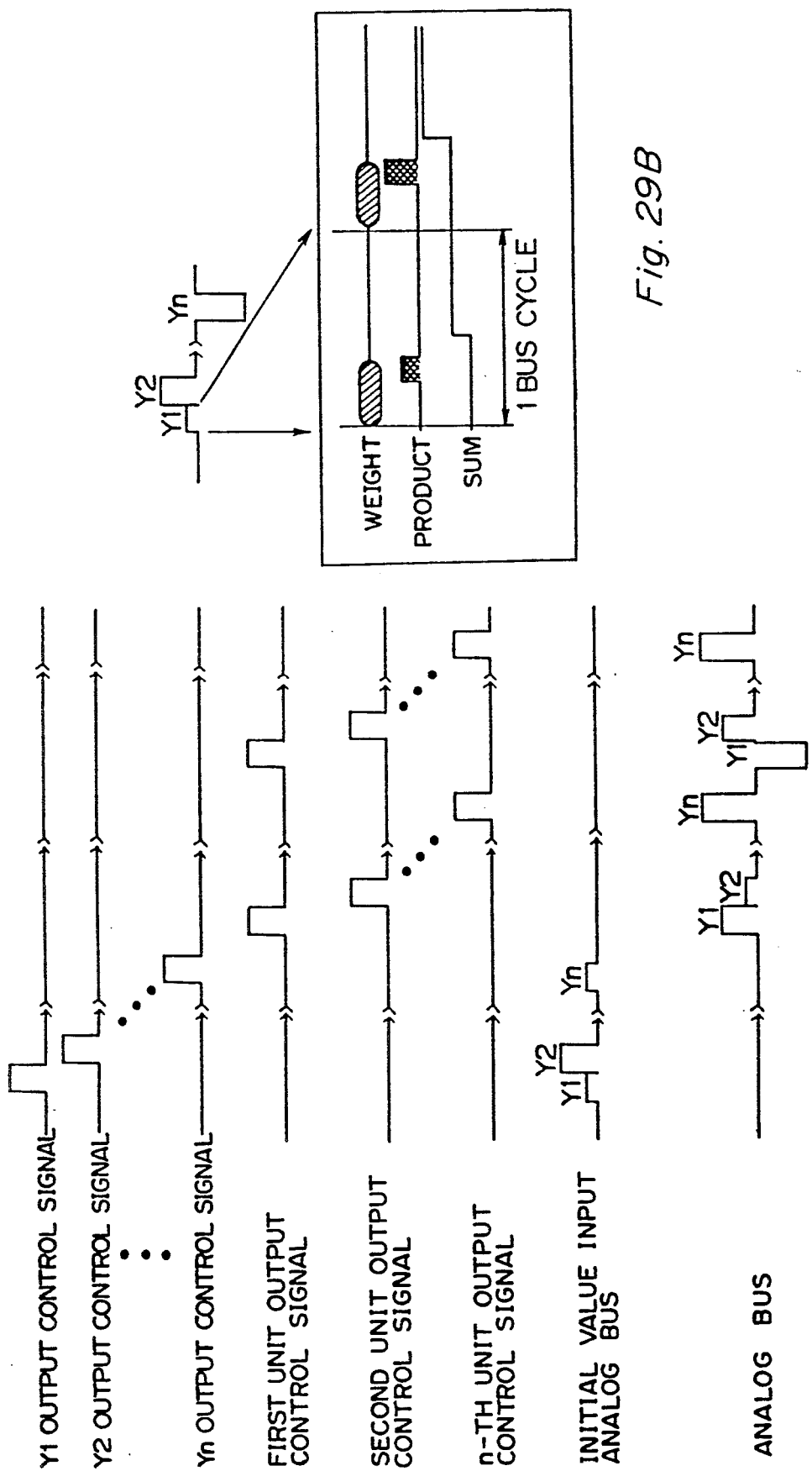
FIGS. 29A and 29B are timing charts of a signal process of an embodiment shown in FIG. 28.

Next, an operation of the embodiment shown in FIG. 28 is explained in accordance with a timing chart shown in FIG. 29A. In response to a request for a conversion to the output pattern, main control circuit 150 sequentially transmits a control signal of CSI to input circuits 120 and sequentially selects a plurality of input side circuits 120. FIG. 29A designates the selection process. The input side circuit 120 thus selected, sequentially transmits analog signal $Y_I$ provided as the input pattern onto analog bus 143. Accordingly, as shown in FIG. 29A, analog signal $Y_I$ is sequentially transmitted onto analog bus 143 by n input side circuits 120.

As shown in the timing chart in FIG. 29B, multiplication portion 122 of respective basic units 121 receives analog signal $Y_I$ and then carries out a multiplication by using weight $W_I$ of weight holding portion 38 (FIG. 6) which is set by main control circuit 150. Accumulation unit 123 of respective basic units 121 sequentially accumulates the multiplication result obtained by every selection of input side circuits 120. When all the selections of input side circuits 120 are completed, all the accumulation processes are completed. At that time, threshold value portion 124 of respective basic units 121 obtains the final output value Y which is the final output of the arithmetic operation of basic units 121.

The final output value Y thus obtained is maintained inside the basic unit. Output switch portion 36 (FIG. 6) of respective basic units 121 receives the output controls signal as CSI transmitted from main control circuit 150 and is then sequentially turned on, thereby feeding back the maintained final output value of the analog signal to multiplication unit 122 of basic unit 121 through analog bus 142. By this process, the final output values of basic units 121 in the input layer are transmitted in a time divisional transmission format for basic units 121 in the intermediate layer in an equivalent manner.

By repeating the same process for all of basic units 121, the final output value Y corresponding to the output layer is obtained. FIG. 29A shows a timing chart of the output control signal provided to basic units 121 in accordance with the output signal $Y_I$ to be input to input side circuit 120 and a timing chart of the analog signal of the final output value Y on analog bus 142.

As compared with the layered network, the embodiment shown in FIG. 28 has the disadvantage that the input pattern cannot be applied continuously but has the advantage that the layered network can be formed in a simple structure, thereby greatly reducing the layered network when it is formed on a chip.

Figure 30:
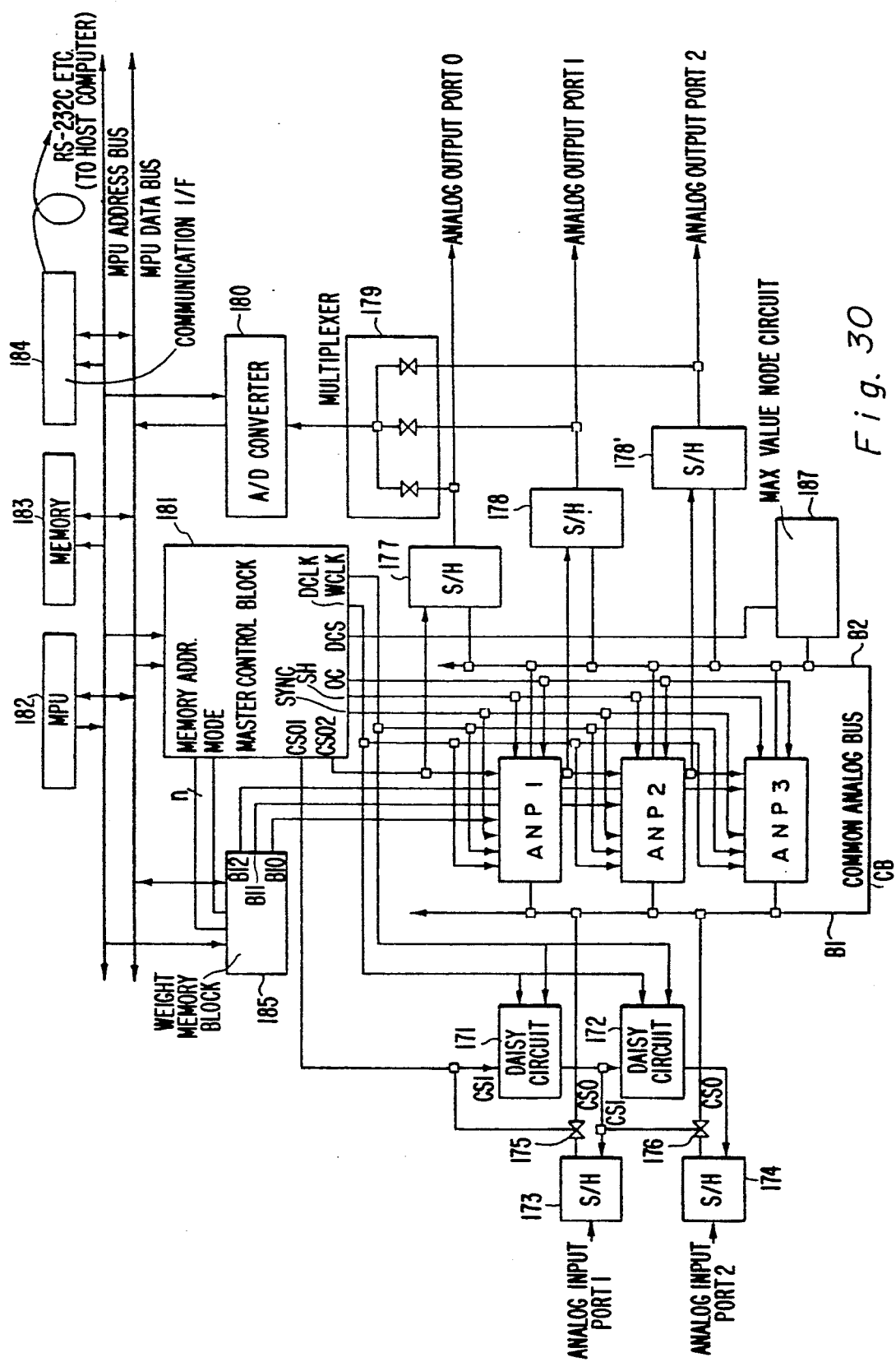
FIG. 30 shows a detailed block diagram of one embodiment for forming a first feedback type network in accordance with a neuron computer of the present invention.

FIG. 30 shows an embodiment of a neuron computer of the present invention which is realized by a feedback type network which operates as a layered type network. The sum-of-the-products operation is carried out for the time divisional analog input signal from analog input ports 1 and 2 in ANPs 1, 2 and 3 and ANPs 1 and 2, which operates as the intermediate layer. Output is produced in a time divisional manner from ANPs 1, 2 and 3 to analog bus B2. The output signal is fed back to analog bus B1 through analog common bus CB of a feedback path and again the sum-of-the-products operation is applied to the feedback signal at ANPs 1, 2 and 3. ANPs 1, 2 and 3 are made to operate as the output layer, thereby realizing a layered type network. Maximum value node circuit 187 receives DCS output of the master control block 181 and produces a dummy signal to analog bus B2. DCLK and WCLK are respectively input to daisy circuit 171 from the master control block 181 to define the timing of the rise and fall of the CSI signal.

Figure 31A:
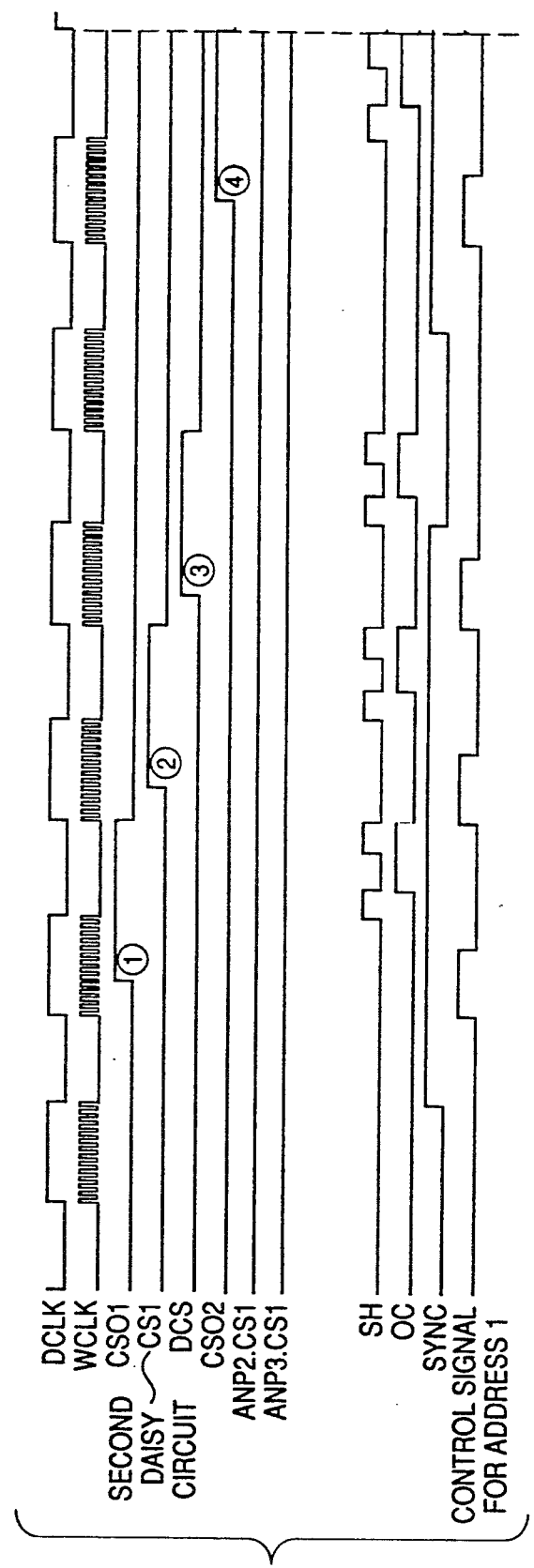
FIGS. 31A and 31B show timing charts for signal processing in the embodiment shown in FIG. 30.
Figure 31B:
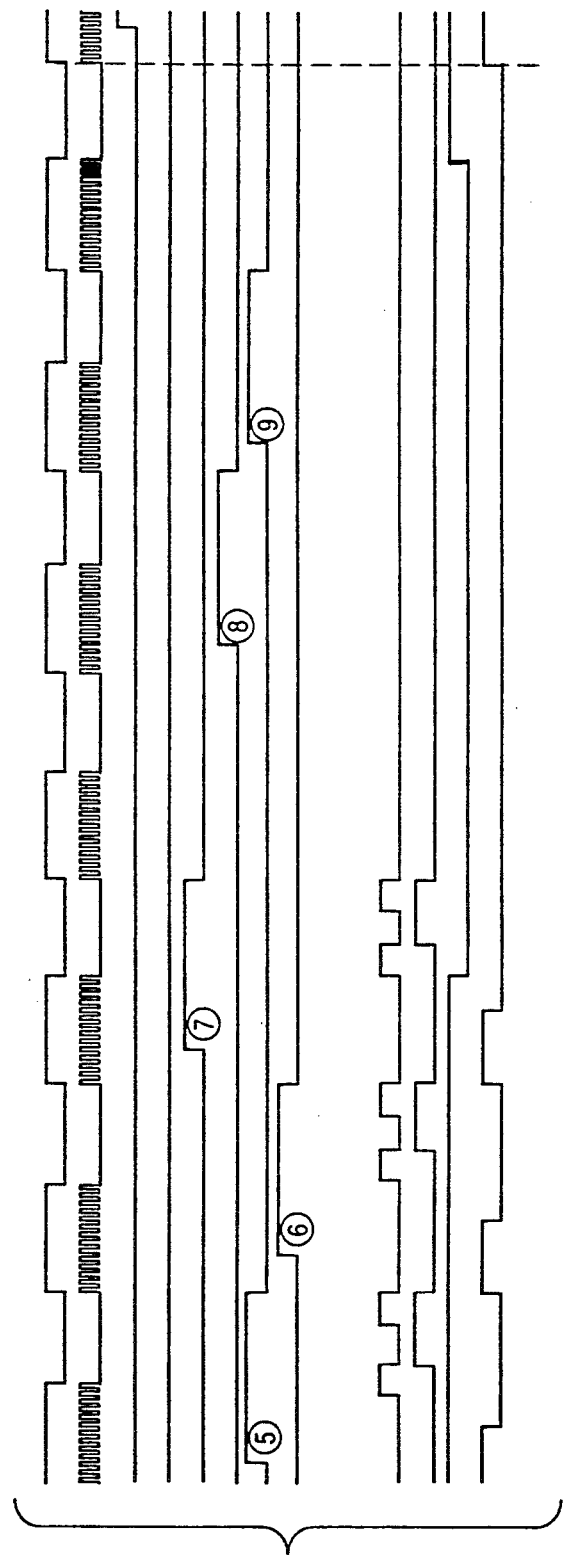

FIGS. 31A and 31B are a timing chart of the feedback type layered network illustrated in FIG. 30. WCLK is produced only during the high state of DCLK. After the rise of DCLK, the analog signal is made constant and the weight data is input serially. CSO1 from master control block 181 is input to daisy circuit 171 at a timing before the weight data are arranged in parallel when, as shown by ①, the CSO1 signal rises. At this time the analog signal, held in the sample hold (S/H) circuit 173 after the analog signal is input from analog input port 1, appears on the analog bus B1 through analog switch 175 and the sum-of-the-products operation is conducted at ANPs 1, 2 and 3. Upon the input of the next DCLK, the CSI to daisy circuit 172 rises as shown by time ②. The signal from the sample/hold S/H circuit 174 for holding the input signal from the analog input port 2 appears on the analog bus B1 through the analog switch 176 and the second sum-of-the-products operation is conducted at ANPs 1, 2 and 3. Further, after DCLK is input in the next timing, the dummy signal DCS is produced from the master control block 181 shown by time ③ and the third sum-of-the-products operation for the fixed voltage is carried out by ANPs 1, 2 and 3 for the output layer. Only during the high period of the address count inhibiting signal applied to the address 1 of the weight memory, is WCLK for counting the address counter enabled and the count of the address counter is prohibited at times other than those recited above.

Next, when CSO2 is applied to ANP1 from the master control block, ANP1 produces the result of the previous sum-of-the-products to the analog bus B2 and the result is fed back to the analog bus B1 through analog common bus CB. Also at time ④, the sum-of-the products operation is again carried out at ANPs 1, 2 and 3. After CSO2 is delayed by a predetermined period in a daisy chain circuit in ANP1, the input signal CSI is applied to ANP2 as shown by time ⑤, and this time the output signal from ANP2 is applied to the ANPs again through analog bus B2, common bus CB and analog buses A1 and B1, thereby performing the sum-of-the-products operation. Similarly, after CSO is output from ANP2 after delay by the predetermined period, the delayed CSO becomes a CSI signal of ANP3. When the CSI signal rises as shown by time ⑥, the output signal of ANP3 is again fed back to ANPs 1, 2 and 3 through analog bus B2, common bus CB and analog bus B1, thereby performing the sum-of-the-products operation. Similarly, as shown by time ⑦, when the signal DCS for the dummy node rises, the sum-of-the-products operation is carried out for the fixed voltage in ANPs 1, 2 and 3. Upon the following rise of the CSO2 signal, the output is produced from ANPs 1 and 2 through the S/H circuits 177 and 178 as shown by times ⑧ and ⑨. Analog output port 2 does not produce a signal in this embodiment.

ANPs 1, 2 and 3 operate as the intermediate layer in times ①, ②, and ③ and as the output layer in times ④ ⑤ and ⑥. Accordingly, only one layer of ANPs 1, 2 and 3 form a layered type network.

Figure 32:
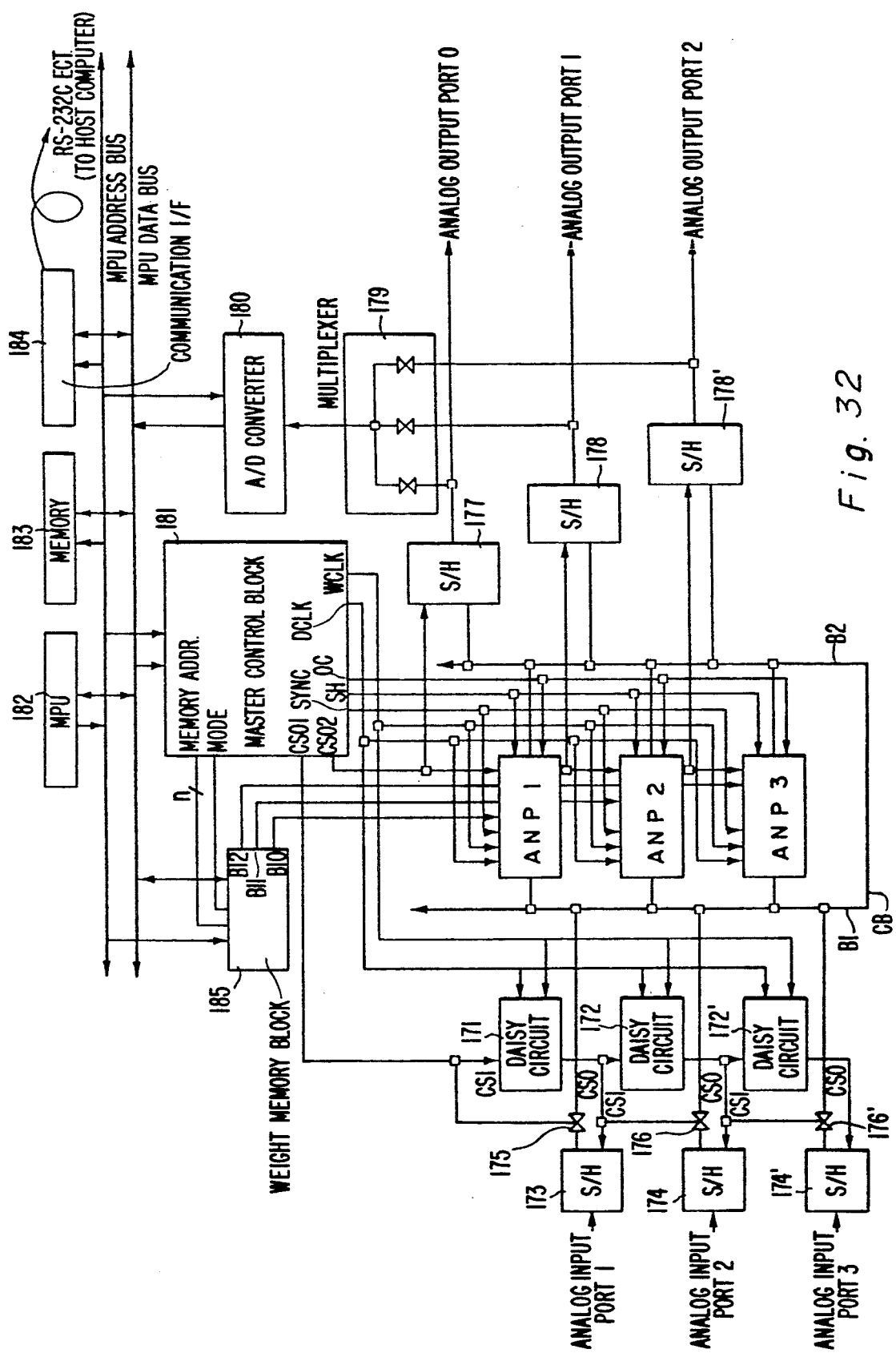
FIG. 32 shows a detailed block diagram of the second feedback type network which is formed by the neuron computer according to the present invention.
Figure 33A:
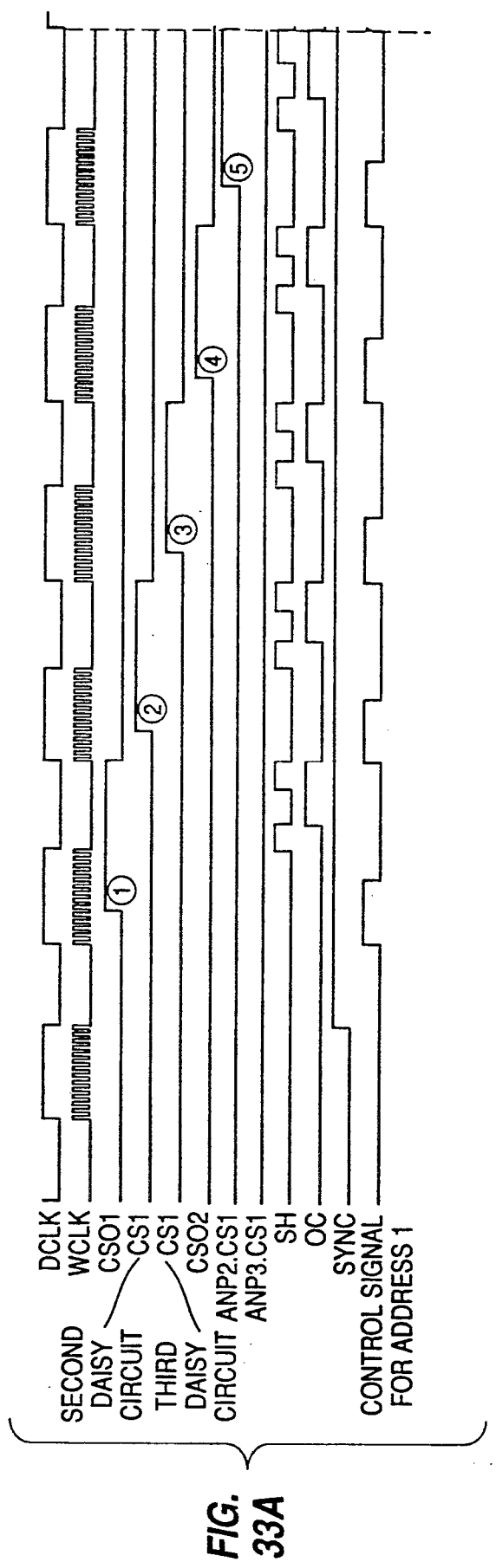
FIGS. 33A and 33B show timing charts for signal processing in the embodiment of FIG. 32, FIG. 34 designates a block diagram of an embodiment obtained by combining a layered type network with a feedback type network in accordance with a neuron computer of the present invention.
Figure 33B:
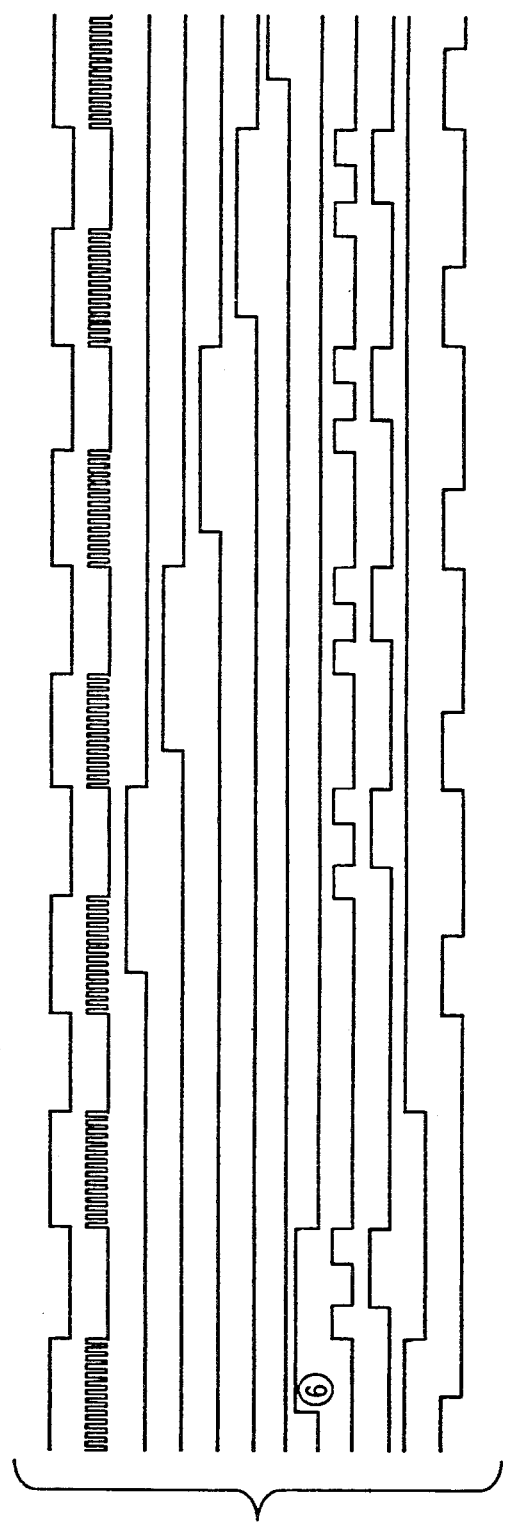

FIG. 32 shows an embodiment in which an analog neuron computer forms a Hopfield type feedback network. FIGS. 33A and 33B show a timing chart of the embodiment shown in FIG. 32. The output from the memory address terminal and mode terminal of master control block 181 is added to weight memory block 185 and B10 of the data output from weight memory block 185, which is connected to ANP1. B11 is connected to ANP2 and B12 is connected to ANP3. The output signal from the terminal for SCO1 of master control block 181 is applied to daisy chain circuit 171 and analog switch 175. The output from sample/hold circuit 173 from the analog input port 1 is provided to analog bus B1. The CSO1 signal is delayed for a predetermined period by daisy chain circuit 171 and CSO output therefrom is applied to daisy chain circuit 172 as CSI. The signal of sample/hold circuit 174 connected to analog input port 2 is provided on analog bus B1 through switch 176. The output signal CSO of daisy chain circuit 172 simultaneously opens the output switch 176' of sample hold circuit 174', which is connected to analog input port 3, and the signal output from the output switch 176' is provided on analog bus B1.

ANP1 performs a single product and sum operation during the period of a DCLK signal and when the DCLK signal is high, the weight clock WCLK is driven and the digital weight data is inputted in synchronization with the weight clock WCLK, which is multiplied by the analog input signal. In the latter part of the DCLK cycle, DCLK is low and the sample/hold signal S/H becomes high, enabling a capacitor integrator to perform a summing operation. During period ①, when CSO1, namely, the CSI of daisy chain circuit 171, is high, ANPs 1, 2 and 3 perform a product and sum operation on the analog signal on bus B1. When the OC signal from the master control block 181 becomes high, ANPs 1, 2 and 3 perform an offset cancellation and a sample hold operation. This results in a completion of one cycle of the product and sum operation. Next, the input signal CSI received by the second daisy chain circuit 172 becomes high as shown by ②, and ANPs 1, 2 and 3 perform a product and sum operation on the input signal from analog input port 2. When the product and sum operation period is completed, the CSI signal is input to daisy chain circuit 172' and the output signal is produced from sample/hold circuit 174' and, as shown by ③, the third product and sum operation cycle starts.

Next, CSO2 signal ④ is produced from master control block 181 and the signal formed in the previous product and sum cycle from ANP1 is fed back via analog bus CB. The product and sum operations are simultaneously conducted by ANPs 1, 2 and 3 using the feedback signal. Next, after being delayed for a predetermined period, the CSO output signal from ANP1 is applied to ANP2 as shown by ⑤. The signals stored in the timing of the product and sum cycle of the previous timing are outputted from ANP2 in a daisy-chain-like manner. The signal is fed back to ANPs 1, 2 and 3 through analog bus CB and the sum-of-products operation is facilitated as shown by ⑤. After delaying the signal period for a predetermined period, the CSO of ANP2 is applied to ANP3 as shown by ⑥, and the output from ANP3 is fed back to ANPs 1, 2 and 3 through the analog bus CB to perform a product and sum operation at ⑥.

As shown in FIGS. 33A and 33B, the feedback type network and the outputs from 3 ANPs, perform six product and sum operations which are output to analog output ports 0, 1 and 2 through sample/hold circuits 177, 178 and 178′. The output signals from sample/hold circuits 177, 178 and 178′ are selectively output by multi-analog multiplexer 179 and supplied to the digital control circuit comprising MPU 182, memory 183, and communication interface 184 through A/D converter 180. MPU 182 determines whether the neuron output state at the present time is the same as the neuron output state of the previous time. If they are in the same time status, the system can be considered to become stable. Therefore, the operation is carried out by using a single common analog bus CB through the feedback operation and is repeated to reach a stable resolution which is deemed as a final output.

Figure 34:
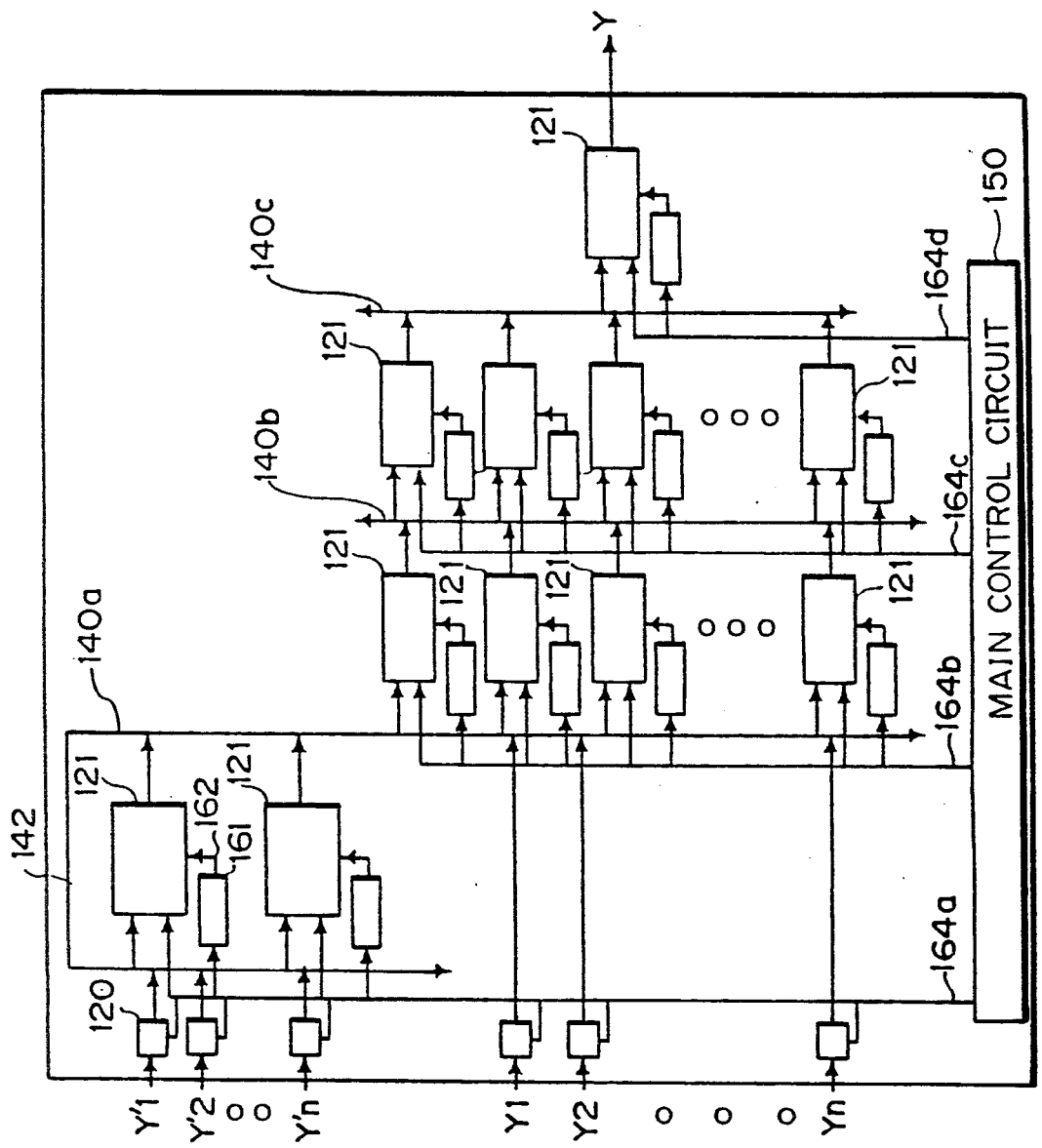

The embodiment shown in FIG. 34 utilizes the feedback network illustrated in FIG. 28 in a part of the layered network of the embodiment of FIG. 12.

Figure 35:
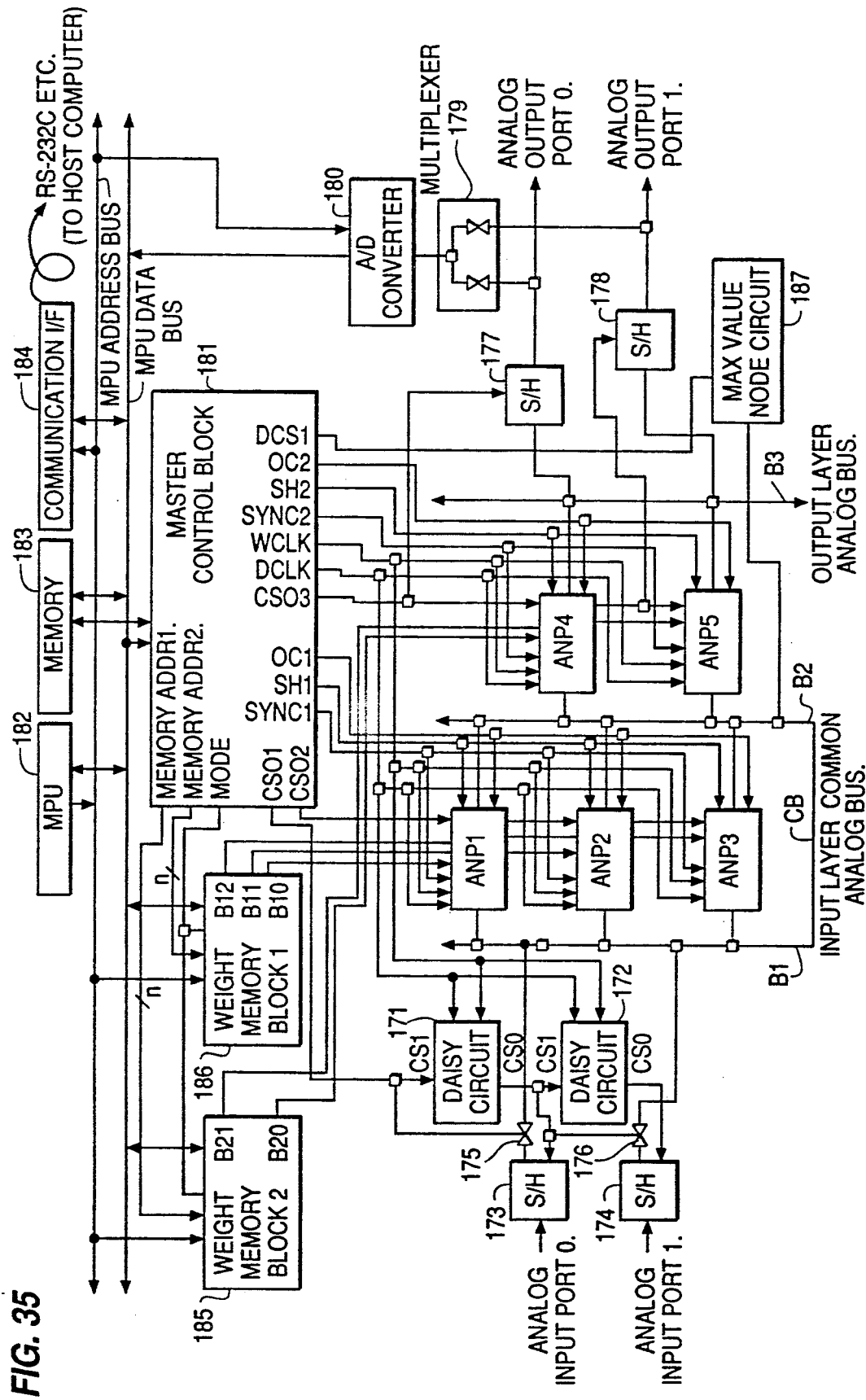
FIG. 35 is another detailed block diagram of another embodiment in which a layered type neuron computer is combined with a feedback type neuron computer.

FIG. 35 shows an embodiment in which a feedback type network is combined with a layered network. Daisy circuits are provided as an input layer, ANPs 1, 2 and 3 are provided in the intermediate layer and ANPs 4 and 5 are provided at the output layer. The outputs from ANPs 1, 2 and 3 in the intermediate layer are fed back to analog bus B1 through analog bus B2 and common analog bus CB. Maximum value node circuit 187 is connected to analog buses B1 and B2 as a dummy node. The outputs of ANPs 4 and 5 forming the output layer are outputted from analog output ports 0 and 1 through sample/hold circuits 177 and 178, respectively. B3 is the output layer analog bus.

Figure 36A:
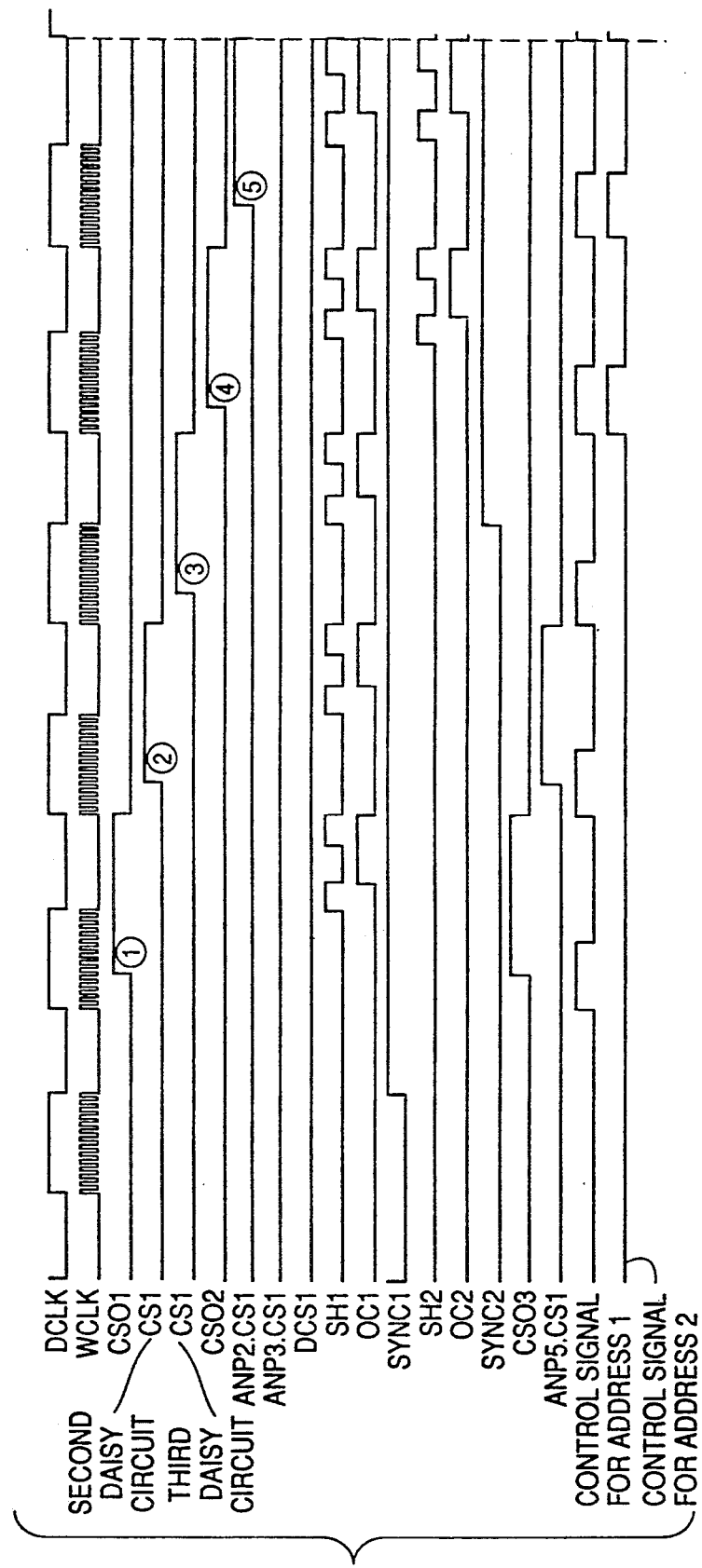
FIGS. 36A and 36B show timing charts for processing a signal in an embodiment of FIG. 35.
Figure 36B:
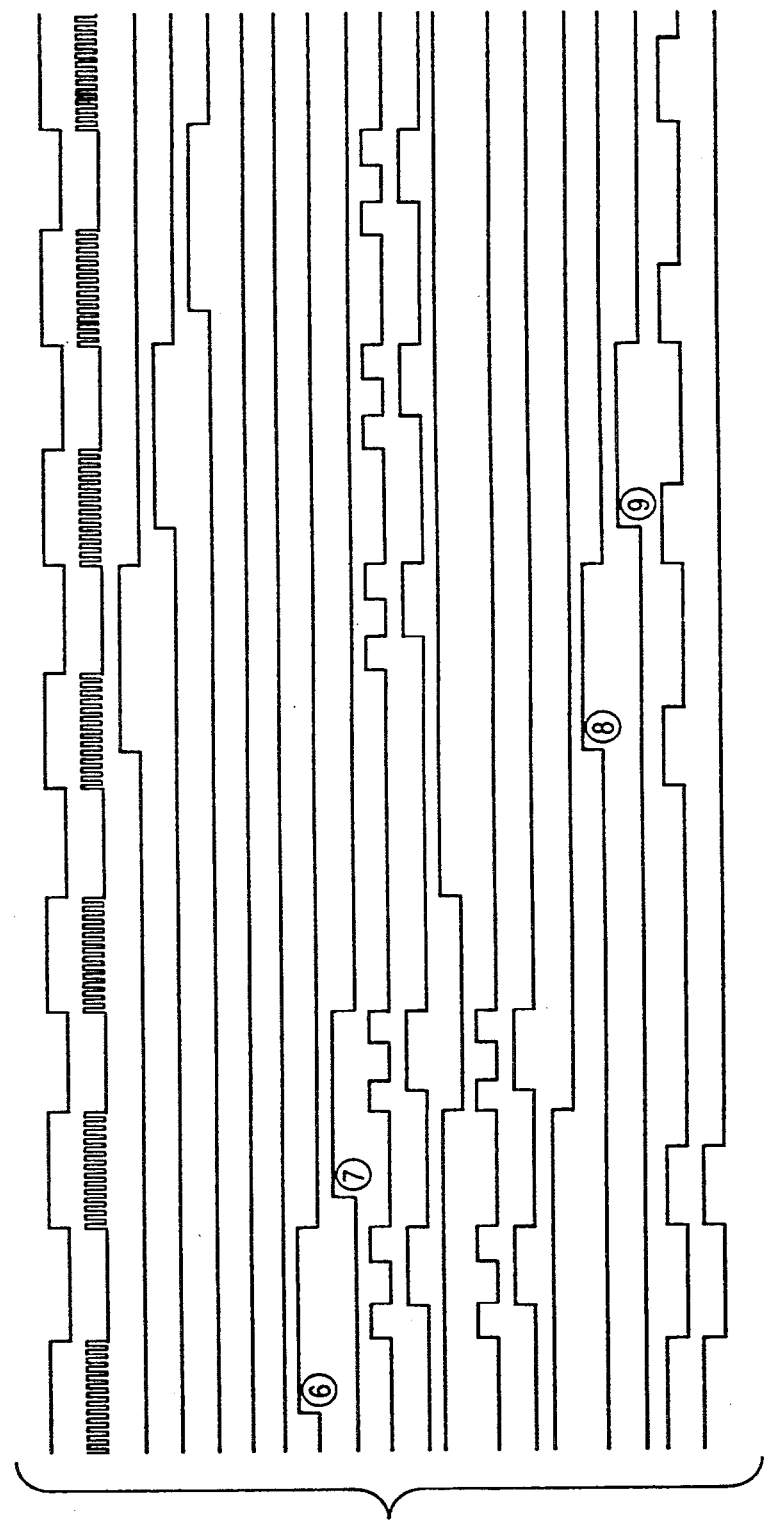

An operation of the neural network shown in FIG. 35 is explained by referring to FIG. 36 formed by laying FIGS. 36A and 36B side-by-side. DCLK and WCLK are input to daisy circuit 171 and ANPs 1, 2, 3, 4 and 5 through master control bock 181. Master control block 181 inputs CSO1 to first daisy circuit 171 as a CSI, as shown by time ①. Then the signal from analog input port 0 appears on analog bus B1 through sample/hold circuit 173 and switch 175 and a sum-of-the-products operation is conducted in ANPs 1, 2 and 3 under the control of SH1 and OC1. Next, a predetermined time after the fall of CSO1, the CSI signal input to the second daisy circuit 172 rises as shown by time ②. Then the signal from analog input port 1 is input via sample/hold circuit 174 and switch 176 and the sum-of-the-products operation is carried out in ANPs 1, 2 and 3. Similarly, a predetermined time after fall of the CSO1 signal the CSI signal input to the third daisy circuit rises as shown by time ③. Then the sum-of-the-products operation is carried out at ANPs 1, 2 and 3 in the intermediate layer.

The output of ANPs 1, 2 and 3 in the intermediate layer is outputted to analog bus B2 starting when CSO2 rises. At time ④, CSO2 is applied to ANP1 and the output of ANP1 is fed back to analog bus B1 through the common analog bus CB. Thus, ANPs 1, 2 and 3 perform the sum-of-the-products operation again under control of SH1 and OC1. The output of ANP1 appears on the analog bus B2. The sum-of-the-products operation is carried out in ANPs 4 and 5 under the control of SH2 and OC2. Therefore, in this embodiment ANPs 1, 2 and 3 in the intermediate layer and ANPs 4 and 5 in the output layer perform the sum-of-the-products operation simultaneously for the output from ANP1. Next, a predetermined time after the fall of CSO2, the CSI signal is input to ANP2 in the intermediate layer, as shown by time ⑤, and the output signal of ANP2 is fed back to analog bus B1 through ANP2 and common bus CB. Therefore, the sum-of-the-products operation can be conducted again in ANPs 1, 2 and 3. The sum-of-the-products operation can be carried out at the same time in the output layer ANPs 4 and 5.

Further, as shown at ⑥, when the CSI signal is input to ANP3, ANP3 produces an output signal on the address bus B2, thus enabling a sum-of-the-products operation to be carried out simultaneously in ANPs 1, 2 and 3 in the intermediate layer and in ANPs 4 and 5 in the output layer.

Next, when dummy signal DCS1 is input to maximum value node 187 at time ⑦, a fixed voltage is applied to analog bus B2 at time ⑦. This output voltage is fed back through common bus CB and analog bus B1 and ANPs 1, 2 and 3 perform the sum-of-the-products operation on it. Sum-of-the-products operations can also be conducted in output layer ANPs 4 and 5.

SYNC1 is high during the period in which the sum-of-the-products operation is carried out in the intermediate layer alone and during the period in which the sum-of-the-products operation is performed in the intermediate layer and in the output layer. SYNC2 is high during the period in which the sum-of-the-products operation is performed in the intermediate layer and in the output layer. When CSO3 is outputted, ANP4 produces an output at time ⑧. A predetermined time after the fall of the CSO3 signal, ANP5 produces an output at time ⑨.

Figure 37:
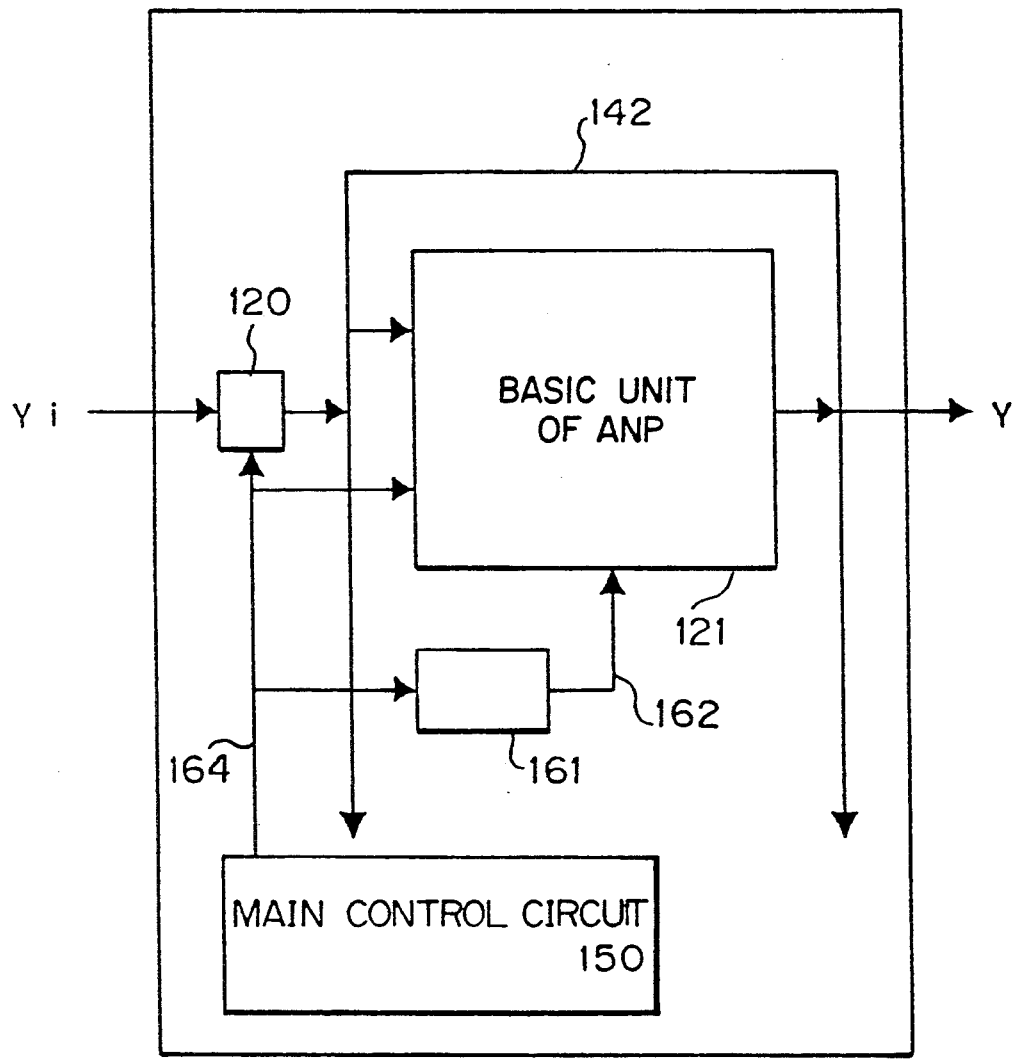
FIG. 37 shows a block diagram of a further embodiment of the present invention.

The purpose of the embodiment shown in FIG. 37 is to further simplify the layered network of the embodiment shown in FIG. 12. This embodiment comprises a single basic unit 121. A single basic unit 121 cannot separately maintain the data relating to a plurality of basic units 121 in the embodiment shown in FIG. 12, and thus in the embodiment shown in FIG. 37, a memory means for maintaining the data is provided externally and a plurality of accumulation portions 123 (see FIG. 11 for single unit) and a plurality of output maintaining portions 125 are provided internally. A structure for selecting these accumulation portions and output maintaining portions is also provided.

Figure 38:
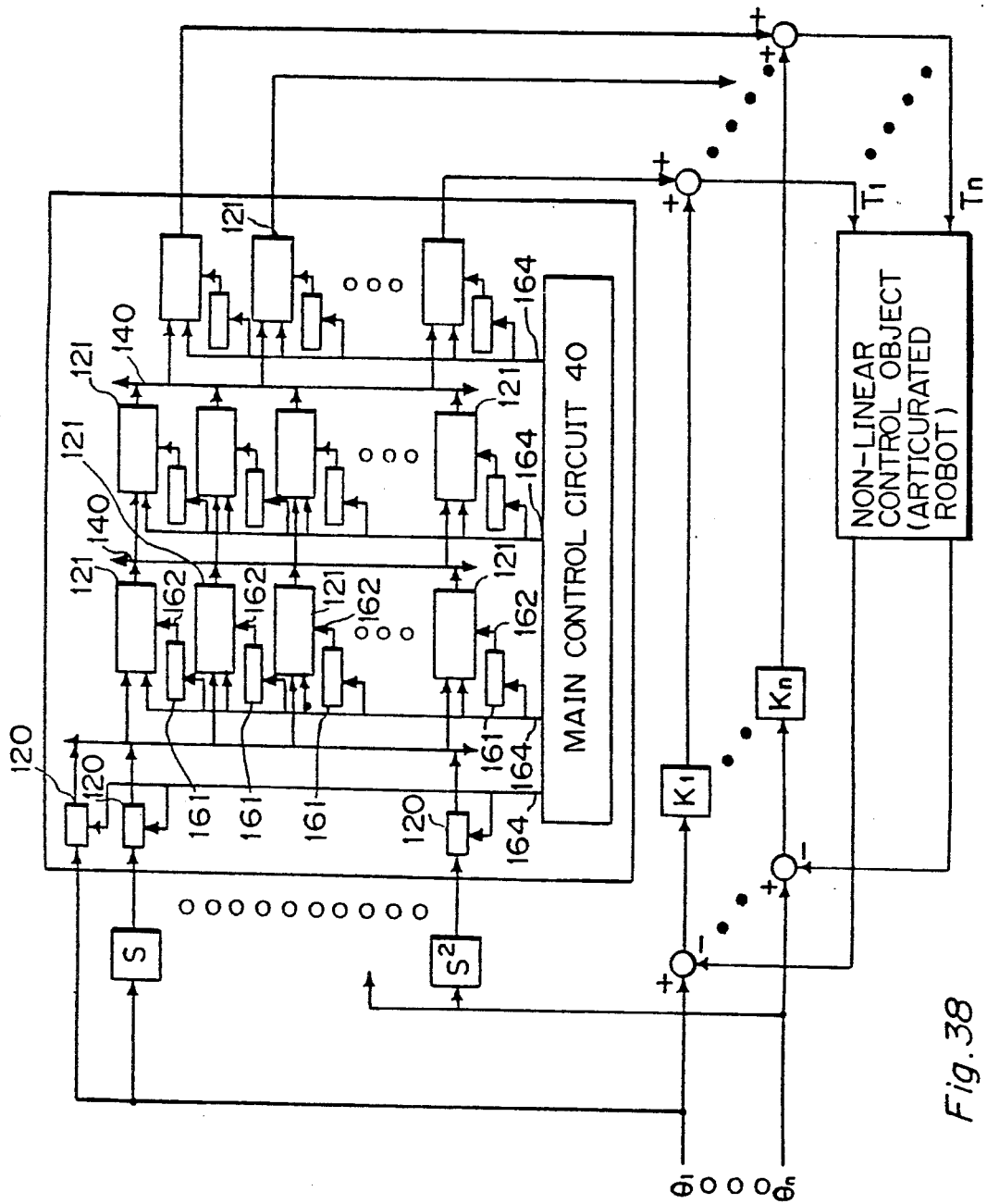
FIG. 38 shows a block diagram of an example in which the present invention is utilized.
Figure 39:
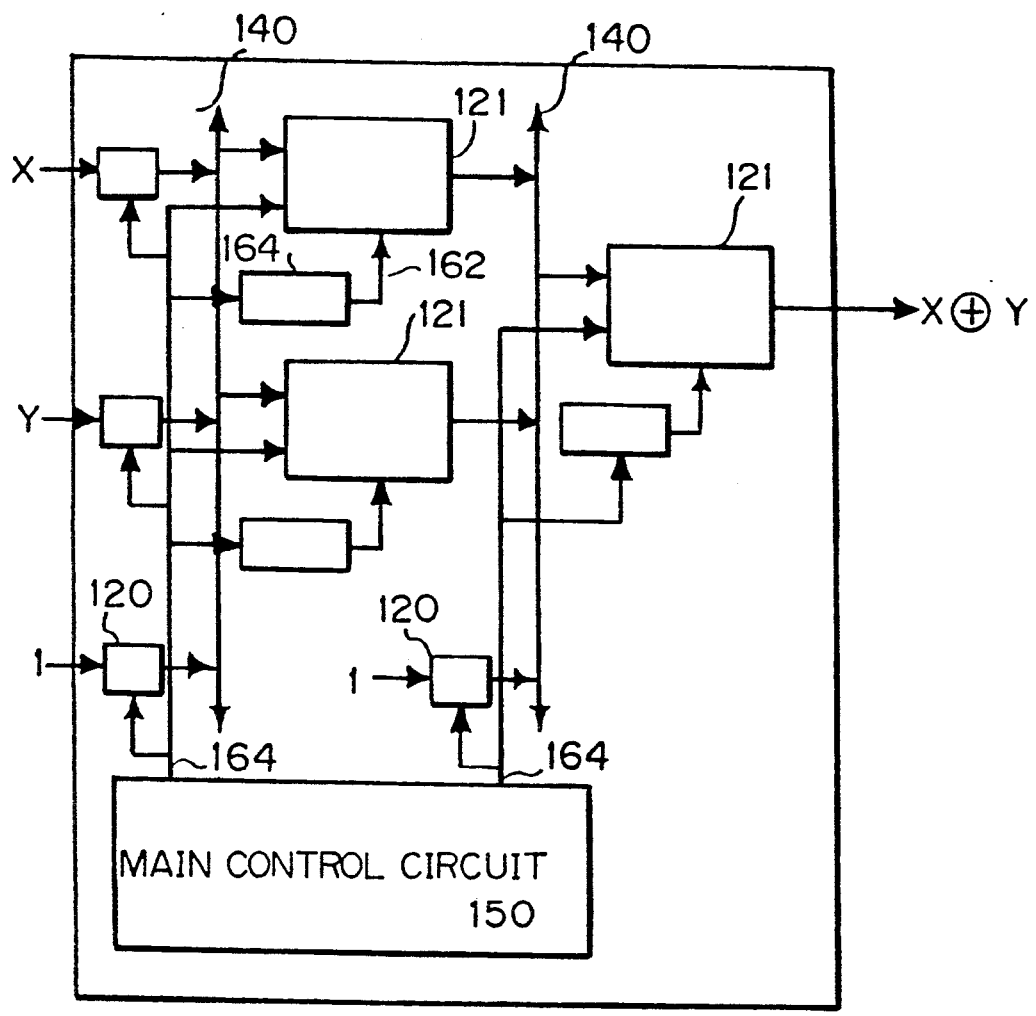
FIG. 39 shows a block diagram of another example in which the present invention is used.

The neuron computer of the present invention for carrying out a non-linear data process can be utilized in various fields. For example, FIG. 38 shows an application example in which the present invention is used for an adaptive control apparatus of an articulated robot. In this apparatus, where a target joint angle is provided to an articulated robot arm for dynamically varying a required torque depending on the joint angle and the angular speed as the instruction value, the required torque is calculated and the feed forward control is realized. The angle instruction value, together with the angular speed instruction value and the angular acceleration instruction value, is provided in the first stage of the transmission line in a time divisional manner and is outputted from the output layer of the final stage as control instruction torque as a result of the above described data transmission process. FIG. 39 shows an application example in which the present invention is utilized for an exclusive OR logic. Inputs X and Y are provided on a transmission path of the first stage in a time divisional manner and the arithmetic operation result is outputted through a paralleling process of these inputs. As the present invention has various application fields as stated above, its capability of realizing a neuron computer in the hardware is extremely valuable.

With regard to an association process in the layered type network, "Name of an Article" and "Shape, Color and Taste of an Article" is previously stored by the network as the corresponding relationship of the characteristic quantity. Then the network can associate "Name of the Article" based on the information stored by the learning process. For example, the Article is "Apple" based on the information of "Round, Red, Sweet and Acidy" and the article is "Lemon" based on the information of "Round, Yellow and Sour".

With regard to the association process in the feedback network, a character font of three characters such as (A, B, C) is previously learned by the network and then even if a dirty or modified character font is input to the network, the covering and the interpolation processes of the image information are performed and the correct character is associated.

As described above, the layered type network selects a name stored in the form of a weight in the network based on a plurality of conditions, but the Hopfield type network can associate the entire feature based on partial information.

With regard to a function of the three layer network, where the information of input and output to the network is binary (logic value), any logic circuit can be realized by connecting at least two stages of the logic circuit, such as AND, OR and NOT, and these logic circuits can be realized by the neuron elements as shown by a MacCullough and Pitt format neuron model.

When the information of the input and output of the network is a continuous value, the longitudinal and transverse dimensions of the non-linear function (sigmoid function) can be expanded and compressed and the threshold value is changed by a parallel movement of the non-linear function, thereby realizing various basic functions which are necessary for approximating the desired function. Accordingly, by appropriately determining the weights between the first and second layer, various basic functions are provided. Further, the other basic functions are used by utilizing the weight between the second and third layers, thereby creating various kinds of functions in a network having more than three layers.

When a pre-stage layer comprising n neuron chips and a post-stage layer comprising m neuron chips are considered, the number of wires in n·m in the prior art. However, this number can be greatly decreased in the present invention as a single analog bus is used. When the input analog signal is provided to a layer comprising n neuron chips, the input analog bus is applied to the neuron chips through an analog bus in the same way as the broadcast method, a parallel operation of n neuron chips within one layer can be performed. Further, a pipeline processing is conducted with regard to respective layers, thereby performing a high speed operation.

As the neuron chip is formed of an analog circuit, the scale of the circuit is made small and the power is also made small, thereby enabling a neuron computer to be formed of a lot of neuron chips. Further, the increase in the number of the neuron chips can be easily dealt with in this invention by changing the control pattern stored in the control pattern memory in the master control block.

We claim:

1. A network structure data processing apparatus forming a layered network, comprising:
 a plurality of layers, each comprising a basic unit for receiving a plurality of analog inputs and a weight to be multiplied by the analog inputs, for obtaining sum-of-products values from the analog inputs and the weight and for converting the sum-of-products values in accordance with a non-linear function to produce an analog output;
 analog buses, each connected to said basic unit, for forming an internal connection between the layers in the layered network; and
 means for sequentially selecting said basic unit to output the analog output between the layers via said analog buses in accordance with a time divisional transmission format.

2. A network structure data processing apparatus according to claim 1, further comprising a feedback line, connecting two of said analog buses, for transmitting the analog output of said basic unit for use as one of the analog inputs of said basic unit.

3. The network structure data processing apparatus according to claim 2, wherein said feedback line is located in at least one of an input layer, an intermediate layer and an output layer.

4. A neuron computer, comprising:
 a neural network comprising:
  a first analog bus;
  a set of analog neuron chips for receiving an input analog signal from the first analog bus in a time divisional manner and for carrying out a sum-of-products operation using digital weight data to produce an output analog signal; and
  a second analog bus for receiving the output analog signal;
 a control pattern memory for storing a pattern of a control signal of said neural network;
 a sequencer for generating an address of said control pattern memory;
 a weight memory for storing the digital weight data; and
 digital control means for controlling said neural network in dependence upon the control signal stored in said control pattern memory, using said sequencer and the digital weight data stored in said weight memory.

5. An analog neuron chip, comprising:
 a multiplying unit for multiplying an analog signal by serial weight data to produce a multiplied signal;
 an addition unit for adding the multiplied signal from said multiplying unit produced in accordance with the analog signal as input in a time divisional manner to produce a summed signal, said addition unit including a condenser for storing the summed signal;

addition time control means for varying a time for charging the condenser in said addition unit to adjust the summed signal;

sample and hold means, connected to said addition unit, for sampling and holding the summed signal stored in the condenser in said addition unit and for producing a sampled signal;

a non-linear circuit for inputting the output signal of said sample and hold means and for producing an output signal therefrom based upon a non-linear function; and an output unit, connected to said non-linear circuit, for outputting the output signal of said non-linear circuit as an analog time divisional signal.

6. An analog neuro-computer system, comprising:
an input circuit for inputting an analog input signal and for producing a first time divisional analog signal from the analog input signal at an output;
an input layer analog bus connected to the output of said input circuit;
a first intermediate layer having an analog neuron processor connected to said input layer analog bus and having an output;
a first intermediate layer analog bus connected to the output of said first intermediate layer;
a second intermediate layer having an analog neuron processor connected in parallel with said first intermediate layer analog bus;
a second intermediate layer having analog bus connected to the analog neuron processor in said second intermediate layer;
means for enabling the analog neuron processor in said first intermediate layer to receive the first time divisional analog signal provided on said input layer analog bus and to sequentially perform a sum-of-products operation on the first time divisional analog signal using first weight data to produce a second time divisional analog signal;
means for enabling the analog neuron processor in said second intermediate layer to receive the second time divisional analog signal provided on said first intermediate layer analog bus and to sequentially perform a sum-of-products operation on the second time divisional analog signal using second weight data to produce a third time divisional analog signal; and
means for outputting the third time divisional analog signal provided on said second intermediate layer analog bus.

7. A neuron unit connectable to first and second analog buses and to receive digital weight data, said neuron unit comprising:
means for receiving the digital weight data;
means for receiving an analog input signal from the first analog bus in a time divisional manner; and
means for carrying out a sum-of-products operation on the analog input signal using the digital weight data to provide an analog output signal to the second analog bus.

8. The neuron unit according to claim 7, wherein said means for carrying out the sum-of-products operation comprises a D/A converter receiving the analog input signal at a reference voltage terminal and receiving the digital weight data at a digital input terminal.

9. A neuron unit as recited in claim 7, wherein said means for carrying out the sum-of-products operation comprises:
summing means for adding the analog input signal after multiplying by a weight determined by the digital weight data to produce a result signal; and
a non-linear function circuit for operating on the result signal from said summing means to produce the analog output signal on the second analog bus.

10. The neuron unit according to claim 9, wherein said non-linear function circuit comprises:
current mirror circuits;
emitter resistors;
a constant current circuit;
an output resistor having first and second terminals; and
a plurality of stages of amplifiers forming a current switching circuit, each stage of said amplifiers having a collector connected to a corresponding current mirror circuit and the first terminal of said output resistor and having an emitter connected to a corresponding emitter resistor and said constant current circuit, the collector providing output thereof to the first terminal of said output resistor, the stages of said amplifier corresponding to substantially linear portions of a non-linear function based on a ratio of the corresponding emitter resistor to said output resistor.

11. A neuron computer, comprising:
a first analog bus for receiving an analog input signal,
at least one analog neuron processor, connected to said first analog bus, for performing a sum-of-products operation on the analog input signal from said first analog bus using weight data,
a second analog bus connected to said analog neuron processor,
a weight memory for storing the weight data, and
control means for controlling input of the analog input signal in a first time period on said first analog bus to said analog neuron processor, multiplication of the analog input signal by the weight data to provide a product and addition of the product to a sum of products obtained in a second time period, preceding the first time period, to produce an analog output signal during the first time period on said second analog bus.

12. The neuron computer according to claim 11, wherein said control means is connected to an external digital control unit, and
wherein said control means comprises a master control block for controlling said analog neuron processor, said master control block comprising:
a control pattern memory for producing a control pattern of a control signal of said analog neuron processor,
a sequencer, operatively connected to said control pattern memory, for controlling a sequence of an address of said control pattern memory,
a micro-code memory, operatively connected to said control pattern memory and said sequencer, for storing instructions for controlling sequencing by said sequencer,
address control means, operatively connected to said sequencer, for controlling addressing of said weight memory, and
interface means connected to the external digital control unit, for assigning a right to use said first and second analog buses to a single analog neuron processor in predetermined time periods.

13. The neuron computer according to claim 12, wherein said control pattern memory comprises first and second control pattern memories, said first control pattern memory storing the control pattern corresponding to the control signal for controlling said analog neuron processor and said second control pattern memory having at least a head address of said first control pattern memory.

14. The neuron computer according to claim 12, wherein said control pattern memory comprises first and second control pattern memories, said first control pattern memory storing the control pattern corresponding to the control signal for controlling said analog neuron processor and said second control pattern memory having a head address of said first control pattern memory and a number of repetitions of the control pattern supplied to said analog neuron processor as the control signal during consecutive time periods.

15. The neuron computer according to claim 14,
wherein said neuron computer further comprises means for producing signals from a dummy node to supply a threshold value to said first and second analog buses, and
wherein said first control pattern memory stores, as an original pattern, at least one of as data clock pulse sequence and a weight clock pulse sequence for providing reading timing of said memory to perform an analog signal process of said analog neuron processor, a weight clock, a S/H signal for performing a sample/hold operation of an analog signal in respective layers, an offset control signal for determining an offset voltage within said analog neuron processor, a CSI signal and a CSO signal for controlling unit and output timing to and from said analog neuron processor, respectively, a synchronizing signal SYNC for determining an operational time within the respective layers, a reset signal and an enable signal for the dummy node.

16. The neuron computer according to claim 12, wherein,
a repeat instruction for repeating an original pattern and instructions for designating the head addresses of respective original patterns are stored in said micro-code memory.

17. The neuron computer according to claim 12, wherein the control pattern has a bit-width direction and data in the bit-width direction of the control pattern is simultaneously read out from said control pattern memory in accordance with a renewal of an address thereof.

18. A neuron computer according to claim 12,
wherein said sequencer produces a count control signal and undergoes a count reset operation in accordance with a microprogram controlling said sequencer, and
wherein said master control block has an address counter for indicating an address of said weight memory, said address counter counts a weight clock, a count operation enabled by the count control signal provided from said sequencer and the address counter controlled by the count reset operation of said sequencer so that the address counter is returned to a head address of the weight data stored in said weight memory.

19. The neuron computer according to claim 12,
wherein said external digital control unit supplies upper and lower addresses to said master control block,
wherein said interface means comprises an external interface circuit, operatively connected to the external digital control unit, said control pattern memory and said micro-code memory to provide data from the external digital control unit to said control pattern and micro-code memories to establish the contents thereof, said external interface circuit including a timing circuit for latching appropriate timing sequence data, including a latch signal, formed therein upon decoding the upper address from the external digital control unit, the lower address and the data being latched by the latch signal, and
wherein the control pattern is stored in an address of the micro-code memory and the control pattern memory designated by the lower address.

20. The neuron computer according to claim 11, said weight memory supplies the weight data by paralleling the data from a memory device in a direction of a bit-width and the weight data is supplied to a plurality of analog neuron processors.

21. The neuron computer according to claim 11,
further comprising a microprocessor operatively connected to said control means,
wherein said control means comprises a master control block operatively connected to said analog neuron processor and said weight memory, and
wherein said weight memory comprises:
weight data storing means for storing the weight data;
a bi-directional buffer connected between said weight data storing means and said microprocessor; and
selecting means for, in a first mode, selecting between an address from the master control block and an address provided from said microprocessor, thereby selecting the address from the master control block to transmit the output of said weight memory to said analog neuron processor and for, in a second mode, transmitting the weight data between said microprocessor and said weight memory by referring to said weight memory using the address provided by said microprocessor.

22. The neuron computer according to claim 11,
further comprising a third analog bus,
wherein said at least one analog neuron processor comprises first and second analog neuron processors connected between said first and second analog buses and said second and third analog buses, respectively, and to said control means, and
wherein said control means applies a first CSI signal to the first analog neuron processor and in response the first analog neuron processor produces a first output signal on said second analog bus and after a predetermined time passes, said control means applies a second CSI signal to the second analog neuron processor and in response the second analog neuron processor produces a second output signal onto said third analog bus.

23. The neuron computer according to claim 11,
wherein said at least one analog neuron processor comprises first and second analog neuron processors connected between said first and second analog buses, wherein said control means applies a first CSI signal to the first analog neuron processor, and wherein at least the first analog neuron processor includes a daisy circuit for delaying the CSI signal applied thereto by a predetermined time period, thereby producing a CSO signal for controlling output from the second analog neuron processor on said second analog bus, the CSO signal being received as a second CSI signal of the second analog neuron processor.

24. The neuron computer according to claim 23, wherein said control means produces pulses in a weight clock signal, and wherein said daisy circuit comprises:
- a flip-flop, operatively connected to said control means and the second analog neuron processor, for outputting the CSO signal after receiving the first CSI signal; and
- counter means for determining a delay amount based on an edge of completion of the CSI signal and for determining output timing of the CSO signal based on a number of the pulses of the weight clock signal.

25. The neuron computer according to claim 11, wherein said control means produces a CSI signal, and wherein said neuron computer further comprises:
- a first daisy circuit, operatively connected to said control means for producing a CSO signal by delaying the CSI signal by a predetermined time period to control transmission of the analog input signal on said first analog bus and
- a second daisy circuit operatively connected to said first daisy circuit to receive the CSO signal as a CSI signal of said second daisy circuit to continue controlling transmission of the analog input signal on said first analog bus.

26. The neuron computer according to claim 25, wherein said first and second daisy circuits form an input layer.

27. The neuron computer according to claim 11, wherein said control means comprises a main control circuit, operatively connected to said at least one analog neuron processor, for producing initial CSI signals, and wherein said at least one analog neuron processor is formed as layers of analog neuron processors, each producing a CSO signal a predetermined time period after a CSI signal is received, one of said analog neuron processors in each layer receiving a corresponding initial CSI signal from said main control circuit, said analog neuron processors performing a daisy chain operation sequentially in each layer by using the CSO signal as a CSI signal of an adjacent analog neuron processor, and the daisy chain operation starts in a following layer after completion of the daisy chain operation in a preceding layer.

28. The neuron computer according to claim 11, wherein said control means comprises a main control circuit, operatively connected to said analog neuron processor and said weight memory, for producing an enable signal at a predetermined time, and wherein said neuron computer further comprises means for producing a predetermined voltage on said first and second analog buses for a predetermined time period in response to the enable signal, thereby forming a dummy node and a maximum value node circuit.

29. The neuron computer according to claim 28, wherein said predetermined voltage producing means produces a voltage corresponding to a threshold value of the non-linear function circuit.

30. The neuron computer according to claim 28, wherein said predetermined voltage producing means comprises means for performing a testing operation of a sequence by producing 0 voltage.

31. The neuron computer according to claim 28, wherein said predetermined voltage producing means comprising the dummy node is connected to said first and second analog buses to produce a dummy signal to target analog neuron processors performing a daisy chain operation.

32. The neuron computer according to claim 28, wherein said maximum value node circuit comprises:
- means for producing a fixed voltage; and
- memory control means for transmitting the fixed voltage to a dummy node output in accordance with the enable signal provided from the main control circuit.

33. A neuron computer, comprising:
- a master control block for producing control signals controlling timing of operations in said neuron computer;
- a weight memory, operatively connected to said master control block, for outputting serial weight data; and
- a neuron unit, operatively connected to said master control block and said weight memory, comprising:
  - an analog circuit for performing a sum-of-products operation on an analog input signal and analog weight data to produce an analog output signal, said analog circuit including a switching element;
  - a digital circuit for controlling said analog circuit, said digital circuit comprising:
    - a sequence generator, operatively connected to said master control block and said analog circuit, for converting one of the control signals from said master control block to a switching control signal used in said analog circuit;
    - a phase control circuit, operatively connected to said sequence generator and the switching element in said analog circuit, for controlling phase of another of the control signals to control a switching operation of the switching element included in said analog circuit; and
    - a shift register, operatively connected to said sequence generator, said weight memory and said master control block, for converting the serial weight data provided from said weight memory to parallel weight data; and
  - digital/analog conversion means for converting the parallel weight data into the analog weight data.

34. The neuron computer according to claim 33, wherein said analog circuit further includes a sample/hold circuit, a non-linear function unit and an integrator having a capacitor, all connected to said master control block, wherein said master control block outputs a reset signal, a synchronization signal and data and weight clock signals in the control signals, and wherein said sequence generator receives the reset signal for discharging a charge on the capacitor of the integrator, the synchronization signal and the data and weight clock signals and produces an enable signal of the sample/hold circuit and a parallel output of said shift register, an enable signal of a sign bit, an internal clock signal, a shifting clock signal, a selection control signal for selecting whether data should be processed through the non-linear function unit and a CSO signal for a daisy chain operation.

35. The neuron computer according to claim 33, wherein the switching element includes a plurality of switches operatively connected to said phase control circuit, and
wherein said phase control circuit comprises:
first and second delay means for delaying a reversed phase signal and an in-phase signal to produce two output signals, and
feedback means for feeding back the output signals of said first and second delay means as input to said second and first delay means, respectively, the two output signals having opposite phases so that the switches controlled by the output signals are not simultaneously turned on.

36. The neuron computer according to claim 33, wherein said master control block includes a weight clock signal in the control signals,
wherein said sequence generator sends a WR signal to said shift register, and
wherein said shift register is enabled by one of the control signals and, after the serial weight data is input in a bit serial manner in accordance with the weight clock signal, said shift register is enabled by the WR signal to output the parallel weight data.

37. A neuron computer, comprising:
an input layer; and
at least one intermediate layer comprising an analog neuron processor operatively connected to said input layer; and
at least one output layer operatively connected to said analog neuron processor, thereby forming a layered type network.

38. A neuron computer, comprising:
an analog bus for receiving input;
a single layer comprising a plurality of analog neuron processors operatively connected to said analog bus to receive the input and for producing an output; and
feedback means for feeding back the output from said analog neuron processors to said analog bus to be used as input and for using the single layer in a time divisional multiplexed manner.

39. A neuron computer, comprising:
a layer comprising a plurality of analog neuron processors and producing an output signal; and
feedback means for feeding back the output signal to said layer until the output signal from said layer reaches an ordinary state, said neuron computer thereby forming a feedback type network.

40. A neuron computer, comprising:
a layered type neural network of analog neuron processors; and
a feedback type neural network of analog neuron processors, connected to said layered type neural network to form a combined neural network.

41. A method of operating a neurocomputer having at least one analog neuron processor in at least one analog neuron processor set, comprising the steps of:
(a) receiving weight data at each analog neuron processor;
(b) sequentially transmitting analog input data from a plurality of input sources, one input source at a time;
(c) accumulating the analog input data multiplied times the weight data to produce a sum-of-products value in each analog neural processor; and
(d) outputting the sum-of-products value from one analog neuron processor at a time in each analog neuron processor set.

42. The method according to claim 41, wherein the neurocomputer is formed as a layered network and the at least one analog neuron processor includes a plurality of analog neuron processors forming layers in the layered network with each layer corresponding to one analog neuron processor set,
wherein said receiving in step (a) comprises receiving the weight data for each of the analog neuron processors simultaneously, at least within each layer,
wherein said method further comprises the step of (e) simultaneously receiving the analog input data sequentially transmitted in step (d) at all of the analog neuron processors in a first layer of the analog neuron processors, and
wherein said outputting in step (d) is performed simultaneously by one of the analog neuron processors in each layer and sequentially within each layer by one of the analog neuron processors at a time.

43. The method according to claim 41, further comprising the step of (e) supplying the sum-of-products value as part of the analog input data, whereby the at least one analog neuron processor is one of the input sources.

44. The method according to claim 43, wherein the at least one analog neuron processor includes a layer of a plurality of analog neuron processors, and
wherein step (e) comprises sequentially supplying an output, based on the sum-of-products value, of each analog neuron processor in the layer as part of the analog input data to all of the analog neuron processors in the layer.

45. The method according to claim 43, wherein the at least one analog neuron processor is a single analog neuron processor producing an output based on the sum-of-products value,
wherein said method further comprises the step of (f) storing the output from the single analog neuron processor produced for each of a first set of the analog input data supplied from outside the single analog neuron processor, and
wherein step (e) comprises sequentially supplying the output for each of the first set of the analog input data stored in step (f) to the single analog neuron processor for production of new sum-of-products values.

46. The method according to claim 41,
wherein step (a) comprises receiving the weight data serially in a parallel-out shift register, and
wherein step (c) comprises the steps of:
(c1) using the analog input data from each input source as a reference voltage in a digital/analog converter for digital-to-analog conversion of corresponding weight data to produce an analog product value; and (c2) accumulating the analog product value for each of the analog input data in a set of analog input data to produce the sum-of-products value.

47. A neurocomputer for processing analog input data from a plurality of input sources, comprising:

means for sequentially transmitting the analog input data from the input sources, one input source at a time;

at least one analog neuron processor in at least one analog neuron processor set operatively connected to said input means, for accumulating the analog input data multiplied times weight data to produce a sum-of-products value in each analog neuron processor;

means for supplying the weight data to each analog neuron processor; and means for outputting the sum-of-products value from one analog neuron processor at a time in each analog neuron processor set.

* * * * *

UNITED STATES PATENT AND TRADEMARK OFFICE
CERTIFICATE OF CORRECTION

PATENT NO. : 5,131,072

DATED : July 14, 1992

INVENTOR(S) : Yoshizawa et al.

It is certified that error appears in the above-identified patent and that said Letters Patent is hereby corrected as shown below:

ON THE TITLE PAGE:

[57] ABSTRACT line 3, after "bus" should be --bus, multiplied by--;

line 4, delete "and" (first occurrence);

line 9, "micro sequencer" should be --micro-sequencer--;

line 10, "the" should be --a--;

line 19, "a speed of an opera-" should be --"speed of opera- --;

line 20, "prsent" should be --present--;

line 21, "computer with a high practicality." should be --computer.--.

Col. 3, line 34, "the detailed circuit structure of the" should be --how the data is stored in the--.

Col. 7, line 16, "eight" should be --weight--.

Col. 8, line 2, "MO" should be --MOS--;

line 16, "7" should be --73--.

Col. 9, line 30, "a" should be --an--.

Col. 12, line 46, "stages of the intermediate" should be --basic units--.

UNITED STATES PATENT AND TRADEMARK OFFICE
CERTIFICATE OF CORRECTION

PATENT NO. : 5,131,072

DATED : July 14, 1992

INVENTOR(S) : Yoshizawa et al.

It is certified that error appears in the above-identified patent and that said Letters Patent is hereby corrected as shown below:

Col. 16, line 16, after "operates" should be --and--;

line 31, after "Yn" insert --from the input circuit 120n is completed. When the--.

Col. 26, line 28, "$Y_L$" should be --$\tilde{Y}_L$--;

line 29, "$ANP_r$" should be --$ANP_L$--;

line 40 (first equation), "$Y_L$" should be -- $\tilde{Y}_L$ --;

line 54 (second line of third equation), "$Y_L$" should be -- $\tilde{Y}_L$ --;

line 65 (fifth equation), "f" should be --f'--.

Col. 33, line 44, "12" should be --121--.

Col. 34, line 2, "u its" should be -- units --;

line 16, "a" should be --as--.

Col. 35, line 52, after "out" should be --at ANPs 1, 2 and 3. When the SYNC signal next rises the sum-of-the products operation is carried out--;

line 63, "the products" should be --the-products--.

Col. 36, line 30, "SCO1" should be --CSO1--.

UNITED STATES PATENT AND TRADEMARK OFFICE
CERTIFICATE OF CORRECTION

PATENT NO. : 5,131,072

DATED : July 14, 1992

INVENTOR(S) : Yoshizawa et al.

It is certified that error appears in the above-identified patent and that said Letters Patent is hereby corrected as shown below:

Col. 37, line 56, "bock" should be --block--.
Col. 43, line 27, "as" should be --a--;
      line 36, "unit" should be --input--.
Col. 46, line 48, after "controlling" should be --a--.

Signed and Sealed this

Second Day of November, 1993

BRUCE LEHMAN

Commissioner of Patents and Trademarks